(12) United States Patent
Gardner et al.

(10) Patent No.: US 8,282,328 B2
(45) Date of Patent: Oct. 9, 2012

(54) PORTABLE FASTENER DRIVING DEVICE

(75) Inventors: Michael J. Gardner, Hudson, OH (US); Glenn A. Baker, Cleveland, OH (US); Mirko Champa, North Olmstead, OH (US); Jim Bias, Cypress, TX (US); Jeffrey Sutherland, Mogadore, OH (US)

(73) Assignee: Halex/Scott Fetzer Company, Bedford Heights, OH (US)

( * ) Notice: Subject to any disclaimer, the term of this patent is extended or adjusted under 35 U.S.C. 154(b) by 353 days.

(21) Appl. No.: 12/510,386

(22) Filed: Jul. 28, 2009

(65) Prior Publication Data
US 2009/0285655 A1 Nov. 19, 2009

Related U.S. Application Data

(63) Continuation-in-part of application No. PCT/US2008/052369, filed on Jan. 29, 2008.

(60) Provisional application No. 60/887,091, filed on Jan. 29, 2007.

(51) Int. Cl.
*F16B 15/00* (2006.01)
*H01B 17/00* (2006.01)
(52) U.S. Cl. .............. 411/469; 411/475; 174/159
(58) Field of Classification Search .......... 411/476–475, 411/480, 920–921, 473–475, 469; 174/159
See application file for complete search history.

(56) References Cited

U.S. PATENT DOCUMENTS

| | | | |
|---|---|---|---|
| 1,792,235 A * | 2/1931 | Maynard | 206/340 |
| 2,001,288 A * | 5/1935 | Schorr | 174/159 |
| 2,003,062 A | 5/1935 | Wickwire | |
| 2,632,356 A | 3/1953 | Thiel | |
| 3,076,373 A | 2/1963 | Matthews | |
| 3,141,171 A | 7/1964 | Doyle et al. | |
| 3,154,999 A * | 11/1964 | Stewart | 411/474 |
| 3,345,546 A | 10/1967 | Beltramo | |
| 3,373,646 A * | 3/1968 | Ehlert | 411/473 |
| 3,605,402 A | 9/1971 | Larson | |

(Continued)

FOREIGN PATENT DOCUMENTS

DE 3426072 7/1984

(Continued)

OTHER PUBLICATIONS

Halex; Plastic Insulating Staples Product Website; 1 page (date unknown).

(Continued)

*Primary Examiner* — Flemming Saether
(74) *Attorney, Agent, or Firm* — Hahn Loeser & Parks LLP; Bret A. Hrivnak, Esq.

(57) ABSTRACT

The present invention includes various embodiments directed to apparatus and methods surrounding a fastener device. In particular embodiments, the fastener device is a quick charging and discharging device that includes a solenoid, a fastener striker, a flash capacitor, and a control circuit. Other novel features of the fastener device exist. In particular embodiments, the present invention also includes apparatus and methods related to deforming staples for securing conduit and the like, and staple insulation and insulated staples that may be discharged by the fastener device. The insulation may be provided in an ordinary staple strip for use in the fastener device. Each insulation form may include deformation voids to assist the adaptation of the insulation about a target object that is being secured by the insulated staple.

42 Claims, 35 Drawing Sheets

U.S. PATENT DOCUMENTS

| | | | |
|---|---|---|---|
| 3,757,629 A | 9/1973 | Schneider | |
| 3,894,174 A | 7/1975 | Cartun | |
| 3,940,844 A | 3/1976 | Colby et al. | |
| 4,005,812 A | 2/1977 | Doyle et al. | |
| 4,014,244 A | 3/1977 | Larson | |
| 4,087,035 A | 5/1978 | Harmon | |
| 4,129,240 A | 12/1978 | Geist | |
| 4,183,453 A | 1/1980 | Barrett et al. | |
| 4,230,249 A | 10/1980 | Nasiatka et al. | |
| 4,293,088 A | 10/1981 | Barrett et al. | |
| 4,323,127 A | 4/1982 | Cunningham | |
| 4,349,143 A | 9/1982 | Ewig | |
| 4,380,312 A | 4/1983 | Landrus | |
| 4,405,073 A | 9/1983 | Escalante | |
| 4,491,262 A | 1/1985 | Ewig | |
| 4,573,624 A | 3/1986 | Mueller et al. | |
| 4,598,852 A | 7/1986 | Olesen | |
| 4,655,222 A | 4/1987 | Florez et al. | |
| 4,700,876 A | 10/1987 | Wingert | |
| 4,724,992 A | 2/1988 | Ohmori | |
| 4,770,335 A | 9/1988 | Wingert | |
| 4,858,813 A | 8/1989 | Wingert | |
| 4,940,177 A | 7/1990 | Jimena | |
| 4,946,087 A | 8/1990 | Wingert | |
| 5,009,356 A | 4/1991 | Chang | |
| 5,098,004 A | 3/1992 | Kerrigan | |
| 5,105,329 A | 4/1992 | Goldner | |
| D330,699 S | 11/1992 | Gill | |
| 5,320,270 A | 6/1994 | Crutcher | |
| 5,443,196 A | 8/1995 | Burlington | |
| 5,620,289 A * | 4/1997 | Curry | 411/444 |
| 5,718,548 A * | 2/1998 | Cotellessa | 411/456 |
| 5,732,870 A | 3/1998 | Moorman et al. | |
| 5,735,444 A | 4/1998 | Wingert | |
| 5,931,364 A | 8/1999 | Dennis | |
| 5,940,264 A | 8/1999 | Stevens et al. | |
| 6,082,604 A | 7/2000 | Dennis | |
| 6,142,355 A | 11/2000 | Wu | |
| 6,237,827 B1 | 5/2001 | Reckelhoff | |
| 6,305,891 B1 * | 10/2001 | Burlingame | 411/469 |
| 6,318,615 B1 | 11/2001 | Walter | |
| 6,364,193 B1 | 4/2002 | Tsai | |
| 6,382,492 B1 | 5/2002 | Moorman et al. | |
| 6,431,425 B1 | 8/2002 | Moorman et al. | |
| 6,518,733 B1 | 2/2003 | Schenkel et al. | |
| 6,607,111 B2 | 8/2003 | Garvis et al. | |
| 6,708,861 B2 | 3/2004 | Osuga et al. | |
| 6,753,673 B2 | 6/2004 | Shiue et al. | |
| 6,766,935 B2 | 7/2004 | Pedicini et al. | |
| 6,777,917 B2 | 8/2004 | Desprez et al. | |
| 6,796,475 B2 | 9/2004 | Adams | |
| 6,805,998 B2 | 10/2004 | Jenson et al. | |
| 6,830,173 B2 | 12/2004 | Barber et al. | |
| 6,891,457 B2 | 5/2005 | Sako | |
| 7,011,242 B2 | 3/2006 | Barlow et al. | |
| 7,044,351 B2 | 5/2006 | Ronconi | |
| 7,108,164 B2 | 9/2006 | Shima et al. | |
| 7,243,440 B2 | 7/2007 | Dekeyser | |
| 7,248,019 B2 | 7/2007 | Ookubo et al. | |
| 7,292,005 B2 | 11/2007 | Pietkiewicz et al. | |
| 7,314,155 B2 | 1/2008 | Moeller et al. | |
| 7,319,396 B2 | 1/2008 | Homanfar et al. | |
| 2002/0134811 A1 | 9/2002 | Napier et al. | |
| 2005/0168340 A1 | 8/2005 | Mosher et al. | |
| 2008/0179371 A1 | 7/2008 | Gardner et al. | |

FOREIGN PATENT DOCUMENTS

| | | |
|---|---|---|
| GB | 2344553 | 6/2000 |
| JP | 1979-136478 | 10/1974 |
| KR | 96-28462 | 9/1996 |
| KR | 1997-014942 | 4/1997 |
| KR | 2003-0081392 | 10/2003 |
| KR | 10-2005-005776 | 1/2005 |

OTHER PUBLICATIONS

Halex; Cable Staples Product Website; 1 page (date unknown).
Halex; Insulated Staples for NM2 Wire Product Website; 1 page (date unknown).
Amazon.com; Makita T220D Cordless Stapler Product Wabpage; 3 pages (date unknown).
Dewalt; XRP Cordless Finish Nailers Product Literature; 2 page (date unknown).
Senco; Cordless Finish 25 18 ga. Brad Nailer Parts Reference Guide; 4 pages (2006).
Gardnerbender.com; Color Code Insulated Staples Product Webpage; 2 pages (date unknown).
Makita; Models T220D and T220DW Cordless Staples Instruction Manual; 16 pages (1994).
Makita: Models T110D and T220DWCordless Staples Wiring Diagram; 2 pages (1992).
Regitar; RT5420B and RT70149B Cordless Staplers Product Literature; 3 pages (date unknown).
International Search Report for International Application No. PCT/US2008/052369.
Written Opinion of the International Searching Authority for International Application No. PCT/US2008/052369.
Linear Technology Corporation; LT3750-Capacitor Charger Controller Product Webpage; 3 pages.
Linear Technology Corporation; LT3750 Capacitor Charger Controller Datasheet; 16 pages.
W.W. Cross Industries, Inc; Viking Brand Super Staples From W.W. Cross; webpage; 1 page.
W.W. Cross Industries, Inc. W.W. Cross Insulated Staples; webpage; 1 page.
U.S. Appl. No. 11/944,607, filed Nov. 24, 2007; office action dated Oct. 8, 2009.
U.S. Patent and Trademark Office Advisory Action dated Sep. 13, 2010.
U.S. Patent and Trademark Office Action dated May 17, 2010.
U.S. Patent and Trademark Office Action dated Oct. 8, 2009.

* cited by examiner

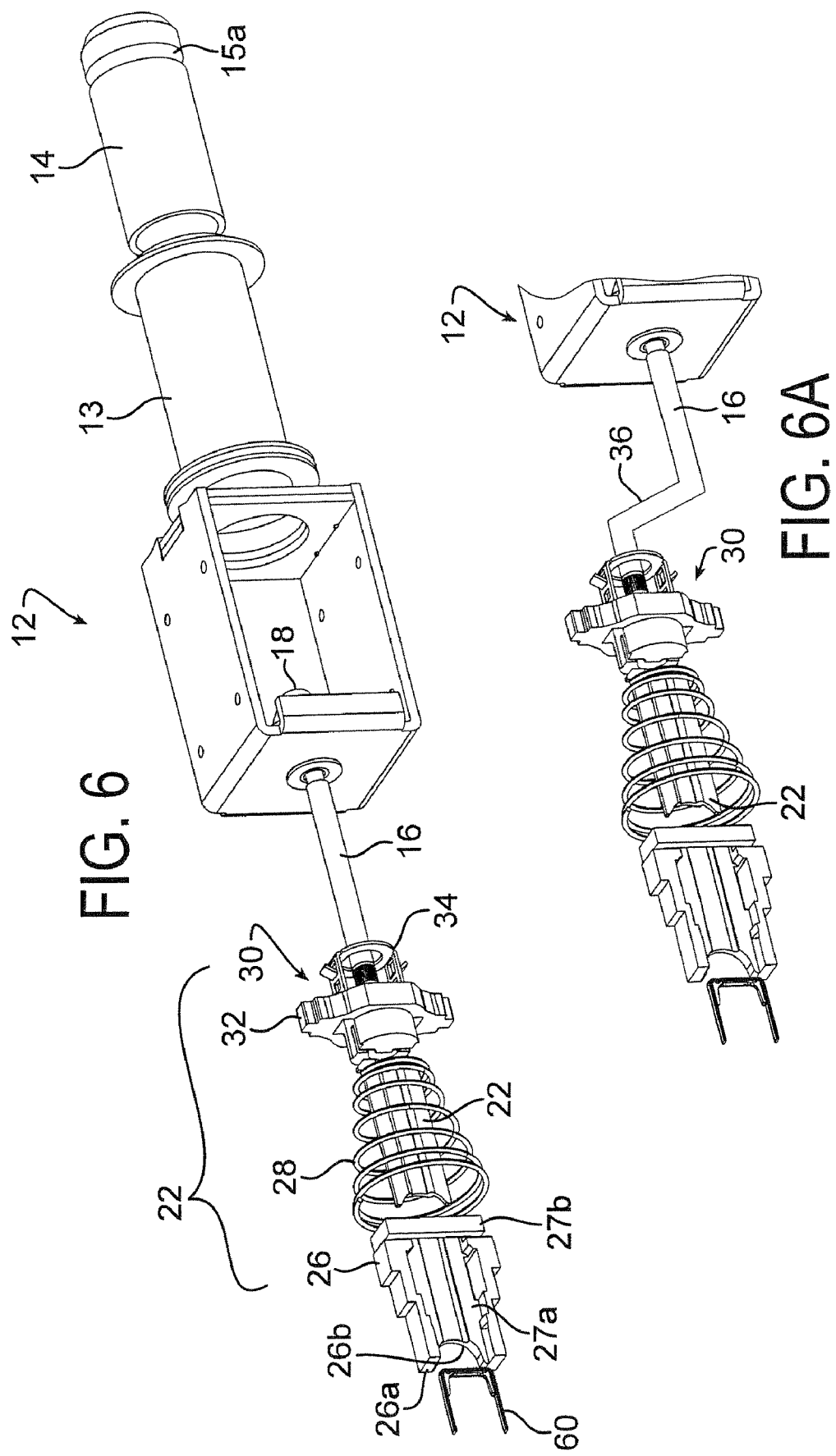

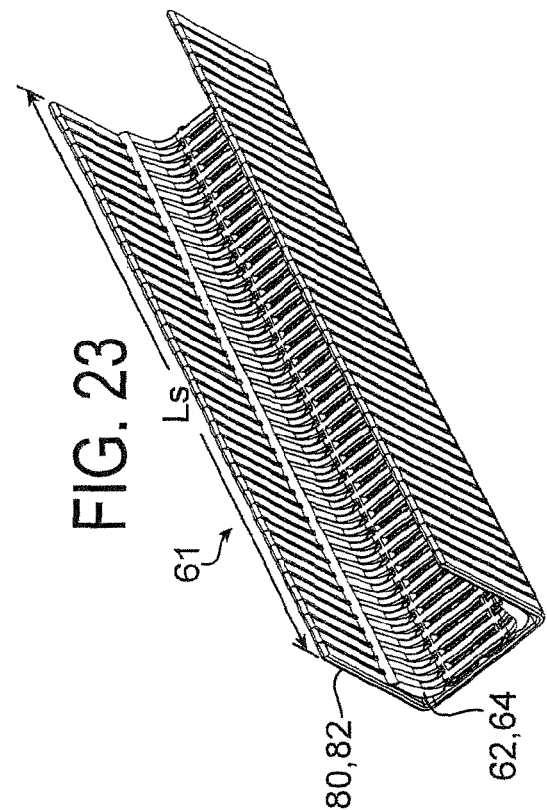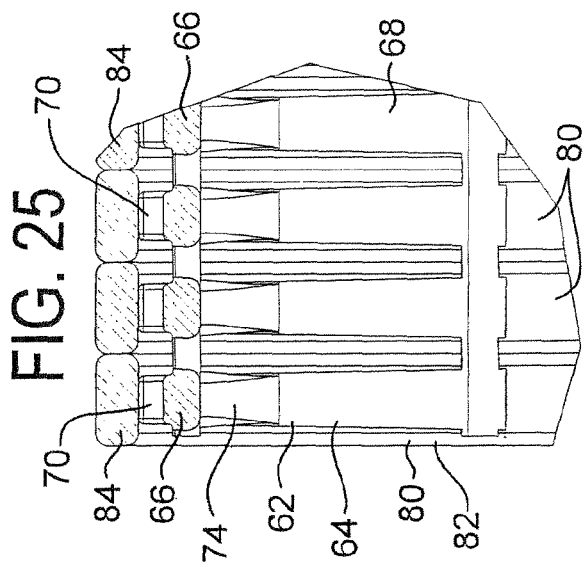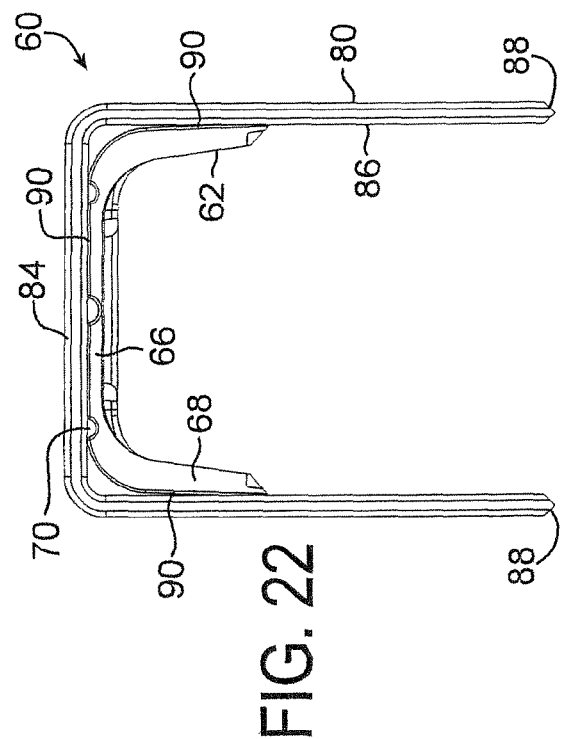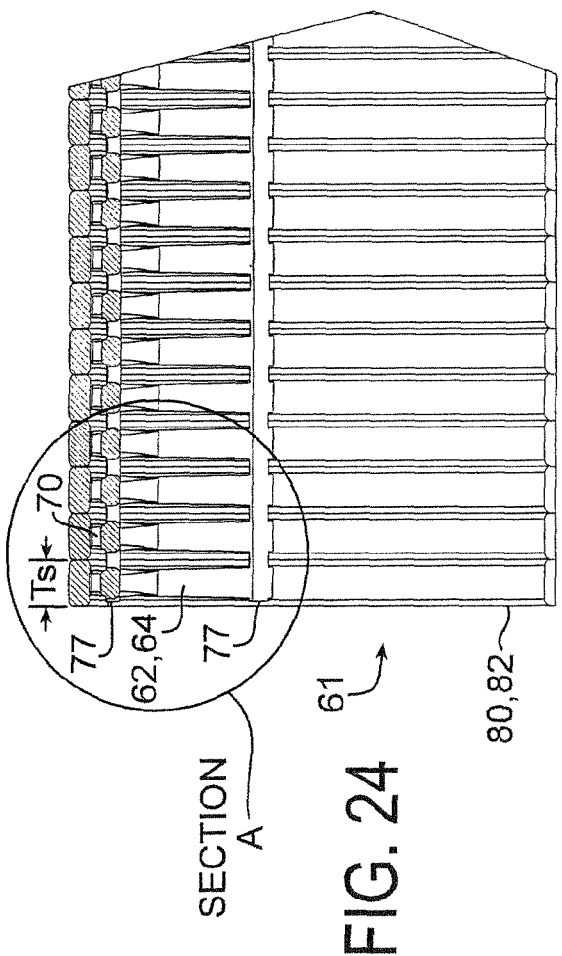

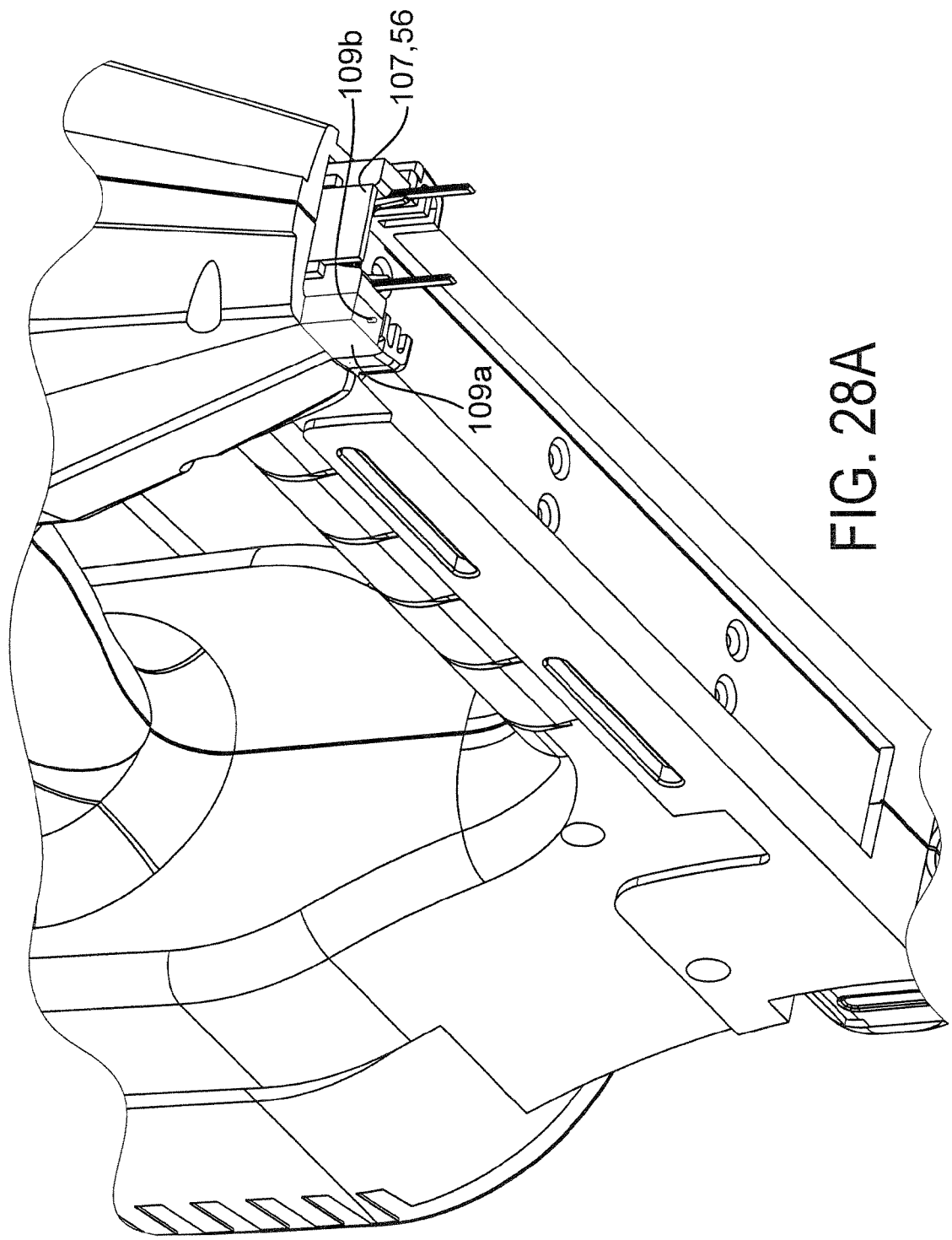

FIG. 29ℓ

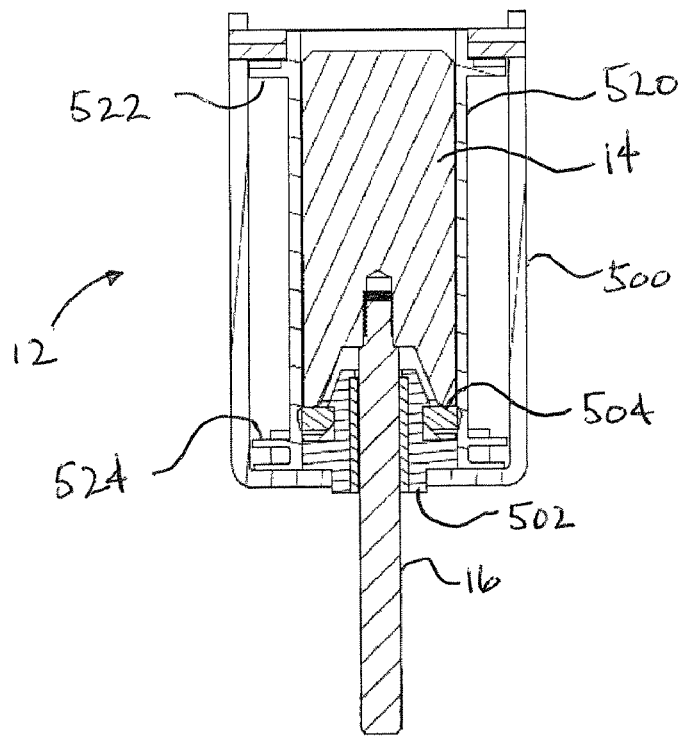
FIG. 40
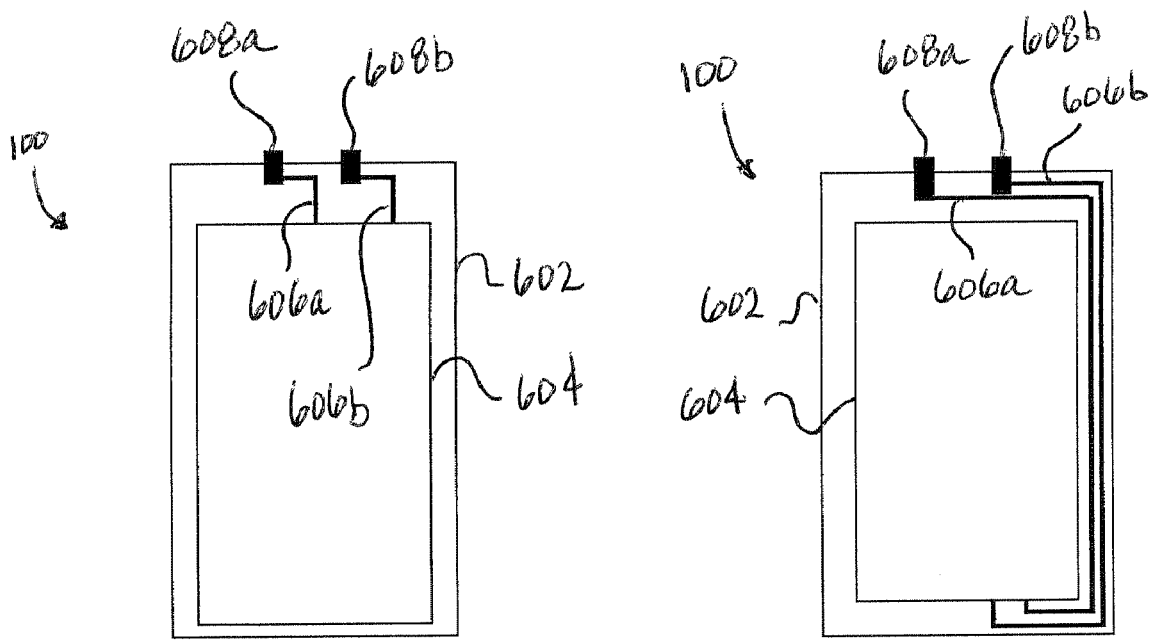
FIG. 46a  FIG. 46b

PORTABLE FASTENER DRIVING DEVICE

CROSS-REFERENCE TO RELATED APPLICATIONS

This application is a continuation-in-part of, and claims priority to, international patent application PCT/US2008/052369, filed Jan. 29, 2008, which claims priority to pending U.S. patent application Ser. No. 11/944,607, filed Nov. 24, 2007, which claims priority to U.S. provisional patent application Ser. No. 60/887,091, filed Jan. 29, 2007, the disclosures of all such applications are hereby incorporated by reference.

DESCRIPTION OF THE RELATED ART

Embodiments of the present invention relate to a device for driving staples and other fasteners. More specifically, embodiments of the present invention relate to a portable, lightweight, hand-held device that utilizes a DC source to effectively drive staples or other fasteners under heavy duty applications at elevated drive forces and at short intervals of time while maintaining an extended battery life.

Prior art staplers and other fastener driving devices are well known. Many of these devices are manual (i.e., spring driven) or solely utilize an alternating current (AC) power source. Other fastener driving devices utilize direct current (DC) sources, such as batteries. DC driven devices are appealing for their portability; however, there are several draw-backs that significantly reduce their commercial appeal for heavy duty industrial or commercial uses.

Industrial or commercial fastener driving devices must be reliable, quickly refire, and drive the desired fasteners consistently and securely into more resistant (i.e., harder or denser) materials, such as, for example, wood, plastics, concrete, and composites thereof. Because batteries contain a limited amount of stored energy, it is difficult to provide high driving power while still providing quick refiring capabilities and an extended battery life. Consequently, prior art solenoid-driven fastener driving devices do not consistently provide elevated driving power with quick firing and recharging (i.e., refiring) capabilities. Further, DC operated devices may have severely limited battery life.

Staples are often used to secure cable and the like in homes and commercial buildings. To prevent cables and the like from moving, it may be desirous to deform a staple about the cable. Further, insulated staples are becoming more and more desired because they provide a flexible interface between the staple and the cable. This flexible interface is more forgiving and, therefore, safer since it is less apt to cut or abrade the cable, such as when the staple is over driven, when the cable moves due to ambient temperature fluctuations or cable expansion from electrical heat generation within the cable, or by relative movement between the cable and structure. Presently, there lacks an efficient means of manufacturing and providing an insulated staple, and providing insulation that is capable of properly shearing from a clip and adapting to a rounded cable or the like.

Accordingly, there remains a need to provide a fastener driving device and insulated staples that meet the inadequacies and deficiencies in the prior art, including those identified above. The fastener driving device and staples disclosed herein provide novel solutions to these and other problems.

SUMMARY OF THE INVENTION

Particular embodiments of the present invention include an apparatus and methods for discharging and driving fasteners into work pieces. Particular embodiments of the present invention include an electric fastener-dispensing device comprising: a solenoid; a fastener striker in operational communication with the solenoid; a flash capacitor in operational communication with the solenoid; and, a control circuit in operational communication with the flash capacitor, the circuit configured to fully charge the flash capacitor from a direct current power source and fully discharge the capacitor within approximately 20 seconds or less, the power source having a charging capacity of at least approximately 12 volts.

Other particular embodiments of the present invention include an electric fastener-dispensing device comprising: a solenoid; a fastener striker in operational communication with the solenoid; a capacitor in operational communication with the solenoid; and, a control circuit in operational communication with the capacitor, the circuit configured to charge and discharge the capacitor.

Other particular embodiments of the present invention include a staple-dispensing device comprising a staple striker in operational communication with a striker driving means, the staple striker including a strengthening ridge that extends along a length of striker.

Other particular embodiments of the present invention include a staple-dispensing device comprising a staple striker in operational communication with a striker driving means; a main rail having a length and a staple-engaging top surface extending along the length; a pusher for directing staples along the length of the main rail towards a discharge end for communication with the staple striker; and, a bottom plate attached to the bottom of the main rail, the bottom plate having a staple-engaging surface extending along a length of the bottom plate, the staple engaging surface extending outwardly from a side of the main rail.

Other particular embodiments of the present invention include a removable staple magazine for use in a staple-dispensing device, the magazine comprising a main rail having a length and a staple-engaging top surface extending along the length; a pusher for directing staples along the length of the main rail towards a discharge end for communication with the staple striker; and, a bottom plate attached to the bottom of the main rail, the bottom plate having a staple-engaging surface extending along a length of the bottom plate, the staple engaging surface extending outwardly from a side of the main rail.

Other particular embodiments of the present invention include a staple insulation form for use with a staple to provide an insulated staple, the staple having a width and a bight section extending between a pair of legs, the legs extending from an underside of the bight section, the insulation form comprising: a crown section having a width and a top side, wherein the top side is configured for operable association with the underside of the staple bight section; and, wherein the crown width is less than or substantially equal to a width of a staple.

Other particular embodiments of the present invention include an insulated staple comprising: a staple having a bight section, the bight section having a width and extending between a pair of legs, the legs extending outwardly from an underside of the bight section; an insulation form having a crown section, the crown section having a width and a top side, the top side being configured for operable association with the underside of the staple bight section, and the crown width being less than or substantially equal to the width of the staple bight section.

Other particular embodiments of the present invention further include a method of discharging a fastener from an electric stapler, the method comprising: providing a fastener-discharging device having a solenoid, a flash capacitor, a direct current power source, and a control circuit, the power source having a charging capacity of at least approximately 12 volts; charging the capacitor within 20 seconds or less from the direct current power source from no charge to at least 180 volts, the charging occurring by way of a charging circuit of the control circuit; discharging the capacitor in full to operate a solenoid, the solenoid thereby driving a striker to discharge a fastener; wherein the capacitor is charged and discharged within 20 seconds or less.

Other particular embodiments of the present invention further include a method of discharging a fastener from an electric stapler, the method comprising: providing a fastener-discharging device having a solenoid, a capacitor, and a control circuit; charging the capacitor, the charging occurring by way of a charging circuit of the control circuit; discharging the capacitor in full to operate a solenoid, the solenoid thereby driving a striker to discharge a fastener.

Other particular embodiments of the present invention further include a method of securing a target object to a work piece, the method comprising the steps of: providing a stapler having a staple striker, the staple striker having a non-linear bottom edge; aligning the stapler over a target object, the target object being located on a work piece; engaging a staple with the staple striker to discharge staple about the target object and into contact with the work piece; deforming the staple with the striker bottom edge while the striker drives the staple into the work piece.

Other particular embodiments of the present invention further include a method of forming an insulated staple, the method comprising the steps of: providing a staple having a width and a bight section, the bight section having a width and extending between a pair of legs, the legs extending outwardly from an underside of the bight section; providing an insulation form having a width and a crown section, the crown section having a width and a top side, wherein the top side is configured for operable association with the underside of the staple bight section, and wherein the crown width is less than or substantially equal to the width of the bight section; and, placing the top side of the crown section of the insulation form into communication with the underside of the staple bight section.

Other particular embodiments of the present invention further include a method of forming an insulated staple strip, the method comprising the steps of: providing a staple strip, the staple strip comprising a plurality of attached staples, each staple having a bight section, each bight section having a width and extending between a pair of legs, the legs extending outwardly from an underside of the bight section; providing an insulation strip, the strip comprising a plurality of attached insulation forms, each of the forms having a crown; and, placing the insulation strip within the staple strip, such that a top side of the crown section of each insulation form is associated with and adjacent to the underside of a staple bight section.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 6 is a side perspective view of the drive assembly, in accordance with an embodiment of the device shown in FIG. 1;

FIG. 6A is a partial side perspective view of the drive assembly shown in FIG. 6, showing an alternative embodiment of the drive assembly, in accordance with an embodiment of the device shown in FIG. 1;

FIG. 22 is a side view of an insulated staple, in accordance with an embodiment of present invention;

FIG. 23 is a perspective view of an insulated staple clip, in accordance with an embodiment of the present invention;

FIG. 24 is a cross-section view of the insulated staple clip shown in FIG. 23 where the cross-section is taken through a deformation void, in accordance with an embodiment of the present invention;

FIG. 25 is blown up view of Section A shown in FIG. 21;

FIG. 28A is a bottom-side perspective view of an embodiment of the device shown FIG. 1, made in accordance with the present invention, where the device includes variable power sensors that are capable of varying power based upon work piece hardness and/or the height of a target object to be secured;

FIG. 40 is a side cross-sectional view of a solenoid, in accordance with an embodiment of the present invention.

FIG. 46a is a side view of a flash capacitor showing leads extending from the topside of the capacitor winding to its terminals, in accordance with an embodiment of the present invention.

FIG. 46b is a side view of a flash capacitor showing leads extending from the underside of the capacitor winding to its terminals, in accordance with an embodiment of the present invention.

DETAILED DESCRIPTION OF PARTICULAR EMBODIMENTS

Figure 1:
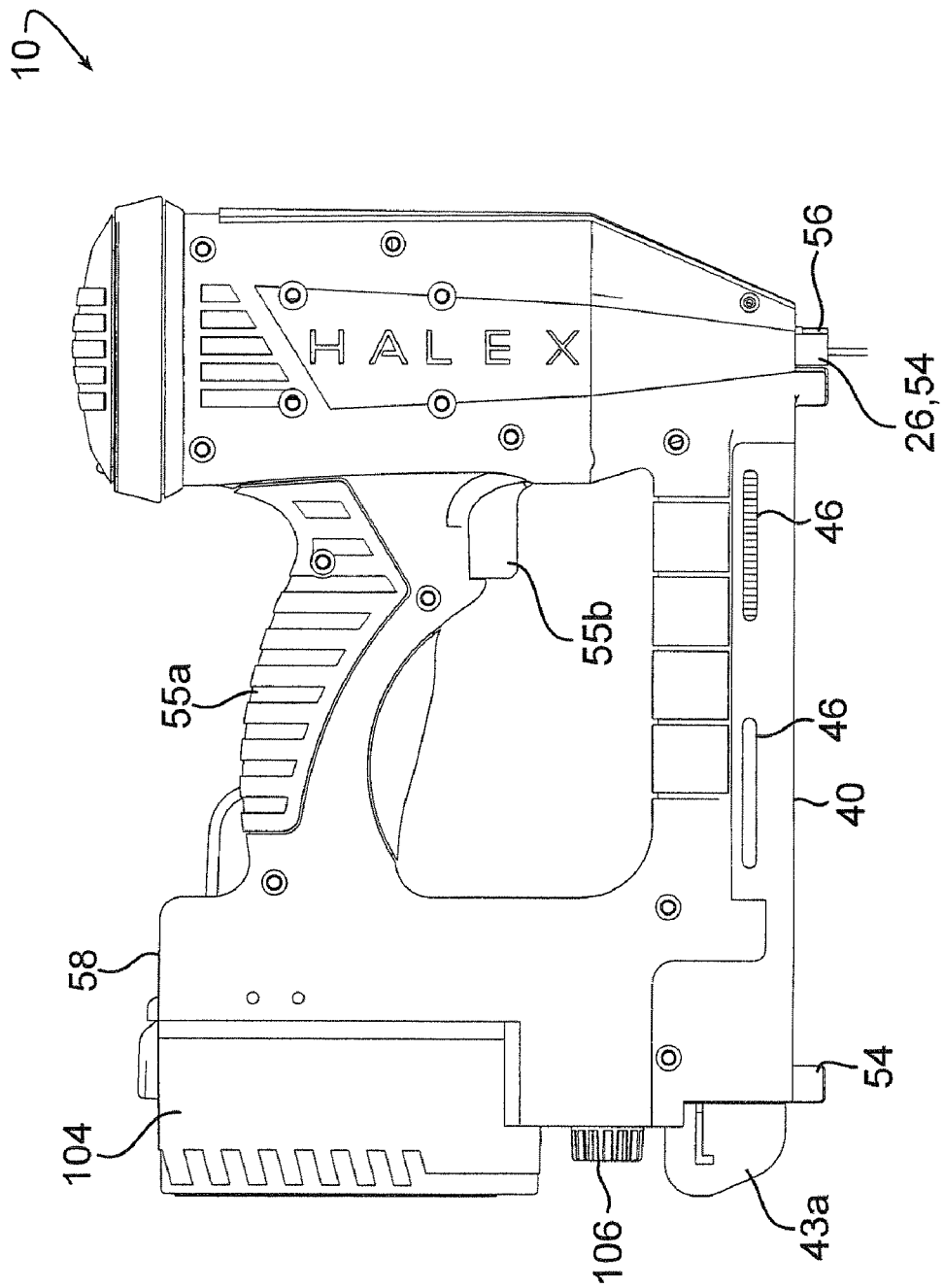
FIG. 1 is a side view of an exemplary embodiment of the fastener driving device of the present invention.
Figure 3:
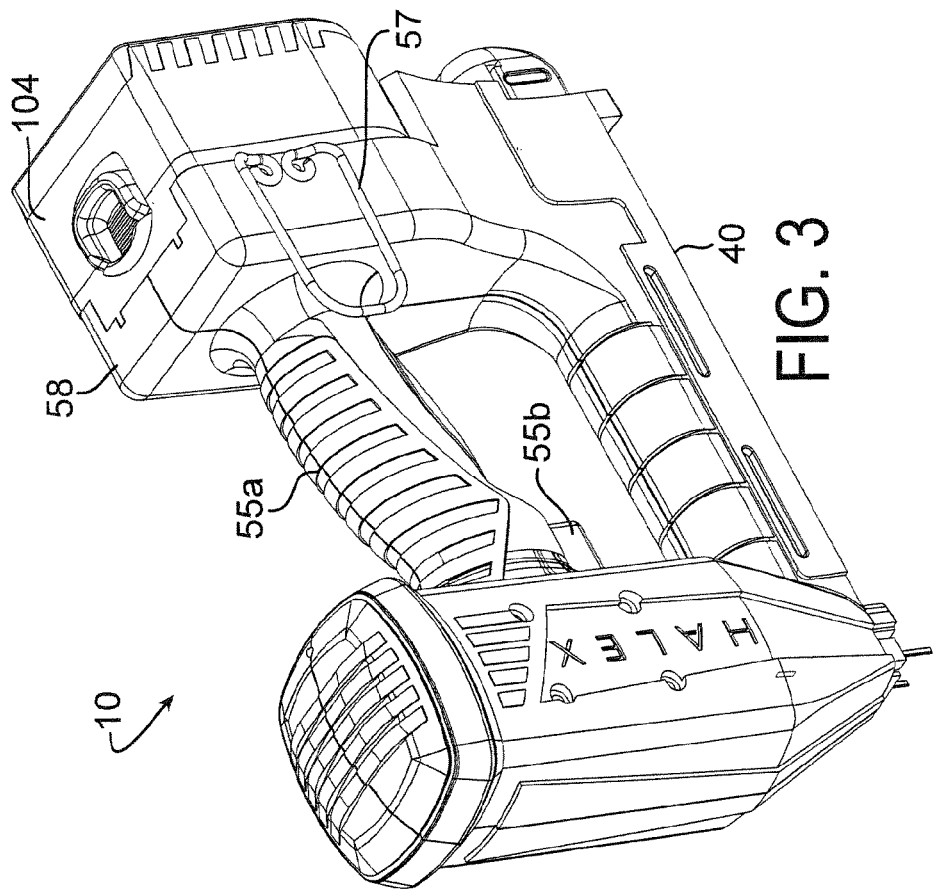
FIG. 3 is a perspective view from the top and front of the device shown in FIG. 1, in accordance with an exemplary embodiment of the present invention.
Figure 2:
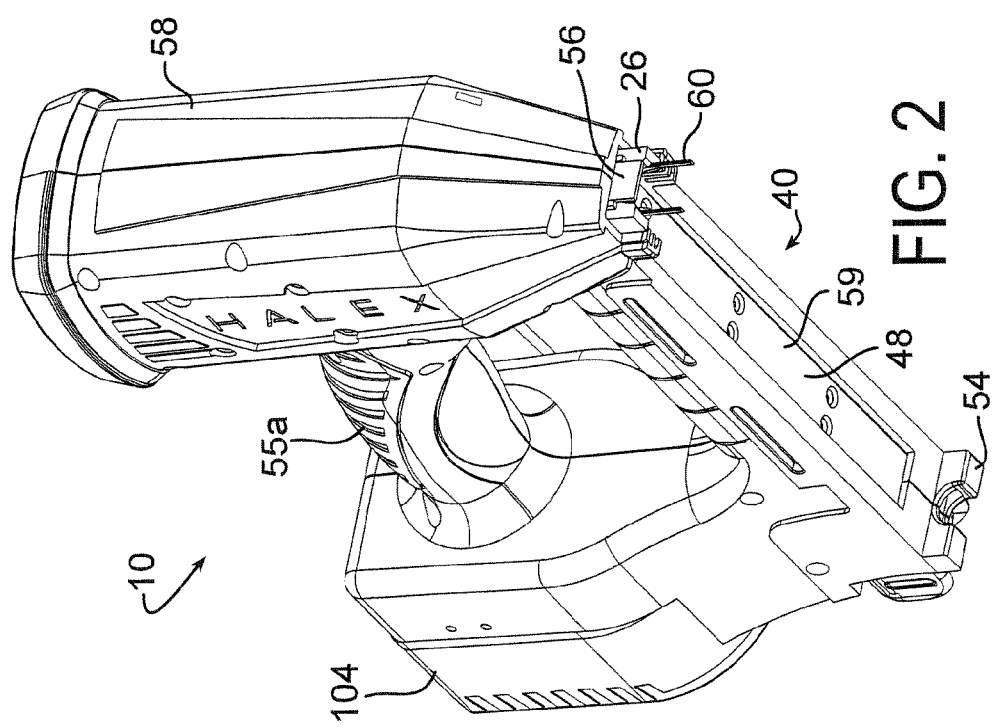
FIG. 2 is a perspective view from the front and bottom of the device shown in FIG. 1, in accordance with an exemplary embodiment of the present invention.
Figure 4:
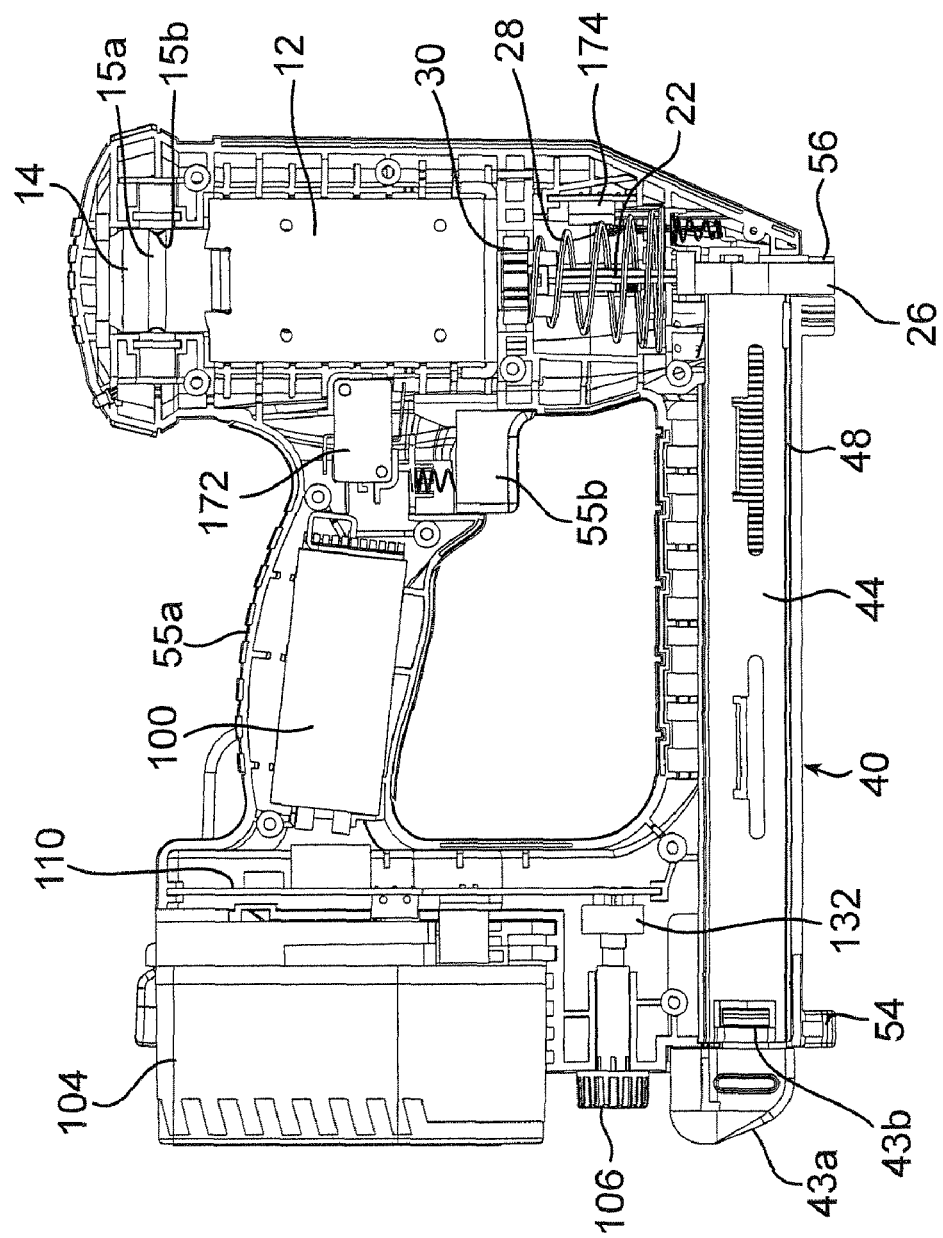
FIG. 4 is an internal side view of the device shown in FIG. 1, in accordance with an exemplary embodiment of the present invention.
Figure 5:
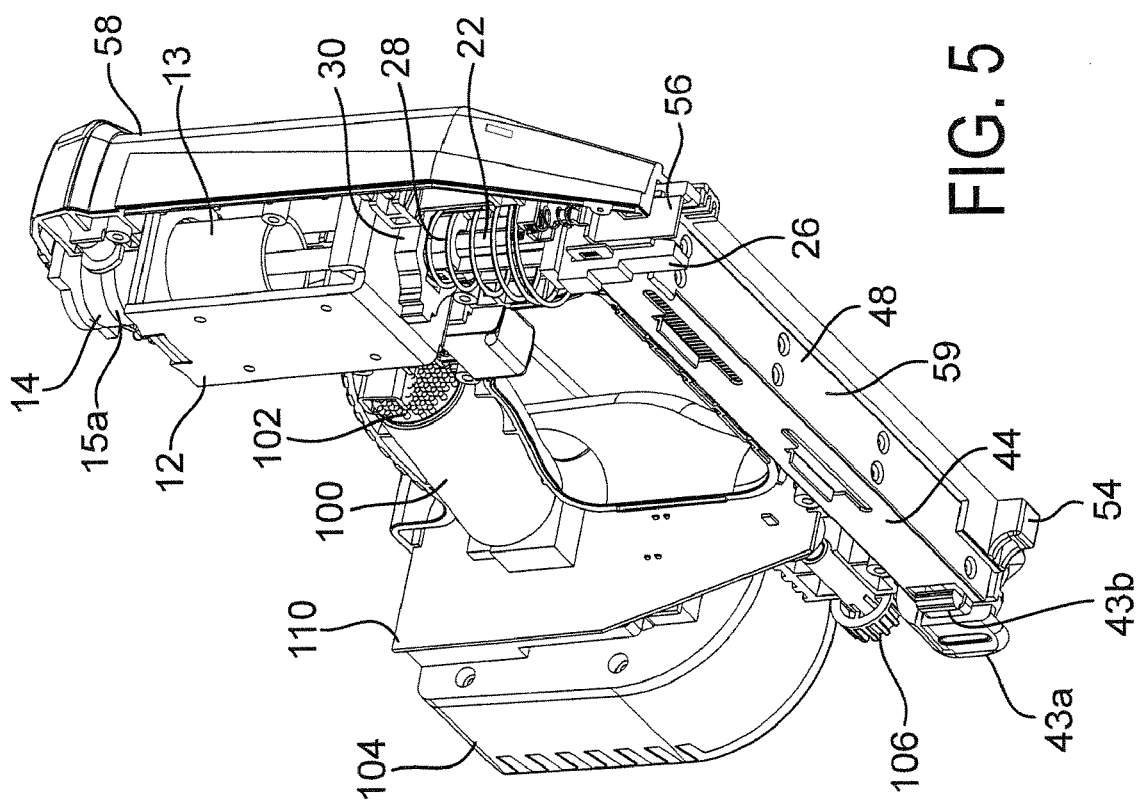
FIG. 5 is a perspective side view of the device shown in FIG. 1, showing internal components thereof, in accordance with an exemplary embodiment of the invention.

A fastener driving device 10 is generally discussed herein, which may operate from a DC power source and is capable of discharging fasteners at elevated power levels, at quicker cycle times, and over an extended period of time on a single power source charge. Device 10 may be a stapler, a nailer, or any other fastener driving device.

In an exemplary embodiment, as shown in the FIGS. 1-28A, device 10 comprises a direct current (DC) powered stapler 10. The DC-powered stapler 10 is capable of driving staples at reduced cycle time intervals, such as between two (2) and three (3) seconds when fully charging and discharging a 360 volt, 1200 uF (microfarad) flash capacitor. In another embodiment, the cycle time is approximately around 1.5 seconds when fully charging and discharging a 180 volt, 1200 uF capacitor. Further, on a single battery charge, the device 10 is capable of making well over 900 shots with a 12-cell 14.4 volt Ni-Cad battery pack, which is generally well over 2 days of work for a commercial user. The number of shots may increase when using a similar Li-ion battery.

In this exemplary embodiment, device 10 is also capable of driving staples that comply with UL 2239 requirements, including withstanding the 7.2 pull test, which requires the driven staple to remain intact for 5 minutes while being subjected to a 50 pound load. To achieve this, the device 10 generally provides higher power to effectively drive staples to appropriate depths in softer or harder target mediums ("work pieces"), such as, for example, Douglas fir and yellow pine (a hard stud-grade wood). Such staples, in particular embodiments, may include staples having at least a 9/16 inch leg height.

To effectively perform in commercial conditions, the device 10 may be capable of discharging staples into various target work pieces (herein after referred to as "work pieces"), such as varieties of wood, plastic, and composite joists, framing, studs, and other structures to secure various target objects, such as cables, conduit, and wire. Because staples may need to be driven into objects that are more or less resistant (i.e., harder/denser or softer/less dense), device 10 may provide elevated driving power, which may be variable. In other embodiments, device 10 may be capable of storing and discharging nails (nails and brad nails) and other driven fasteners.

In particular embodiments, the fastener driving device 10 utilizes a solenoid 12 and a high voltage capacitor 100 to drive insulated and non-insulated staples into a desired object. The fastener driving device 10 may also utilize other drive-generating sources (i.e., a fastener or striker driving means), such as, for example, a fly wheel, a compressed spring, a pneumatically or combustion driven piston, to drive the fasteners.

In one embodiment, device 10 generally includes a solenoid 12, a drive assembly 20, a fastener housing 40, a high voltage capacitor 100, a power source 104, control circuit 110, and a body 58.

Device 10 may generally utilize a solenoid 12 to drive a fastener, such as an insulated or non-insulate staple. As shown in FIG. 6, solenoid 12 generally includes a coil 13, a ferrous slug referred to as an armature (or plunger) 14, and a pushrod 16. When electrical current is passed to solenoid 12, the coil 13 is energized. Subsequently, the energized coil produces a magnetic field that attracts armature 14 inward toward the center of the magnetic field (i.e., the coil). This causes pushrod 16 to translate downward, which provides the force transferred to the drive assembly 20 for driving a target fastener into a target work piece. The strength of the magnetic field and the corresponding plunger driving force may be increased or decreased by increasing or decreasing the voltage, respectively. Each solenoid generally includes a maximum stroke, which is the maximum distance an armature 14 or pushrod 16 may travel in any one direction. It is contemplated that a solenoid may have an end stroke that provides a stroke distance that is different than the maximum stroke. Further, the end stroke may be adjustable. In one example, the end stroke is specified to end at the coil's maximum magnetic field. If the armature 14 travels beyond the intended end stroke or position, it may be pulled back by the coil if desired. A stop 18 may be included within the solenoid housing to limit the stroke and protect the housing from armature 14 impact. In one embodiment, stop 18 is a spring or bumper formed of a resilient elastic material.

In one embodiment, device 10 may include an armature-retention mechanism to maintain armature in a ready-position, in which the armature 14 awaits deployment towards coil 13 for fastener discharge. In one embodiment, the armature-retention mechanism comprises a retaining groove 15a located along a surface of armature 14, and one or more spring-loaded ball bearings 15b, located within housing 58, that engage retaining groove 15a when armature 14 is in a desired position, such as a ready-position (ready to fire). This allows armature 14 to be retained in a pre-firing position away from the solenoid's coil 13. This may aid in preventing unintentional staple discharge or separation. Further, such mechanism may retain the armature 14 in a ready-position when the coil is initially energized, so that armature 14 is not drawn toward the coil 13 in a gradual manner. Instead, attractive forces build between the coil 13 and armature 14 until the forces are able to overcome the retention forces applied by the spring-loaded ball bearings 15b. Upon release by the ball bearings 15b, a sling-shot effect may be achieved. This causes the armature 14 to be immediately released at a higher force which increases the driving force and momentum provided by pushrod 16. Finally, by utilizing a spring-loaded retention means as described herein, a user does not have to release the armature, but rather, the armature 14 is released automatically when the solenoid-generated force overcomes the spring forces. It is contemplated that other means may be used to retain armature 14 in a position, such as spring-loaded clips, resilient gaskets or clips, or other mechanical or electromagnetic means.

Because is has been found that photoflash capacitors, as well as other components and connections of the stapler electronics, can fail prematurely due to the impact loads generated during stapler operations, improvements to solenoid 12 have been made to reduce the resulting shock (i.e., impact loads) emanating from the solenoid 12. With general reference to FIG. 40, one improvement comprises providing a damper bushing 504 that partially absorbs the impact loads generated by the armature (or plunger) 14 as it impacts the bottom of solenoid 12. The bushing 504 is generally positioned between the armature 14 and the solenoid frame 500, as other objects (such as additional bushings and/or a stop 502) may be positioned between the armature 14 and the bushing 504, and/or between the bushing 504 and the frame 500. In the exemplary instance shown in FIG. 40, a bushing 504 is retained within a channel of a stop 502. The stop 502 is constrained with the frame 500 to provide an aperture for guiding the stroke of the armature 14. The top of stop 502 is contoured in adapting association with the bottom of armature 14, to provide clearance there between when the armature 14 reaches its maximum stroke. Bushing 504 is formed of any suitable material, including any elastomer or energy-absorbing elastomer. In particular applications, an EPDM having a hardness of 60-80 shore A is used.

Figure 41:
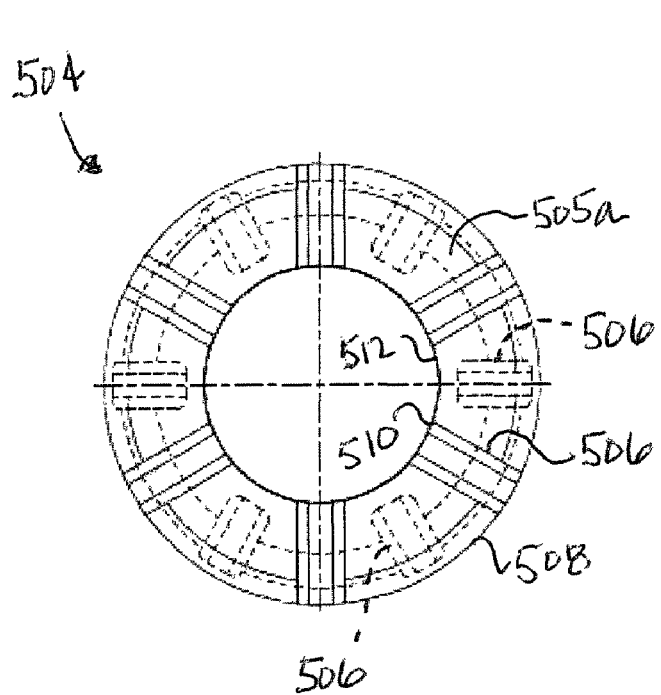
FIG. 41 is a top view of a damper bushing of the solenoid shown in FIG. 41.
Figure 43:
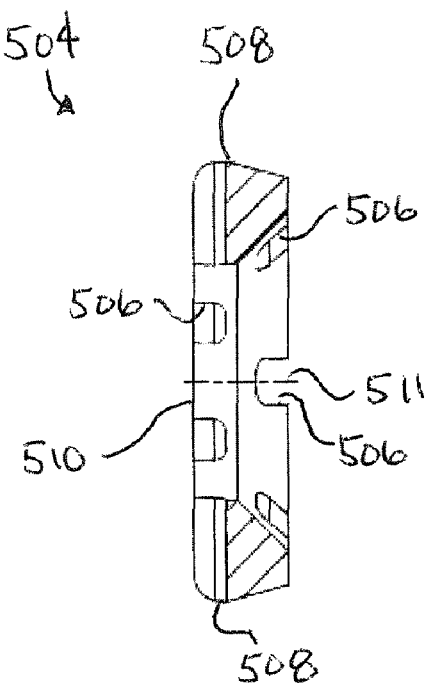
FIG. 43 is a side cross-sectional view of the damper bushing shown in FIG. 42.
Figure 42:
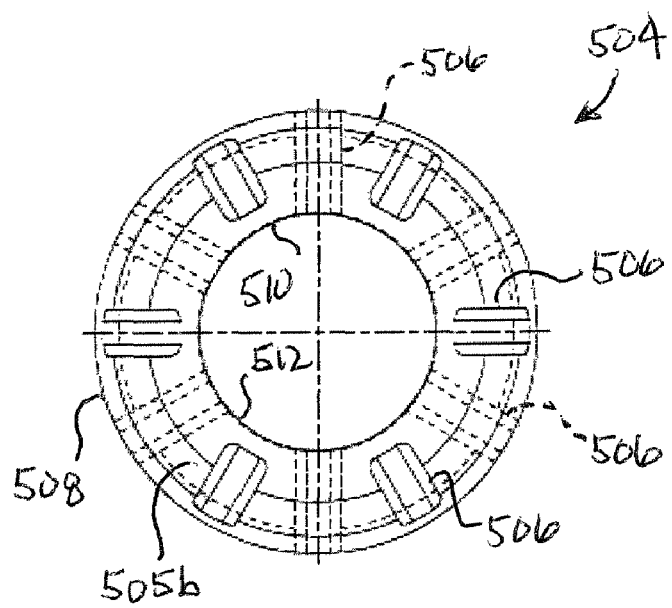
FIG. 42 is a bottom view of the damper bushing shown in FIG. 42.

With reference to FIGS. 41-43, the bushing 504 generally includes voids 506 that allow the surrounding portions of the bushing to deflect and deform, which better absorbs and dissipates the loads received from the impacting plunger to reduce the amount of force transferred to the housing (or frame). As shown, the voids 506 are spaced about the annular bushing 504, and extend along each top and bottom end surface 505a, 505b in a relatively staggered arrangement. In the embodiment shown, six (6) voids 506 are provided on each end surface 505a, 505b of the bushing, spaced equally by approximately 60 degrees. The voids 506 also extend between outer and inner diameters of each top and bottom end surface to form channels. In other instances, other void arrangements may be employed. For example, other quantities, and uniform or non-uniform spacings, of voids 506 may be used. Further, voids 506 may exist on any one or more exterior surfaces of the bushing, or may exist on both top and bottom end surfaces 505a, 505b in a non-staggered relationship. In still other instances, the voids 506 may be positioned within a thickness of the bushing, or along end surface 505a, 505b without extending fully between the outer and/or inner diameters.

Bushing 504 includes an outer, radial side 508 (corresponding with an outer diameter of the bushing), and an inner aperture 510 (bounded by an inner diameter of the bushing and having a central axis) that defines an inner, radial side 512. With reference to FIG. 43, end surfaces 508, 512 extend axially at an angle biased from a purely axial direction 511 of the bushing (i.e., relative to the central axis 511 of aperture 510). This biased extension facilitates further energy-absorbing deformation of the bushing, which further reduces the transfer of force to the frame and ultimately to the capacitor and other stapler components. In the embodiment shown in FIG. 43, the outer side surface 508 extends approximately 15 degrees from the bushing's axial direction (central axis), while the inner side surface 512 extends at approximately 45 degrees from the central axis.

Figure 44:
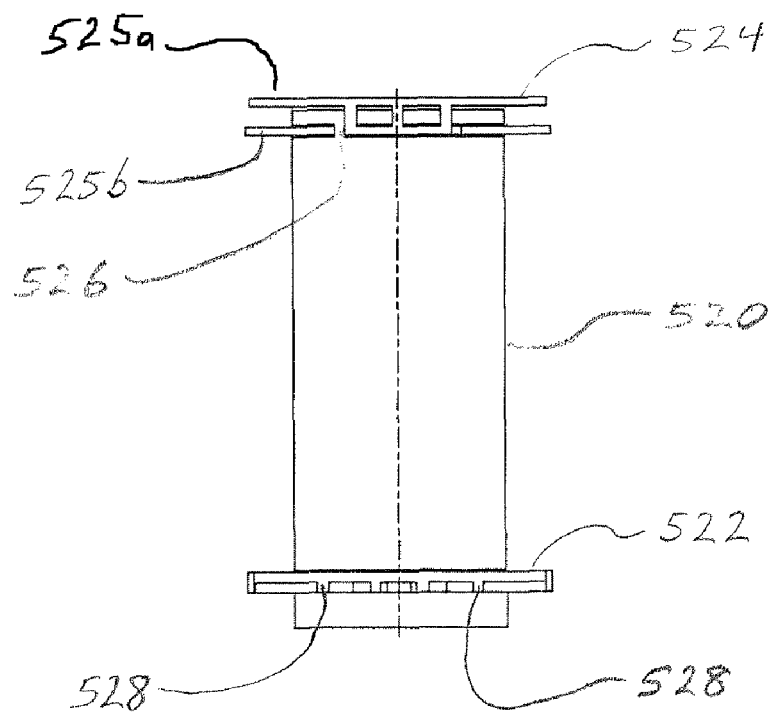
FIG. 44 is a side view of the solenoid core shown in FIG. 41.
Figure 45:
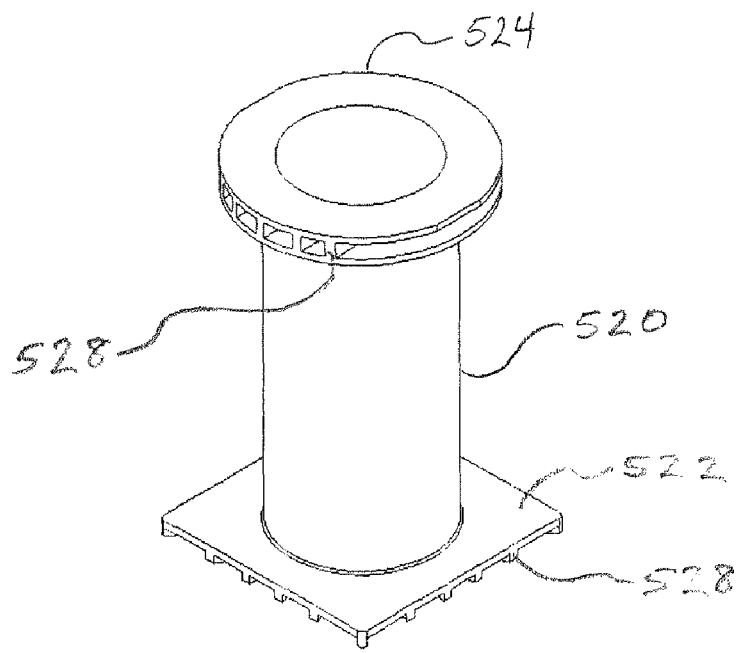
FIG. 45 is a perspective view of the solenoid core shown in FIG. 44.

With reference to FIGS. 44-45, a core 520 of solenoid is shown with top and bottom end caps 522, 524. Wound between end caps 522, 524 and along core 520 is a coil for creating a magnetic field for operation of solenoid 12. Bottom cap 524 includes a pair of flanges 525a, 525b forming a channel there between for receiving and protecting a wire extending between the coil and a power source or circuit. An access aperture 526 is provided in the flange 525b for receiving such wire from the coil, which directs the wire into the channel between flanges 525a, 525b. In lieu of protecting the wire within end cap 524, the wire may become pinched below the weight of the coil, especially when accelerated downward during impact from solenoid operation. End caps 522, 524 may include strengthening ribs 528 to improve their strength and durability.

Drive assembly 20 engages pushrod 16, and transfers the force and momentum generated thereby to discharge a target fastener. As shown in FIG. 6, drive assembly 20 includes a striker 22, striker guide 26, return spring 28, and plunger coupling 30. Plunger coupling 30 mechanically associates striker 22 with pushrod 16. As the force generated by pushrod 16 is transferred through coupling 30, striker 22 is forced downward through the striker guide 26. Ultimately, a bottom edge 23a of striker 22 contacts a target fastener, such as a staple, for discharge. If the fastener is part of a clip, striker 22 causes the target fastener and any insulation associated therewith to shear from the clip.

Figure 7:
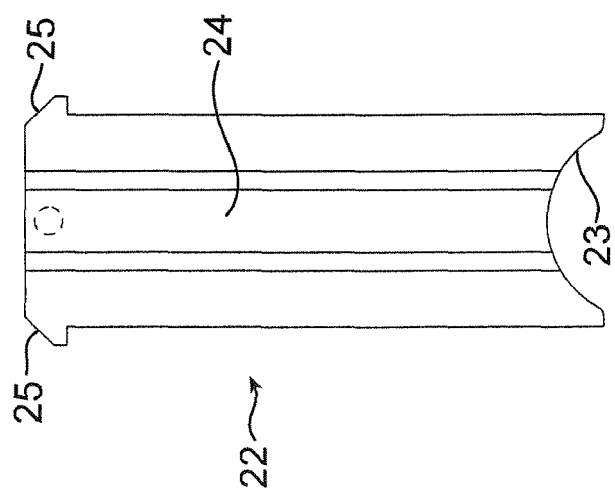
FIG. 7 is a side view of the fastener striker, in accordance with an embodiment of device disclosed in FIG. 1.
Figure 8:
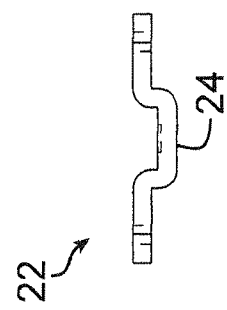
FIG. 8 is a top view of the fastener striker shown in FIG. 7.
Figure 12:
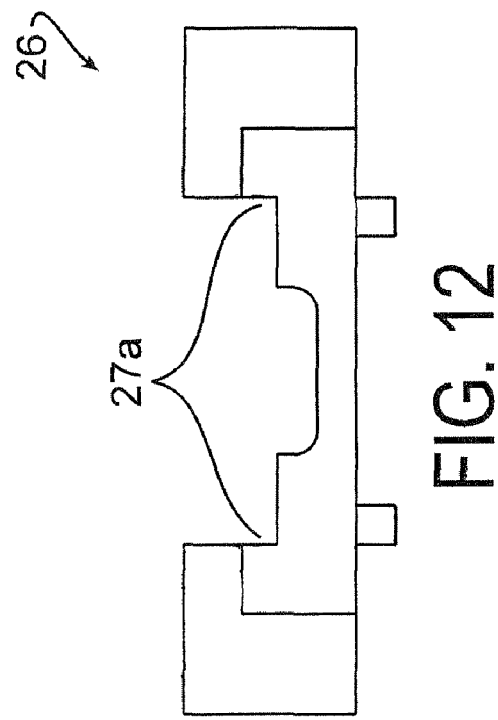
FIG. 12 is a top view of the striker guide shown in FIG. 11.
Figure 11:
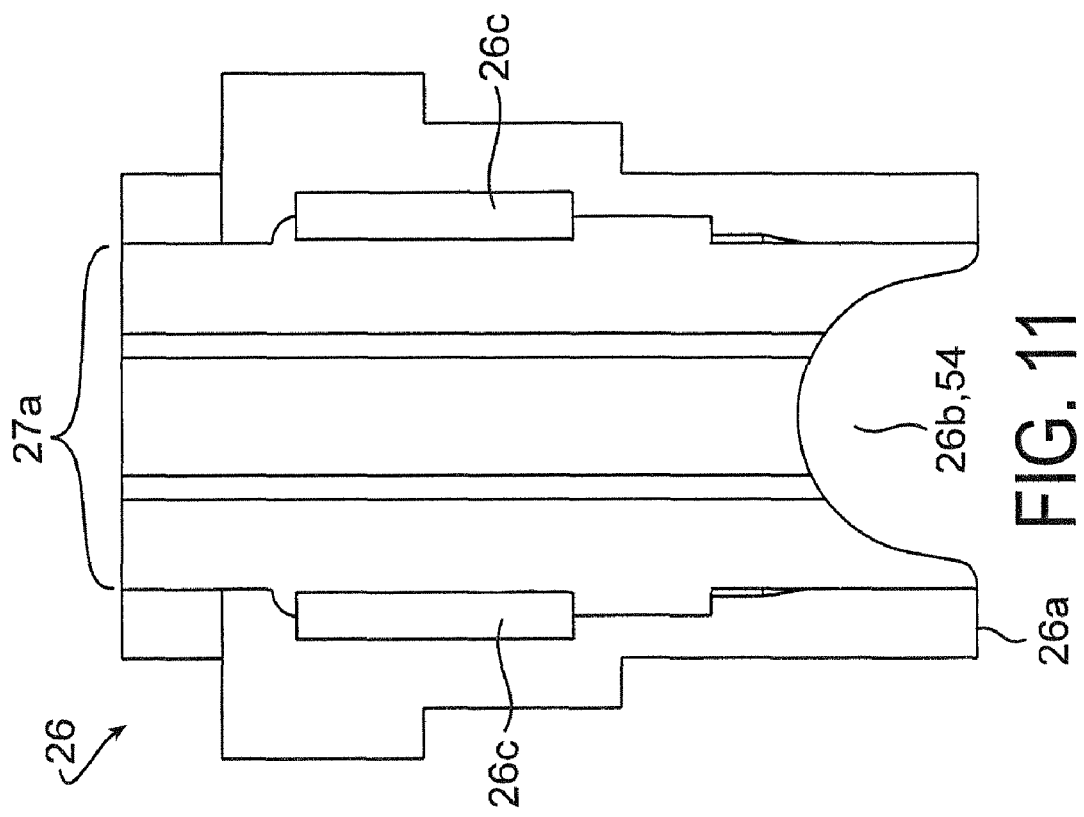
FIG. 11 is a rear view of the striker guide, in accordance with an embodiment of the device disclosed in FIG. 1.
Figure 13:
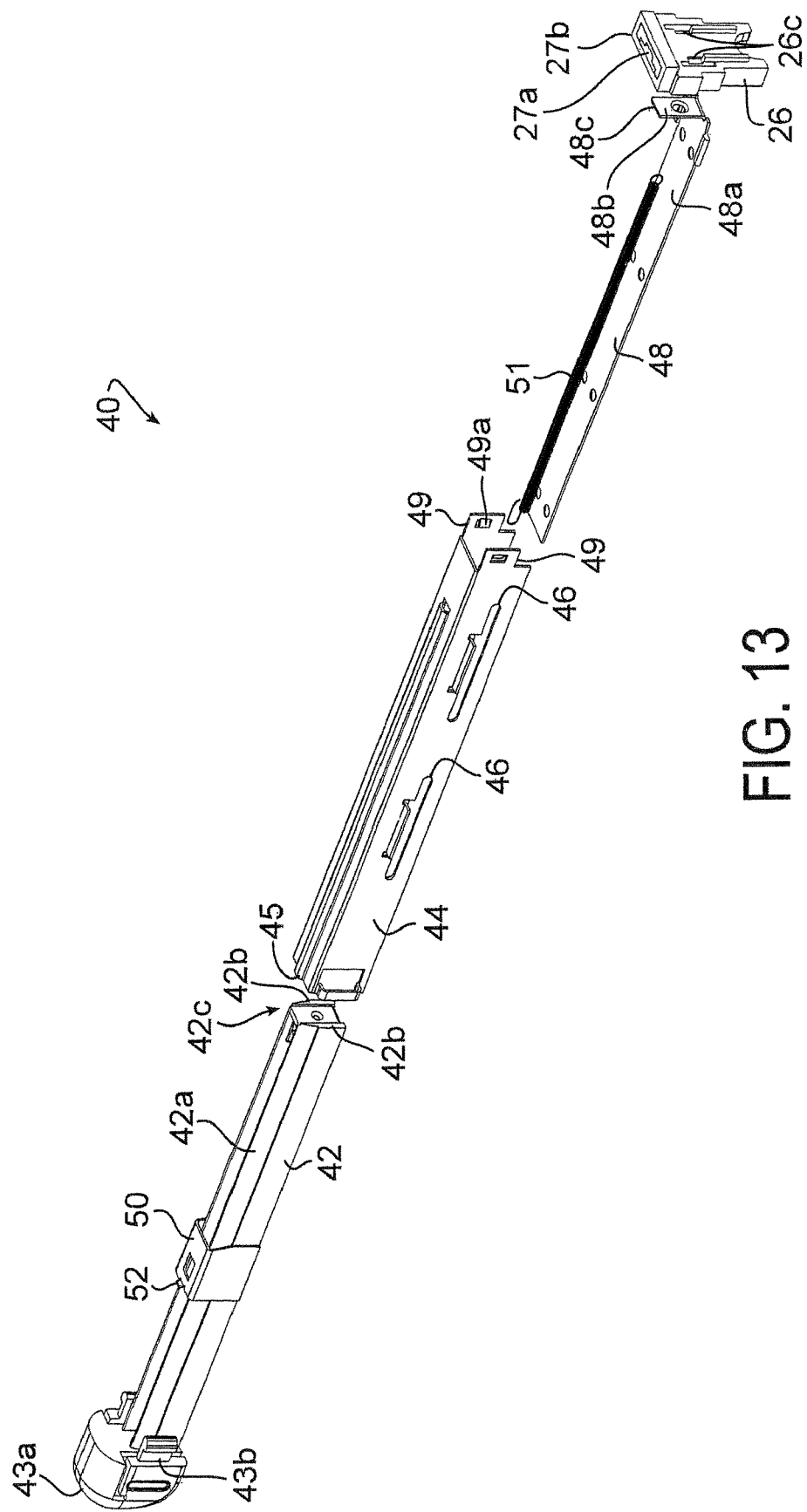
FIG. 13 is an exploded view of the fastener housing, in accordance with an embodiment of the device disclosed in FIG. 1.

Striker 22, in one embodiment shown in FIGS. 7-8, is the component that engages a target fastener via a bottom edge 23, and discharges the target fastener into a desired work piece. Striker 22 operates within striker guide 26 by virtue of a track 27a, which extends longitudinally along striker guide 26. Staples or fasteners are discharged outwardly from a bottom of striker guide 26, by way of track 27a. Striker 22 is constrained within track 27a by retention member 27b, which slides over the top of striker guide 26 and about striker 22. It is contemplated that side portions of track 27a may extend into guide 26, so that striker 22 is constrained within track 27a by guide 26, without use of member 27b. Arrangements other than those discussed may also be used to guide striker 22 along a track between pre-firing and discharged positions.

Traditionally, staples strikers 22 have provided linearly flat bottom edges 23. This generally allows the flat bottom edge 23 of striker 22 to evenly apply a driving force across a flat staple bight (or crown) 84. However, it may be desirous to provide a more shaped staple (insulated or non-insulated) 60, 80 when securing particular target objects to a work piece. Therefore, is may be desirous to deform a staple (insulated or non-insulated) 60, 80 about a target object, such as cable, conduit, wire, or the like. This may occur while the staple 60, 80 is being driven into the work piece. The deformed staple may improve securement of the target object by providing a shape having more contact surface area for resisting any movement of the target object, while reducing the likelihood of damaging the target object if the staple is overdriven, as the force is now dispersed along a larger area.

To provide a deformed driven staple (insulated or non-insulated), the bottom edge 23 of striker 22 may include, or form, a desired shape. In one embodiment, the bottom edge 23 includes an arcuate shape to allow the staple to form about the object being secured. It is contemplated that the shape of bottom edge 23 may be symmetrical or asymmetrical, or may comprise any desirous shape, such as, without limitation, an arc, a half-circle, or a triangle (i.e., an inverted V-shape), or may comprise an asymmetric, linearly-inclined (guillotine) edge. One purpose of this asymmetric striker bottom edge 23 may be to increase the shear force applied to the staple and/or insulation, for improved shearing of the staple and/or insulation from a strip or clip. An asymmetrically arcuate or inverted V-shaped striker 22 combines the benefits of the asymmetric striker, with the benefits of a shaped staple to provide a staple that can better conform to the shape of a target object while potentially reducing the amount of power needed to shear any staple or insulation for discharge.

Figure 22A:
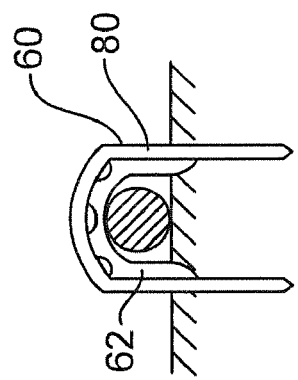
FIG. 22A is a side view of an insulated staple driven into a work piece to secure a target object, in accordance with an embodiment of the present invention.

When the shaped striker 22 engages a staple (insulated or non-insulated) 60, 80, the shaped bottom edge 23 engages the staple bight 84. Bight 84 may be deformed generally into the shape of bottom edge 23, or some other shape that is desirable. For example, if a bottom edge 23 having an inverted V-shape does not form a staple bight 84 into the inverted V-shape, it may instead form the bight section 84, or a portion thereof, into a more rounded shape. The ability of a staple 60, 80 to deform, and the extent thereof, is in part dependent upon the material and design of staple 80 and any insulation 62, and the resistance provided by the target object. It is contemplated that bottom edge 23 may be approximately as wide as or wider than the width of staple 60, 80 (i.e., the width of bight 84); however, it is contemplated that bottom edge 23 may have a width less than the staple 60, 80 width. A discharged insulated staple 60 is shown in FIG. 22A, in an exemplary embodiment, where it is shown to have been driven into a work piece by a shaped striker. The insulated staple 60 is also securing a target object. A non-insulated staple 80 would look similar to FIG. 22A, except that no insulation 62 would be present so to allow staple 80 to instead engage the target object.

Striker 22 may also include a gusseted, embossed, or ridged portion 24 that extends along a length (height) of striker 22, and outward from a vertical plane of striker 22. This gusseted portion 24 increases the column strength of striker 22 to better resist any buckling of striker 22 under the high forces generated by this device 10 to drive the target fasteners. Forces experienced by the striker 22 may vary, according to the power provided by the capacitor 100, which may depend on various factors, such as the hardness of the target medium, the desired fastener drive depth, and whether the striker 22 is to bend or deform a discharged staple about the target object that the staple is securing.

Striker guide 26 provides a bottom edge 26a for engaging a medium targeted to receive a discharged fastener. This bottom edge 26a provides a point of contact between the target medium and device 10, which allows a user to forcefully direct the device 10 against the target medium in anticipation of fastener discharge. The engaging bottom edge 26a may be non-linear, in that the bottom of the guide 26 may include a recessed shape or shapes 26b, which may be similar to a shape of the striker bottom edge 23. This recess may allow a target object that is to be secured by the fastener to enter the guide 26 and align the target object between the legs of a discharging staple, which may prevent any potential damage to the target object. In this instance, the recess 26b is an alignment guide 54, as discussed below. Further, full consumption of the target object within the recess 26b may allow the bottom edge 26a of guide 26 to continue its engagement with the work piece. Finally, placement of a target object within the recess 26b may allow the target object to engage a safety blade 56, which closes a safety switch 174. Safety switch 174 may have to be closed before a staple can be discharged. Device 10 may still remain in contact with the underlying work piece for driving support. Striker guide 26 may also guide a fastener deployed from its stored position through complete discharge and engagement with the target work piece.

Figure 9:
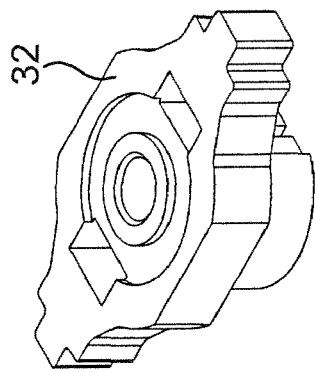
FIG. 9 is a perspective view of the coupler block, in accordance with an embodiment of device disclosed in FIG. 1.
Figure 10:
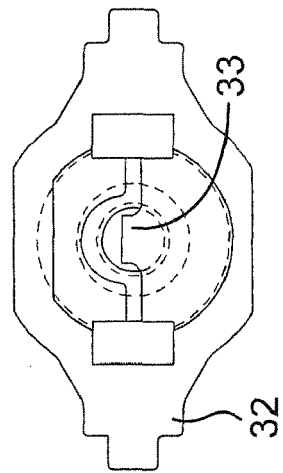
FIG. 10 is a bottom view of the coupler block shown in FIG. 9.

Coupling 30, in one embodiment shown in FIGS. 9-10, comprises a block 32 that accepts a terminal end of pushrod 16. Pushrod 16 may be secured within block 32 by any acceptable means, such as, for example, an adhesive, a fastener or pin, friction, or any other mechanical interference. A ridge 33 may be included to engage and constrain pushrod 16 within block 32. In one embodiment, a clip 34 is inserted through apertures in block 32 to engage flanges 25 of striker 22. Flanges 25 allow clip 34 to constrain striker 22 within the drive assembly 20, and returning striker 22 to a ready position after staple discharge. It is contemplated that other known or unknown means of operably coupling striker 22 to pushrod 16 may be used, such as, for example, a pin, bolt, bracket, or weld.

Spring 28 operates to return the pushrod 16 and armature 14 to a ready position, which may include the engagement of ball bearings 15b with retaining groove 15a. In one embodiment, spring 28 is a compression spring that extends below coupling 30, and operates between coupling 30 and the striker guide 26, or a mount located on body 58. Spring 28 may be a tapered spring, which reduces the compressed height of the spring 28 and, consequently, may reduce the overall height of device 10. In other embodiments, spring 28 may be located in other places, such as near the top of solenoid 12 or armature 14. Spring 28 may also be a torsion spring or an extension spring, which may be located, for example, atop solenoid 12 in association with armature 14 or between coupling 30 and solenoid 12.

Typically, in an effort to drive fasteners into tight spaces and to provide improved visibility of fastener alignment and discharge, striker guide 26 may be located close to the front tip of stapler/device 10. This is often called a blunt nose orientation. In one embodiment, generally shown in the FIGS. 1-5, the longitudinal axis of the solenoid 12 (or the pushrod 16) generally extends in a vertical direction within device 10 and is generally perpendicular to the main rail 42, or parallel to the direction of staple discharge. Because the solenoid 12 is much wider than pushrod 16, it may be difficult to discharge staples at or near the front-most tip of device 10, which may make it difficult to discharge fasteners in tight or abutting locations. In an embodiment exemplarily shown in FIG. 6A, a cantilever 36 may generally extend from the pushrod 16 in a transverse (lateral or longitudinal) direction of device 10, towards the front of the device 10 to move striker 22 and the fastener discharge closer to the tip or front of the device 10. Consequently, when pushrod 16 is actuated, the displacement of the pushrod 16 is transferred to striker 22 via cantilever 36. Cantilever 36 may comprise a coupler extending between striker 22 and pushrod 16. or may comprise an arcuate striker 22, which may be flexible. In an alternative embodiment, the solenoid 12 may be inclined with regard to the main rail 42, or the direction of staple discharge. This orientation could eliminate the need for the cantilever 36, or in the very least, require an arcuate or angled mechanism to transfer the driving force to the fastener to allow the fastener to engage the work piece perpendicularly. The arcuate or angled mechanism, which may be flexible, may comprise striker 22 or another mechanism.

Fasteners are generally contained within a fastener housing 40. Housing 40 comprises a design that provides both structural integrity and rigidity, and interchangeability. In one embodiment, shown in FIGS. 13-17, housing 40 may store insulated and/or non-insulated staples and may include a removable main rail 42 that operates within a cavity defined by top rail 44 and the bottom of the body 58. Top rail 44 may be attached to striker guide 26 to improve the rigidity and structural integrity of device 10. In one exemplary embodiment, top rail 44 generally attaches to striker guide 26 by way of tabs 49, which are inserted into apertures 26c of striker guide 26, and secured by way of clips 49a. It is contemplated that any other known means, such as fasteners, adhesives, or the like may be used to secure top rail 44 to the striker guide 26, as well as securing tabs 49 to striker guide 26. A removable fastener may also be used to more easily remove striker guide 26 from device 10. In one embodiment, a de-sta-co clamp or the like may be used to removably secure top rail 44 to striker guide 26. In alternative embodiments, other means of attaching may be used to join top rail 44 to striker guide 26 in lieu of tabs 49, such as, without limitation, welds or clips.

Figure 14:
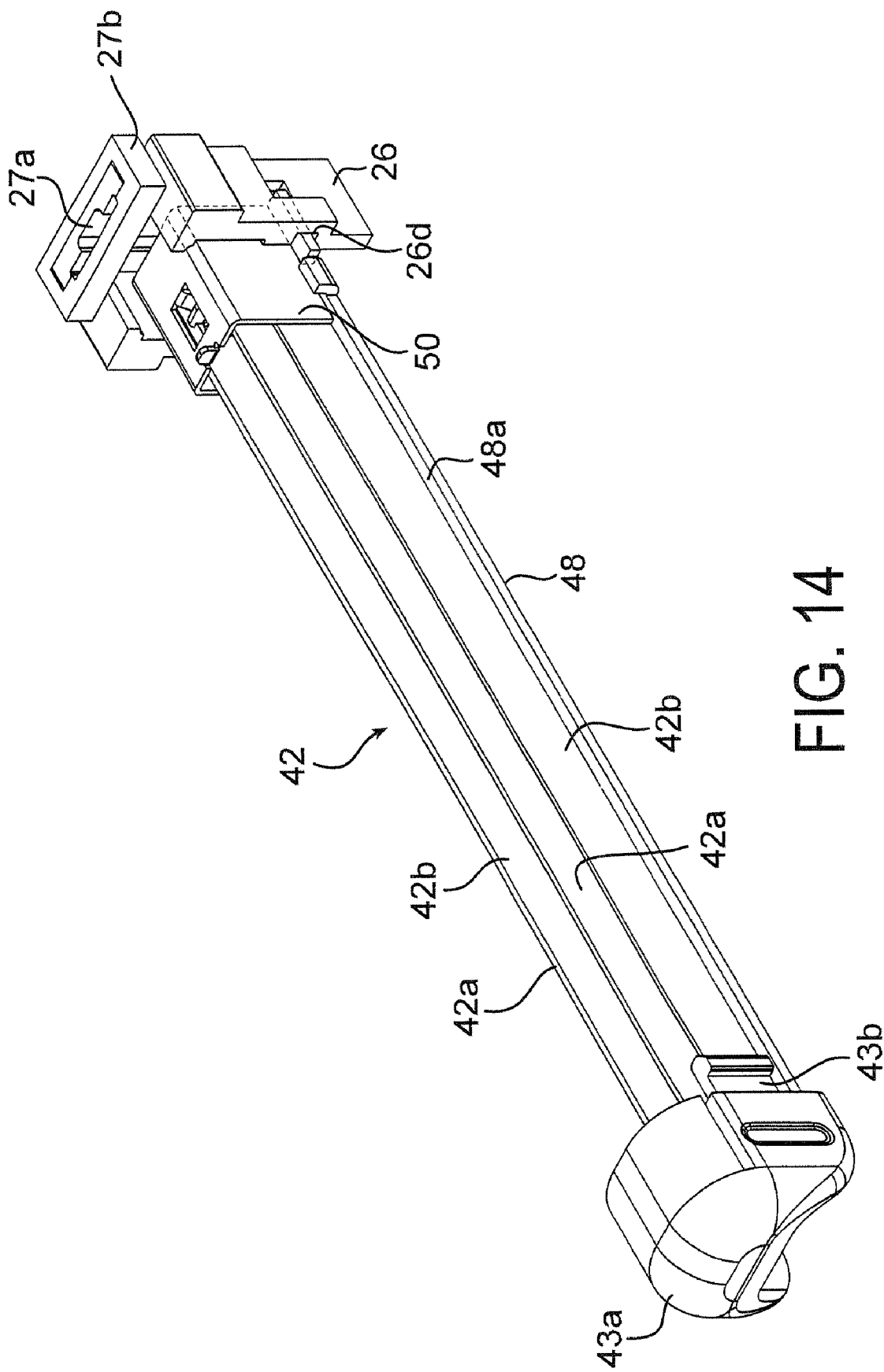
FIG. 14 is perspective view of the fastener housing, showing a second embodiment of the striker guide, in accordance with the present invention.
Figure 15:
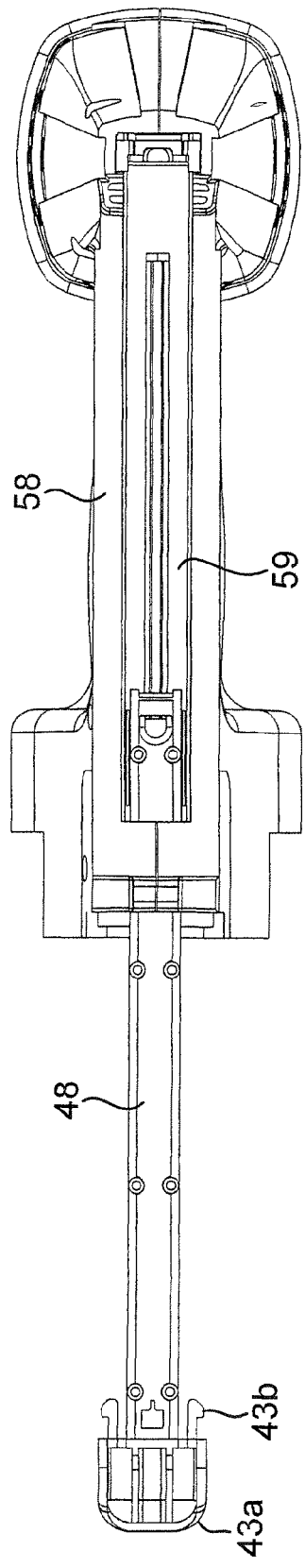
FIG. 15 is a bottom view of the device showing the main rail partially removed, in accordance with an embodiment of the device shown in FIG. 1.
Figure 16:
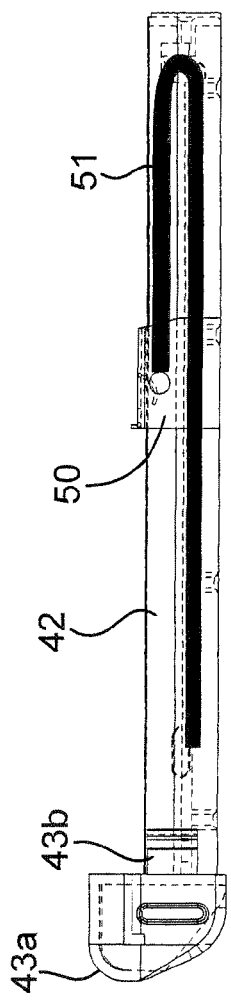
FIG. 16 is side view of the main rail showing the spring engaged with the pusher, in accordance with an embodiment of the device shown in FIG. 1.
Figure 17:
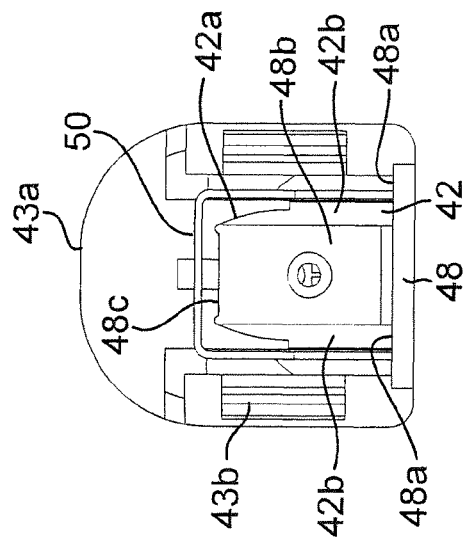
FIG. 17 is an end view of the main rail, in accordance with an embodiment of the device shown in FIG. 1.

In particular embodiments, a bottom plate 48 is attached to the bottom of main rail 42, and may support insulated and/or non-insulated staples stored along the main rail 42 on bottom plate surface 48a, as shown in FIG. 14. Bottom plate 48 may be inserted into striker guide 26, such as, for example, by way of opening 26d as shown in FIG. 14, so that striker guide 26 may support bottom plate 48 when experiencing shear forces during staple discharge. It is contemplated that striker guide 26 may support or integrate with bottom plate 48 by way of other means known to one of ordinary skill in the art.

Main rail 42 generally maintains the staples, whether the staples are in a unified clip or independently exist along main rail 42. Main rail 42 may comprise one or more vertically members 42b, which may include top surface 42a. Spring 51 maintains pusher 50 in forceful engagement with the staples along main rail 42, and forcefully directs the staples into a series of insulated and/or non-insulated staples, and towards the striker 22 for discharge at a discharge end 42c of main rail 42. Pusher 50 may include a tab 52 that operates within a groove 45 of top rail 44, where the translation of tab 52 and, therefore, pusher 50, is maintained along a single path defined by groove 45. It is contemplated that other means may be used to direct or control the translation of pusher 50.

Fastener housing 40 may also include windows 46 to visibly determine if, and approximately how many, fasteners remain in device 10. In one embodiment, at least two windows are located along at least one of the opposing longitudinal sides of top rail 44. Although each window 46 may be capable of displaying any desired number of staples, in one embodiment each window 46 is capable of displaying 22 staples. In one embodiment, fastener housing 40 is capable of storing 97 staples. In this embodiment, a window 46 is positioned along the length of top rail 44 so that a maximum of 17 staples may remain hidden within housing 40, that is between the window 46 and the striker guide 26. Therefore, when the staples housed within housing 40 are no longer visible in a window 46, the housing 40 is capable of accepting two standard 40-count staple clips (or one standard 80-count clip) since housing 40 is capable of holding 97 staples (2-40 count clips equals 80 staples, plus the maximum of 17 remaining equates to a maximum of 97 staples, which is within the capacity of housing 40). This concept and strategy may be employed with any capacity housing 40. Further, any number of windows 46 may exist, which may also be located at any location along housing 40.

In one embodiment, housing 40 may be capable of storing and discharging insulated and/or non-insulated staples. In achieving this dual capability, in one embodiment, non-insulated staples may rest along bottom plate surface 48a, while insulated staples may rest along a top surface 42a of main rail 42. It is also contemplated that insulated and non-insulated staples may both rest on either the top 42a of main rail 42 or on the bottom plate surface 48a. Because these surfaces may have to resist the shearing forces directed by striker 22 against staples for separation and discharge, it may be desirous to form these surfaces or elements from, or to provide additional elements made from, harder or more durable materials. Accordingly, bottom plate 48 and at least a top surface 42a of main rail 42 may be formed of steel, or any other durable metal or plastic to improve the durability of device 10 by better resisting the forces applied by striker 22. Bottom plate 48 may also include a vertical tab 48b, which extends vertically along the main rail discharge end 42c, and includes a top surface 48c. Top surface 48c, as well as main rail top surface 42a, may operate as shear surface for detaching insulated staples from a staple clip. It is contemplated that such surfaces may also operate as a shear surface of non-insulated staples. The shear surfaces resist, at least in part, the shearing force applied by striker 22, which is received by the target staple and distributed to the staple clip. The shear surfaces resist the shearing force, so that the target staple may separate from the staple clip or strip for proper discharge. Just as bottom plate 48 may be made from a more rigid and durable material, so may tab 48*b*, which improves the durability and effectiveness of top surface 48*c*. It is contemplated that tab 48*b* may be independent of bottom plate 48, and form an independent component of device 10. If an insulated or non-insulated staple is resting on bottom plate surface 48*a*, in lieu of tab top surface 42*a*, as generally shown in FIG. 14, bottom plate staple surface 48*a* operates as the shear surface for the staple being discharged.

In other embodiments, separate staples and staple insulation may be inserted into housing 40 to ultimately provide a driven insulated staple. In these embodiments, the staples and insulation may be stored separately within housing, where the insulated staple is formed at the time of discharge, or each may be stored together (with or without being attached to one another) for ultimate discharge. Insulated and non-insulated staples may be accepted individually or as a plurality in clip form. To provide this capability, a single pusher capable of pushing both the staples and insulation may be provided, or a separate pusher may be provided for the insulation.

Because various types of fasteners may be used in device 10, it is contemplated that housing 40 or a portion thereof, such as the main rail 42, may be removable so to provide interchangeable magazines containing different types of fasteners. This allows a user to quickly remove a first magazine that is empty or that contains one type of fastener, such as insulated staples or brads, and quickly insert a second magazine that is full or that contains a second type of fastener, such as non-insulated staples. In one embodiment, main rail 42 and top rail 44 are removable, such as a single magazine unit, by detaching top rail tabs 49 from striker guide 26. In another embodiment, main rail 42 and bottom rail 48 form a removable magazine. The removable magazine may also include a handle, such as grip 43*a*, as disclosed below, and a means for securing the magazine to the device 10, such as clips 43*b* or any other securing means known to one of ordinary skill in the art.

In the embodiment shown in the figures, the fasteners may be inserted into the housing 40 either through an aperture 59 in the bottom of body 58, or directly onto the main rail 42, when main rail 42 is retracted from top rail 44. Loading the fasteners into the body aperture 59 is commonly referred to as bottom loading. Aperture 59 may also be useful in providing access for the removal of any fastener jams occurring near or within the striker guide 26.

The exterior end of the main rail 42 may include a grip 43*a* to better grasp and retract main rail 42. One or more clips 43*b* may be included to secure the main rail 42 to device 10 for operation of device 10. The internal end remains open for the purpose of exposing fasteners into striker guide 26 for engagement with striker 22. In other words, pusher 50 directs the fasteners toward the internal end of main rail 42 to ready a fastener for discharge. Top rail 44 may coordinate with striker guide 26 to achieve an integrated housing 40.

Figure 28:
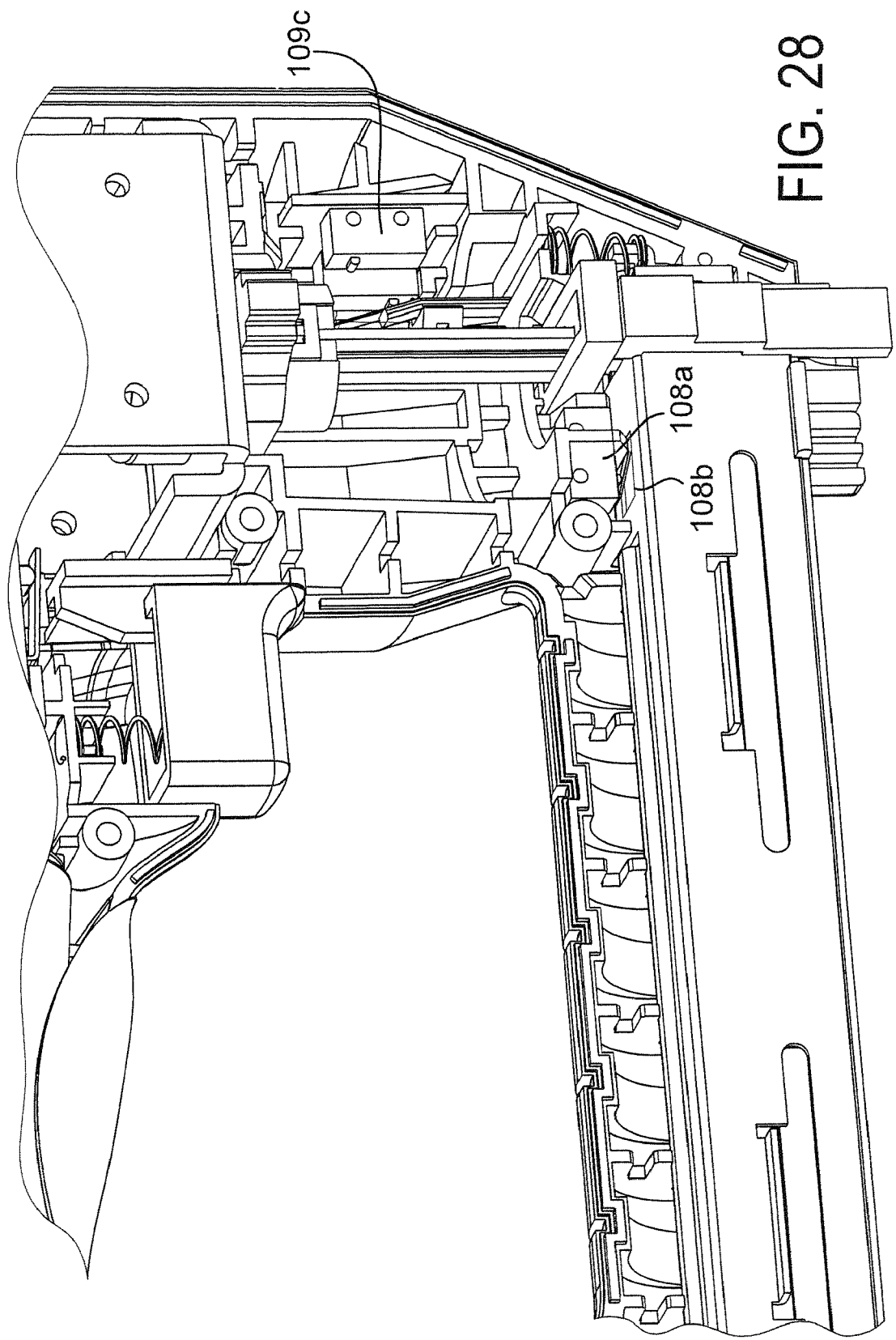
FIG. 28 is a top-side perspective view of an embodiment of the device shown FIG. 1, made in accordance with the present invention, showing a variable power sensor capable of varying power based upon the height of a target object to be secured, and a low staple sensor.

In one embodiment, device 10 may include a low staple sensor 108*a* that may determine if there is a low quantity, and/or no quantity, of fasteners remaining within fastener housing 40. It may be desirous to know whether the housing 40 is empty, to prevent any dry firing (firing without a fastener) to prevent damage to device 10 and/or any target object adjacent the fastener discharge of device 10. This sensor 108*a* may be in communication with control circuit 110 and a safety switch, such as 174, so to prevent prevent the firing of device 10 when the sensor 108*a* indicates that no staples remain. Sensor 108*a* may comprise any sensor capable of sensing staples or pusher 50 within sensor housing 40, and may be, without limitation, an optical, electromagnetic, or physical sensor. Such sensors may specifically include, without limitation, metal detectors, pressure sensors, position sensor, infra-red/visible light sensor, or a proximity sensor. In one embodiment, as shown in FIG. 28, sensor 108*a* is a physical sensor that engages staples through an opening 108*b* in fastener housing 40. In such embodiment, if there is no staple to engage, sensor 108*a* indicates such to control circuit 110. Upon such indication, control circuit 110, or a microprocessor or the like, may know how many fasteners remain, such as, for example, by knowing the location of the sensor 108*a* along main rail 42 relative to the discharge end 42*c*, and the size or width of each of the staples. Consequently, control circuit 110, or a microprocessor or the like, may count the quantity of subsequent fastener discharges to determine when no fasteners remain. When determining that no fasteners remain, or an approximation thereof, control circuit 110 will prevent the stapler from firing until staples are replaced, such as by way of safety switch 174. As mentioned above, low staple sensor 108*a* may monitor and sense the position of pusher 50. In this embodiment, low staple sensor 108*a* would identify when the pusher 50 is in a particular location along main rail 42, which may indicate that there is approximately a certain quantity of staples remaining along rail 42, or that the pusher has reached the discharge end 42*c* and that no more staples remain.

Along the bottom side of the driving device 10 where fasteners are discharged, there may be any number of alignment guides 54 that function to align the fastener with respect to a target object, such as a cable, conduit, wire, pipe, etc. The alignment guides 54 may also serve to grip the cable, etc. so that the user can pull a target cable, wire, or the like taught prior to deployment of a fastener, for the purpose of eliminating any slack in the target object. Today, electricians have to pull on the cable prior to and independent of securing the cable with a staple. Therefore, the guides 54 would assist users by eliminating a step in the process and freeing a hand for other uses. This becomes particularly advantageous when a user is working along a vertical wall or overhead.

In particular embodiments, striker guide 26 extends outwardly beyond the bottom side of the stapler 10 to include a recess 26*b*, which functions as, or forms, an alignment guide 54. In one embodiment, a guide 54 positions a target object relative to a staple discharge, so to direct the discharged staple legs about a target object, and thereby reducing the chance that the discharged staple would damage the target object, which may be an object, such as a cable or wire, being secured to a work piece. In other embodiments, guides 54 may align a target object for the purpose of driving a fastener through the object, such as for securement thereof, which is different than protecting the object from fastener penetration. Further, guides 54, including striker guide 26, may be removable to allow the use of different guides, which may be specifically used in association with different types of target objects or different applications. In particular embodiments, striker guide 26 may comprise multiple interconnected segments, wherein one segment includes an alignment guide 54, which may be removable. Still further, removable fastener magazines (discussed above) may include different guides 54 for use with specific fasteners or applications. For example, device 10, or a removable fastener magazine, may include guides 54 for use with specific fasteners for securing specific specifically securing, for example, low voltage wires, such as Category 5—Cat 5, Co-ax, and telephone wires, metal clad (MC), armored cable (AC), or flexible metallic conduit (FMC), Electrical Metallic Tubing (EMT), rigid conduit, PVC conduit, or copper or PVC water pipe. Device 10 may also include laser guides to improve a user's ability to align the device 10 with a target object or target work piece. Finally, device 10 may include a sensor that determines whether a target object is centered within a guide 54. This guide 54 may be located near the staple discharge. A specially contoured or narrow safety blade 56 may accomplish this function and operate in conjunction with the safety switch 174 to become this centering sensor. In this instance, device 10 will not fire without the target object being centered within guide 54. The blade 56 should be sufficiently narrow so to only engage a target object that is centered. In other words, if blade 56 extended fully across the width of guide 54, blade 56 would engage any object within guide 54, regardless of whether or not the object was centered in guide 54.

As shown in FIGS. 1-5, a safety blade 56 may be provided and located along the bottom side of the stapler 10, which may trigger a safety switch 174 before firing device 10. This may help to ensure that device 10 is properly aligned and/or engaged prior to firing. In one embodiment, blade 56 is located near or adjacent to an alignment guide 54 or striker guide 26. This better allows blade 56 to verify that the target object is most appropriately aligned with the fastener to be discharged. It is contemplated, however, that safety blade 56 may be located in other desirous locations.

In one embodiment, blade 56 has a linearly flat bottom edge that extends across the width of a target object. Therefore, blade 56 may extend across the width of an alignment guide 54, a striker guide 26, or a striker guide bottom edge 26b. By providing this flat blade design, blade 56 will recognize any object within striker guide 26 or alignment guide 54, regardless of whether the object is narrower that any such width, and regardless of whether any such object is centered within such width. For example, a narrower or pin-like safety blade 56 may not recognize a narrower object located within striker guide 26 or alignment guide 54. Of course, it is contemplated that a differently shaped bottom blade bottom edge, or a narrower blade design, may be desirous, such as when one desires that an object be specifically located within guide 54, such as being centered or off-centered, or to recognize only certain types of objects within guide 54. Alternative bottom edges include, without limitation, arcuate or linearly angled edges.

It is contemplated that after safety switch 174 is initially triggered, multiple fastener shots may be deployed, or, it may be required that safety switch 174 be reset and re-triggered after a single shot to prevent accidental subsequent discharges. It is also contemplated that safety blade 56 and safety switch 174 may operate in a "bump" mode, which allows the user to hold down the trigger and fire the gun just by depressing the safety blade 56. In one embodiment, the securing of cables and the like does not include "bump" mode, as it is may be dangerous and not required for such application.

The internal components of the stapler 10 may be contained in a body 58, which may generally form a shell (or compartment) and include an ergonomically designed handle. The body 58 may comprise a pair of mating halves or portions, a clam shell, or any other number of interconnecting portions. Device 10 may also include a handle 55a, which may be formed as part of body 58, or may be separately manufactured for attachment to body 58. Device 10 generally includes a trigger 55b to initiate a trigger switch 172 for fastener discharge. The trigger 55b is located in the vicinity of the handle 55a, and in one embodiment, is ergonomically located along a bottom, front portion of the handle 55a for ease of use and to better facilitate single hand operation of the device 10. The body 58 may be formed of plastic, or any other desired material, in whole or in part. Of course, the body 58 may also be formed of multiple materials, as certain materials may be desired in certain areas, such as the handle portion 55a. It is contemplated that overmolding, or any other process similar in result, may be used to add or include decorative or functional features or materials to desired portions of the body 58. One such example includes applying overmolded EPDM and/or TPE to the handle 55a for improved gripping performance and reducing the impact energy transmitted to the user. Device 10 may also include a belt clip 57, which may be mounted on either side of body 58, as desired by a user of device 10.

Figure 27:
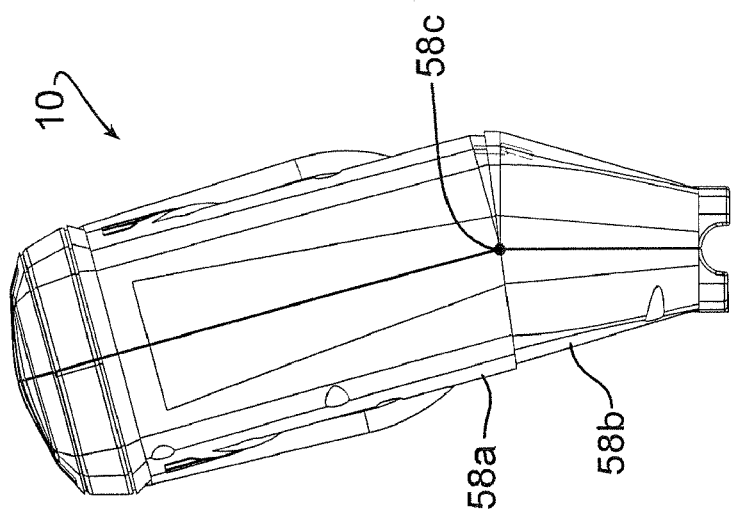
FIG. 27 is an end view of an embodiment of the device shown FIG. 1, made in accordance with the present invention, where the device is capable of tilting side-to-side.
Figure 26:
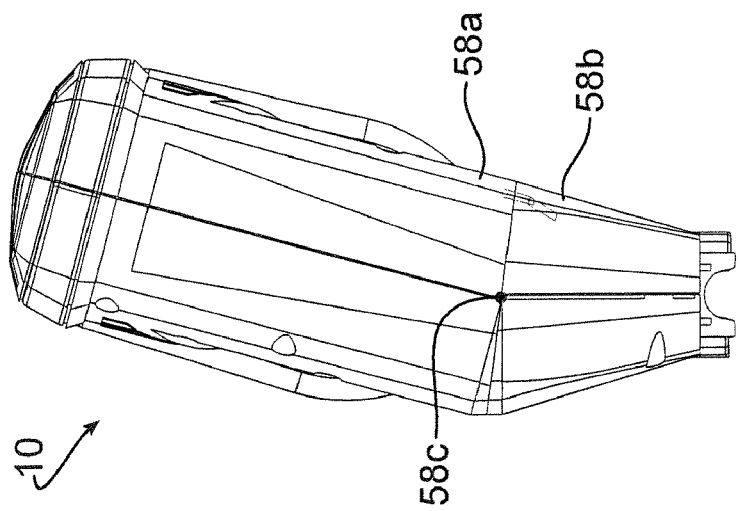
FIG. 26 is an end view of an embodiment of the device shown FIG. 1, made in accordance with the present invention, where the device is capable of tilting side-to-side.
Figure 26B:
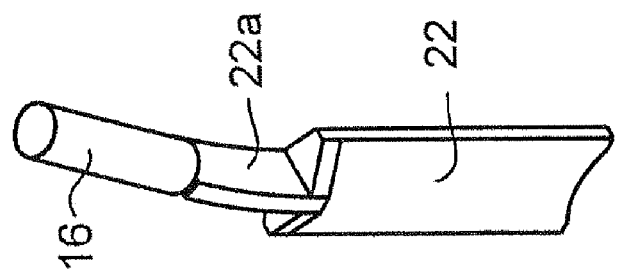
FIG. 26B is a perspective view of the embodiment shown in FIG. 26A.
Figure 26A:
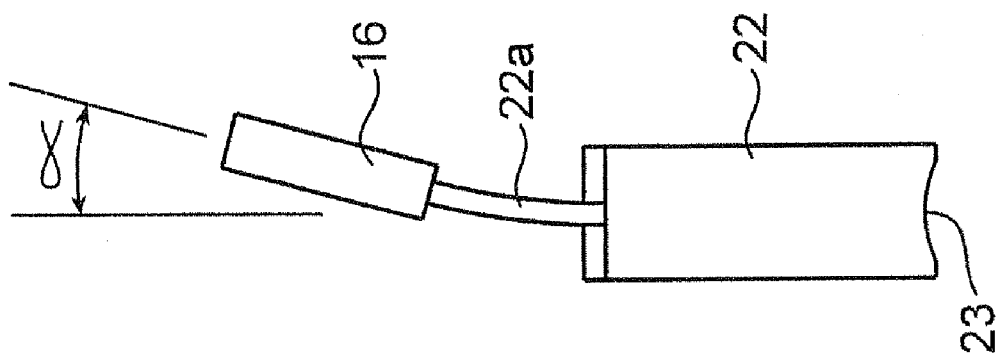
FIG. 26A is an end view showing a portion of the drive assembly, in accordance with an embodiment of the device shown in FIG. 26.
Figure 26C:
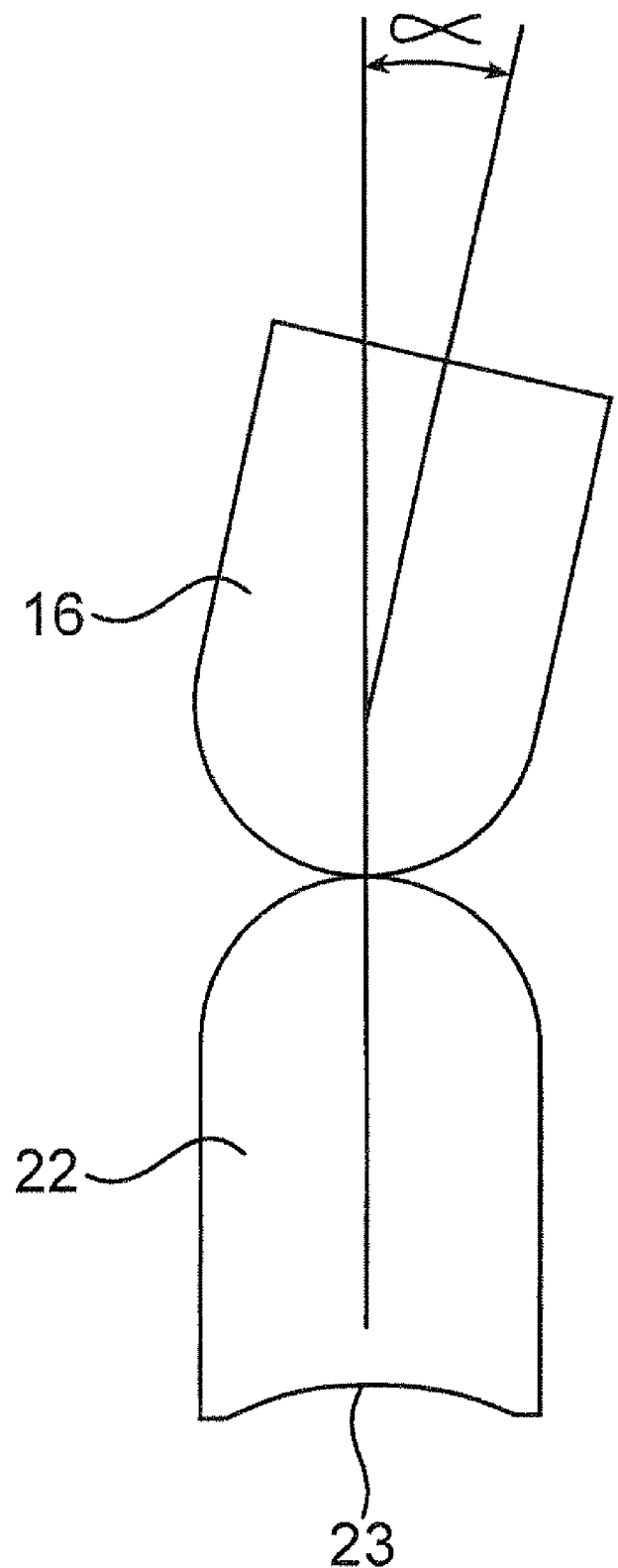
FIG. 26C is an end view showing a portion of the drive assembly, in accordance with a second embodiment of the device shown in FIG. 26.

In particular embodiments, shown exemplarily in FIGS. 26-27, it is contemplated that the device 10 may pivot sideways (such as, side-to-side relative to the stapler bottom) to lower its effective height or to otherwise allow the device 10 to enter tight spaces, such as closely positioned studs. Accordingly, device 10 includes a body upper portion 58a that tilts or rotates sideways in relation to a body lower portion 58b. To achieve this, pivotable joints 58c may exist between upper portion 58a and lower portion 58b. Pivotable joints 58c may comprise any joint known to one of ordinary skill to facilitate relative rotation between upper and lower portions 58a, 58b, which may include, without limitation, pins, rods, shafts, and bearings. Accordingly, in one embodiment, solenoid 12 and pushrod 16 may rotate with upper portion 58a, and striker 22 may remain with lower portion 58b. To communicate the drive force from solenoid 12 to striker 22, a flexible member 22a may extend between striker 22 and pushrod 16, as shown in FIGS. 26A-B in an exemplary embodiment. Flexible member 22a may comprise a flexible portion of either striker 22 or pushrod 16, and/or comprise a flexible or rotatable coupling that exists within drive assembly 20. Flexible member 22a may operate in a non-linear or curved path when the device 10 is in a tilted configuration or position. Flexible member 22a allows striker 22 to engage a staple in any tilted or untitled (i.e., rotated) position of body 58. It is contemplated that upper portion 58a may rotate any amount ($\alpha$) (i.e., the angle of incidence) in relation to lower portion 58b, such as, without limitation, +/−15°. Accordingly, pushrod 16, as well as solenoid 12, will rotate relative to striker 22 also by the angle of incidence ($\alpha$). Flexible member 22a may be formed from metals, plastics, and any other material that may be practical for the desired application and conditions, as known by one having ordinary skill in the art. Guide tabs may exist adjacent to the flexible member 22a, to help guide and support the flexible member during operation. By way of example, the guide tabs may extend from either or both the top and lower portions 58a, 58b. In another embodiment, exemplarily shown in FIG. 26C, no flexible member may exist, and instead, the pushrod 16 may impact striker 22 directly, or indirectly, such as by way of a more durable intermediate member. The engaging ends of the pushrod 16 and striker 22 may comprise any shape, which may be chosen to minimize or eliminate any loss of stroke. Further, the stroke of solenoid may be increased during tilted operations to recover any loss in stroke due to the rotation between upper and lower portions 58a, 58b. Not only does tilting provide entry into tight spaces, it also allows the fastener to be discharged normal to the target, or the bottom of device 10. It is contemplated that other means of communicating force between solenoid 12 and striker 22 may be used to achieve the stated purpose. In the alternative, it is contemplated that the device 10 may pivot from front to back, which may reduce the effective width of the device 10, while the fasteners may or may not discharge at an angle with regard to the receiving surface/object.

As mentioned above, in one embodiment, the fasteners used in driving device 10 are staples. In the embodiments of device 10 shown in the figures, the driving device is capable of storing and discharging both non-insulated staples 80 and insulated staples 60. In other embodiments, driving device 10 may be limited to discharging either insulated 60 or non-insulated staples 80. The staples 80, which may be used to form insulated staples 60, may comprise any commercially available staples, or may be specially designed for use in a particular device 10 or for a particular use. In the embodiment shown in the figures, insulated and non-insulated staples 60, 80 may be provided as individual staples, or in clip or strip form.

Insulated and non-insulated staples 60, 80 are generally discharged from device 10 into a target work piece to secure a target object thereto. In the embodiment shown, driving device 10 utilizes insulated and non-insulated staples 60, 80 to secure any commercially available sheathed or unsheathed cable or wire, such as, without limitation: 14-2, 14-3, 12-2, 14-4, 12-3, 12-4, 10-2, 10-3, stacked (two) 14-2, stacked (two) 12-2 NM wire (Romex); Cat-5; and other low voltage wire. It is also contemplated that device 10 may utilize staples or other fasteners to secure conduit or pipe, or any other similar product, such as, without limitation: armored cable and conduit (MC, AC, and FMC); EMT; rigid conduit; PVC conduit; and/or copper or PVC water pipe, or any other similar product(s).

As stated above, the one embodiment of device shown in the figures is capable of discharging both insulated and non-insulated staples 60, 80. As shown in exemplary embodiments in FIGS. 19-25, insulated staples 60 generally comprise an insulation form 62 and a staple 80, with the form 62 being placed in cooperative association with the staple 80. Insulated staples 60 may exist individually or with a plurality of other staples 60 in the form of a clip 61. While clip 61 may be assembled from a plurality of individual insulated staples 60, in one embodiment, clip 61 is formed by associating a strip of insulation forms 64 with a strip of staples 82.

Referring to the embodiments shown in FIGS. 19-25, insulation forms 62, whether in individual 62 or strip 64 form, are generally placed in association with a staple 80, and more specifically, with the underside of the staple bight 84. It is contemplated that any suitable material, such as plastic, polymer, elastomer, metal, paper or cardboard, or composite may be used. In one embodiment, insulation 62, 64 comprises injection molded thermoplastic or molded elastomer. In particular embodiments, forms 62, 64 comprise nylon 66, nylon 11, nylon 12, or acrylonitrile butadiene styrene (ABS). In particular embodiments, insulation 62, 64 is made of electrically non-conductive material.

As suggested earlier, insulators 62 may be produced as individual segments for use with individual staples 80, or may be formed into strips 64 comprising a plurality of joined and separable insulator forms 62. Each of the forms 62 may be designed to generally correspond to an individual staple 80, whether the staple 80 is alone or part of strip 82. In particular embodiments, the thickness (Ti) of insulator 62 is substantially equal to or less than the thickness (Ts) of staple 80, including, without limitation, bight 84. Substantially equal to represents that when no connector 76 exists between forms 62, the thickness (Ti) of a form may extend beyond the thickness (Ts) of the staple 80 to account the existence of any adhesive or the like attaching adjacent staples. Consequently, in particular embodiments, an insulation strip 64 may include a quantity of forms 62 that is equal to the quantity of staples 80 in a staple strip 82; however, it is contemplated that multiple insulation strips 64 may be used to occupy a single staple strip 82. Further, in particular embodiments, the length (Li) of insulation strip 64 may be substantially equal to a corresponding staple strip 82 length (Ls), where substantially equal means that each length is not exact to account for any difference in tolerances. It is contemplated that insulation strip 64 may be manufactured for use with any commercially available staple strip 82. Due to the differences in tolerances between the staples 80 and the insulators 62, it may be desirable to limit the number of insulators 62 produced within a strip 64 to maintain or control strip dimensions. In particular embodiments, strip 64 includes between 25-50 forms 62. In more specific embodiments, strip 64 includes 40 insulation forms 62.

Each insulation form 62 generally includes a crown 66, and a pair of legs 68 extending there from; however, it is contemplated that form 62 may only include a crown 66 without one or more legs 68. The crown 66 may correspond to the bight 84 of staple 80, while legs 68 may correspond to legs 86 of staple 80. Insulation form 62 may include deformation voids 70, which, for example, may be contained within form 62 or located along a surface thereof. In one embodiment, one or more deformation voids or recesses 70 are located along an upper surface of crown 66. Voids 70 may comprise notches or grooves that allow the form 62 to bend and contort so it may adapt to the cable, wire, or other target that is being secured by an insulated staple 60. The voids 70 allow the insulation form 62 to be made from more durable and harder materials, which otherwise may not appropriately bend without the inclusion of voids 70. In one embodiment, three voids 70 are equally spaced across crown 66, where one void is located near the center of crown 66 to encourage crown deflection about the central void 70, and one void 70 is located near each leg 68 to encourage further deflection of the crown and deflection or translation of the legs 68 in relation to crown 66. However, it is contemplated that no voids may exist, or that one or more voids may exist along crown 66. In one embodiment, each void 70 comprises an approximately 0.025 inch half circle; however, other sizes and shapes may be used to form each void 70 and to achieve the desired deflection, which may be based on the amount of driving force. Further, the sizes may vary, such as, for example, according to the material used to create each form 62. It is contemplated that the shapes of voids 70 may include, without limitation, half circles or ovals, squares, triangles, and rectangles.

The bottom side 72 of crown 66 is shaped to deter any abrasion or cutting of the target object to be secured by the staples. The area between the bottom side 72 and each of the legs 68 may include a gusset 74. Gusset 74 controls deflection and aids in deterring any tearing of the insulation form 62 during deflection, such as between the crown 66 and legs 68. Gusset 74 may comprise any sized shape, which may include, for example, a radiused or linearly angled form (i.e., a triangle) extending between the bottom section 72 or crown 66 and each leg 68.

At the bottom of each leg 68 is a tip 69. Each tip may be designed to be sufficiently pointed, in an attempt to avoid any buckling of each leg 68 as it enters the target work piece. The target work piece may be any desired target that the staple is to enter and secure to, such as, for example, wooden, plastic, concrete, or composite studs or planking. It is contemplated that legs 68 may not exist, or that legs 68 may be sufficiently short so that each is not necessarily capable of entering the target work piece. Further, it is not necessary that insulation form 62 be symmetrical, as asymmetrical geometry or deflection may be desired based upon an oddly shaped target object or target work piece.

In a strip 64, each form 62 may be spaced from each adjacent form 62 by a particular spacing 78. The value of spacing 78 is selected so to substantially align, as desired, each form 62 with each corresponding staple 80. Generally, forms 62 are centered along the width of staples 80; however, other non-centered alignments are contemplated. Connectors 76 may extend between adjacent forms 62 to assemble an array of insulator forms 62 into a strip 64. Connectors 76 may comprise one or more extensions (as shown in the figures), or connectors 76 may comprise a continuous or discontinuous thin band that extends about the boundary between adjoining forms 62. Connectors 76 also align each form 62 with each corresponding staple 80 as desired. In an alternative embodiment, each form 62 may substantially abut each adjacent form 62 without the use of connectors 76, meaning that each of the crown 66 and/or legs 68 may be directly attached to an adjacent crown 66 or leg 68, respectively. Finally, each leg may have a tapered width, where each such taper corresponds to a draft angle 79. This may improve the removal of insulation form 62 or clip 64 from a mold. Also, by thinning the cross-section closer to the crown 66, deflection may be better controlled as deflection may be directed to the thinner cross-section, which has a lower bending modulus.

As stated above, the individual forms 62 may be interconnected via one or more connectors or joints 76. Connectors 76 generally extend between forms 62, and may include a cross-section that is sized and shaped to adequately allow a form 62 to shear from (i.e., detach from) a strip 64 when engaged by a stapler device for discharge. In the embodiments shown in the figures, connectors 76 are projections, each of which have a cross-sectional area of approximately 0.0003 square inches; however, it is understood that this area may comprise any area, as such area will vary with the material used to form connector 76 and the amount of shearing force exerted by the stapler device 10. Further, connectors 76 may comprise any shape and any length desired for an application. In one embodiment, connectors 76 may comprise any constant or variable cross-section that includes one or more shapes, such as, for example, a square, rectangular, triangular, circular, semicircular, or oval. Further, connectors 76 may extend between the individual forms 62 in a linear, angular, arcuate, or V-shaped (or inverted V-shaped) direction.

In various embodiments, insulators 62 may be extruded and include a U-shaped or V-shaped profile, and/or having legs that flare out. It is also contemplated that the insulators 62 may be insert molded, wherein the staple clip 82 is inserted into a mold (such as a thermoplastic or thermoset mold) and the insulation form material is injected about the staples to form insulation in association therewith. If insulation 62 can be formed discreetly on each staple, this may reduce and/or eliminate the need to shear insulator 62 upon discharge from a fastener discharge device, such as device 10. It is contemplated that the insulator 62 may be solely applied to the underside of the crown or to both the top and underside.

It is contemplated that a perforating wheel may be run over the insulation strip 64 before or after application to the staple (s). The perforating wheel may puncture the strip 64 numerous times at each junction to reduce the amount of shearing force required for separation and discharge. This may occur within the stapler 10 or before insertion into stapler 10, such as during or subsequent to the manufacturing of insulation strips 64 or insulated staple strips 61.

In one embodiment, insulated staples 60 are prefabricated, meaning that insulation forms 62 are associated with or attached to staples 80, before being loaded into device 10. In forming an insulated staple 60 or clip 61, an insulation form 62 or strip of insulation 64 may be placed in association with, or frictionally, mechanically, and/or adhesively affixed to, a staple 80 or strip of staples 82. For example, the insulation may be non-adhesively placed within or in association with the staples, such as within the stapler. Further, the insulation may be press-fit into the staples, clipped or interference fit to the staples, or the staple legs may be inserted into apertures located within the insulation.

In one embodiment, insulation 62 or an insulation strip 64 is adhesively affixed to a corresponding staple 80 or staple strip 82. Attaching insulation 62, 64 to staples 80, 82 may be desirous to maintain the alignment and association between insulators and staples during discharge. Generally, adhesive 90 may be applied between the staples 80 or strips 82, and the insulation 62 or strips 64. In one embodiment, one or more beads of adhesive may be located longitudinally between the bight 84 of the staples 80 and the crown 66 of insulation 62. One or more beads of adhesive may be located longitudinally between one or more staple legs 86 and insulation legs 68. In one embodiment, the adhesive is Loctite 326™ and the beads are approximately 0.060 inches wide. However, the adhesive may comprise any other known temporary or permanent adhesive suitable for maintaining insulation 62 or strips 64 in positional association with staples 80 or strips 82. Further, the size, quantity, and location of adhesive may vary as desired to achieve a desired attachment. For example, one or more beads or coatings may extend between staples 80, 82 and insulation 62, 64. It is also contemplated that the adhesive may be applied to one or more of the insulation forms 62, strips 64, staples 80, or strips 82, and may extend in a continuous or discontinuous manner.

When a strip of insulation 64 is placed within staple strip 82, the insulation 64 may be specifically placed so that each insulation form 62 is aligned with an individual staple 80. To assist in this alignment process, tabs or spacers 77 may extend outwardly at each end of the insulation strip 64 to a desired distance. The desired distance may provide an offset distance 77a from the end of the staple strip 82, or it may extend to coincide with (i.e., extend flush with) the end of the staple strip 82, so that each insulation strip 64 is approximately the same length as each staple strip 82. The strips 64 may also contain pre-molded or extruded guides that may assist in aligning the strips within the staple clip, such as by providing transverse ridges that may align with the transverse grooves or partitions existing between adjacent staples 80 along strip 82.

In another embodiment, insulated staples may not be prefabricated prior to being inserted into any device 10, and instead, staples 80, 82 and insulation 62, 64 may be independently loaded into the stapler 10. In this instance, the staples 80, 82 and insulation 62, 64 may subsequently become engaged or associated with each other before, during, or after staple discharge. In this embodiment, the insulation may be supplied as a strip, as coiled or an in-line strip, or any other known manner.

Staples 80, which may be included within staple strip 82, may be formed of metal, plastic, or any composite material. As mentioned above, staples 80 and strips 82 may be specifically designed for a device 10, or may comprise any commercially available staple or staple strip. In one embodiment, staple 80 comprises a continuous member having a bight 84 and a pair of legs 86 extending there from. Staple 80 does not have to be formed from a single continuous member, and may instead be assembled from multiple members, which is also true for insulation form 62. The transition between bight 84 and each leg 86 generally forms a corner 88 that may be radiused. This radius may be relatively small, such as, for example, 1/32 of an inch, to deter any buckling of an associated leg 86. It is contemplated that staples 80 may comprise any size and shape. For example, staple lengths may comprise, without limitation, lengths of 1/4" (inch), 5/8", 1/2", or 9/16", while staple widths may comprise 0.4" to 0.67". The staple material may comprise any cross-sectional size, and, in one embodiment, comprises material that is 0.075" wide and 0.035" thick. Generally, for any given staple, the greater the staple material cross-section and/or the deeper the staple is to be driven, more power that a device 10 must provide to achieve the desired drive depth. In one embodiment, device 10 drives a staple that is 0.670" wide and 9/16" long, and formed of 0.075" wide and 0.035" thick material.

Staples 80 also include a tip 88 for engaging and penetrating a target work piece. This tip 88 may form an arrow-like tip, where biased edges extend from opposing sides of the staple and converge centrally along the thickness of leg 86 to form a central point as shown in FIG. 22. It is also contemplated that staple may be a divergent point staple, in which the point of the tip 88 is formed along a different side edge of each leg 86, as opposed to being formed centrally. It is contemplated that each tip 88 may have a different point type, and that one tip may be asymmetric with regard to the other tip 88, or maybe opposite of or otherwise different than the other tip 88.

Staple strips 82 generally contain a plurality of staples 80. Generally staples 80 may be assembled in a substantially abutting relation and joined by an adhesive, but other means may be used. Heat may also be applied to cure or set the adhesive, and pressure may be applied to condense and align the plurality of staples into strip form. Further, staples, whether in individual or strip form, may be coated with a grip compound, which improves a discharged staple's ability to resist a removal force—a force that attempts to remove the staple from the medium into which it has been discharged. Examples of possible grip compounds include any commercially known or used compounds or adhesives. In operation, the adhesive properties may be activated while the staple is being driven into the target work piece, as penetration may cause friction, which in turn generates heat to activate the adhesive or bonding properties.

It has been disclosed that, in one embodiment, the driving force is provided by a solenoid 12. Solenoids are advantageous since they are capable of providing higher driving forces while also being capable of quickly firing and returning to a ready position. Further, solenoids are electrically operated. These advantages are desirous in heavy duty industrial applications, especially since electronic devices may become portable with the use of batteries. However, solenoids require increased electrical power to generate higher drive forces. And when desiring to also provide a portable device, a DC source, such as a battery, may generally be used. This provides difficulty since the size of a battery is limited when being used for a portable, hand-held device. Consequently, the limit in size also limits the battery's storage capacity. This ultimately affects and controls the degree of power that may be provided over an extended duration, because the battery should be capable of providing enough power and charge life to adequately generate the elevated drive forces in the solenoid for a minimum amount of charge cycles. Otherwise, the portable hand-held device is not desirous to a user.

A capacitor 100 is generally used to supply the requisite energy to the solenoid 12 in a DC powered device. In one embodiment, the capacitor is a high voltage capacitor. The supplied energy is used to charge the coil, which in turn magnetically drives an armature 14, and, thereby, drives a pushrod 16 for fastener discharge. When it is desirous to quickly and repeatedly fire the solenoid, such as within 1.5-3 seconds, the capacitor must also quickly and repeatedly charge and discharge. This provides a problem, as capacitors generate heat when they are charged and discharged. This problem is exacerbated when repeatedly charging and discharging (a "charging cycle") a capacitor, but even more so when the charging cycle occurs are higher or increasing rates. If using ordinary high voltage capacitors to operate at approximately 20 second charging cycles, the capacitors will rapidly fail after approximately a few hundred charging cycles due to the heat. The use of ultra-capacitors or super-capacitors may generally provide adequate energy storage capabilities, as each provides high volume storage; however, ultra and super caps are limited to significantly slower charge and discharge rates. Therefore, it is desirous to use a capacitor that is both capable of storing an adequate amount of energy, and quickly and repeatedly charging and discharging while generating lower amounts of heat.

In one embodiment, a flash or photoflash high voltage capacitor 100 is used to provide stored energy to solenoid 12. A flash capacitor is capable of quickly charging and discharging, and storing elevated amounts of energy for heavy duty applications, while generating less heat due to lower internal resistance. Flash capacitors are also better able to withstand higher heat. However, photoflash capacitors are generally used in photography flash applications, where the flash capacitor provides energy to a flash tube having near zero impedance (internal resistance). In this application, the flash capacitor 100 will be used to provide energy to a solenoid having relatively high impedance, as the solenoid tends to resist any movement from its pre-firing (ready) position. In one embodiment, a flash capacitor having at least 1,000 microfarad (uF) is used. Flash capacitors that may be used may provide well over 1400 uF. In these embodiments, flash capacitor 100 may have a charging capacity of at least 180 volts; however, in one embodiment, the voltage is approximately between 330 and 390 volts. In another embodiment, a 360 working volt (390 peak volt), 1200 uF flash capacitor is used. All capacitance values may be approximately 10% higher to account for manufacturing tolerances. For a flash capacitor operating at approximately 1200 uF and 360 volts, the flash capacitor provides upwards of approximately 78 Joules of energy (energy equals 0.5× (capacitance×voltage squared). However, it is contemplated that device 10 may be used in lighter duty applications, and therefore, the capacitor may operate at levels below those identified above. For example, in lighter duty uses, it is contemplated that a 330 volt flash capacitor having 400-800 uF of capacitance is used. Regardless of the capacitor being used, it is contemplated that a light duty application may be charge a capacitor to 180 volts or less, as each any capacitor may be charged below a full charge. It is contemplated that capacitors having lower or higher voltages and/or capacitance may be used, as the applications and operating conditions for device 10 may vary. In particular embodiments, to a more durable device 10 having a longer life expectancy, flash capacitor 100 may be a high temperature capacitor, which has a temperature rating between 85-110 degrees Celsius, although it is contemplated that higher temperature rated capacitors may be used. It is contemplated that lower temperature rated capacitors may be used, especially in lighter duty applications. For a capacitor rated at 110 degrees Celsius, device 10 may be capable of performing on average approximately 100,000 firing cycles performed continuously at approximately 19 second intervals. Therefore, a flash capacitor 100 may be successfully used in this heavier duty application to repeatedly fire the solenoid 12 at quicker cycle times over longer periods of time.

It has been found that photoflash capacitors, at times, are not sufficiently durable for high impact uses associated with staplers. It has been found that the impact loads generated during a staple shot create a shock to the capacitor, which after various cycles, causes the capacitor to fail. Specifically, with reference to FIGS. 46a-46b, it has been found that the leads 606a, 606b extending internally within the capacitor can (i.e., the protective housing) 602 between the foil winding 604 contained within the capacitor 100 and corresponding (positive and negative) terminals 608a, 608b fail. In one instance, photoflash capacitor durability has been improved by reducing the amount of bending each lead experiences as it extends to its corresponding terminal. With reference to FIG. 46a, the leads 606a, 606b each extend along a path toward corresponding terminals 608a, 608b. In prior designs, each lead 606a, 606b would experience one or more bends along its path, where each such bend was approximately at least about 180 degrees, (most often occurring atop capacitor 100 between winding 604 and terminals 608a, 608b). Such bends would fail (i.e., fatigue) as a result of flexing arising from the loads generated during stapler operation. As a result, bends in each lead 606a, 606b were reduced to eliminate the fold-over, 180 degree bends. Accordingly, each lead is provided with bends extending approximately 150 degrees or less, and in particular instances, approximately 90 degrees or less. In particular instances, one (1) to three (3) bends are provided. For example, with general reference to FIG. 46a, it can be seen that a single 90 degree bend arises in each lead 606a, 606b when extending from a top of the winding 604. By further example, with reference to FIG. 46b, each lead 606a, 606b maneuvers from a bottom of the winding 604 and through three (3) 90 degree bends enroute to terminals 608a, 608b, respectively. Additional bends, extending 150 or 90 degrees or less, may be provided as desired. By reducing the bends from 180 degrees, natural flexion points are eliminated, which improves fatigue failures of leads 606a, 606b.

To further reduce the load acting upon the capacitor 100 during stapler operation, elastomeric or energy absorbing material, such as, for example, strips formed of EPDM, may be placed between the capacitor 100 and the stapler housing 58 when placing capacitor 100 within housing 58.

Figure 18:
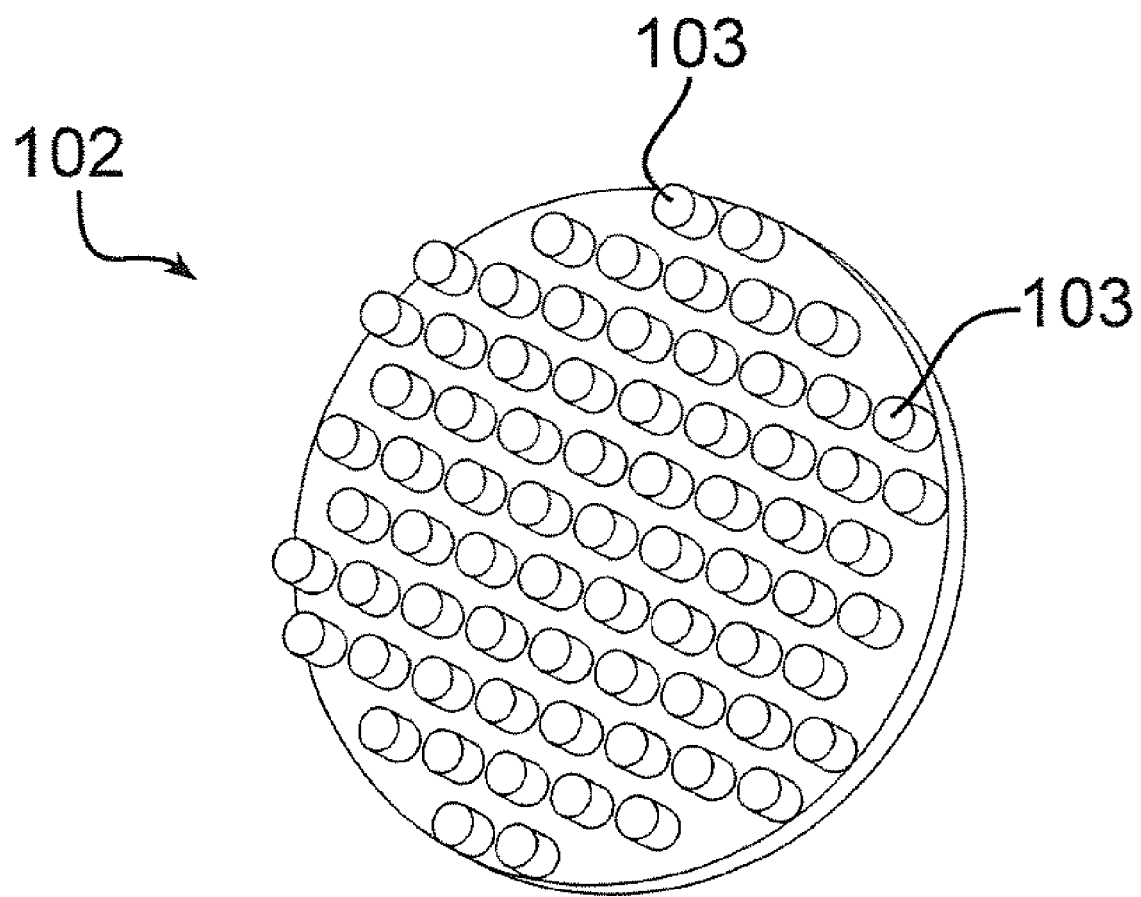
FIG. 18 is a perspective view of the heat sink, in accordance with an embodiment of the device shown in FIG. 1.
Figure 21:
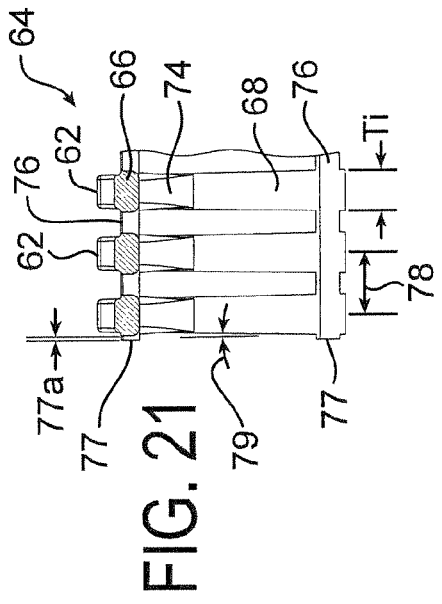
FIG. 21 is a cross-section view of the staple insulation strip shown in FIG. 20 where the cross-section is taken through a deformation void, in accordance with an embodiment of the present invention.
Figure 19:
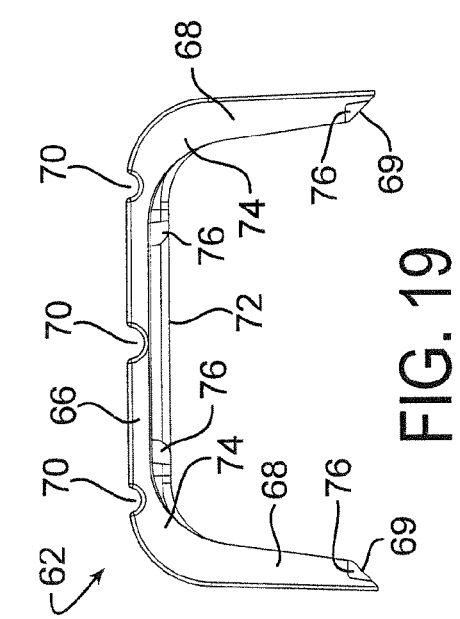
FIG. 19 is a side view of a staple insulation form, in accordance with an embodiment of present invention.
Figure 20:
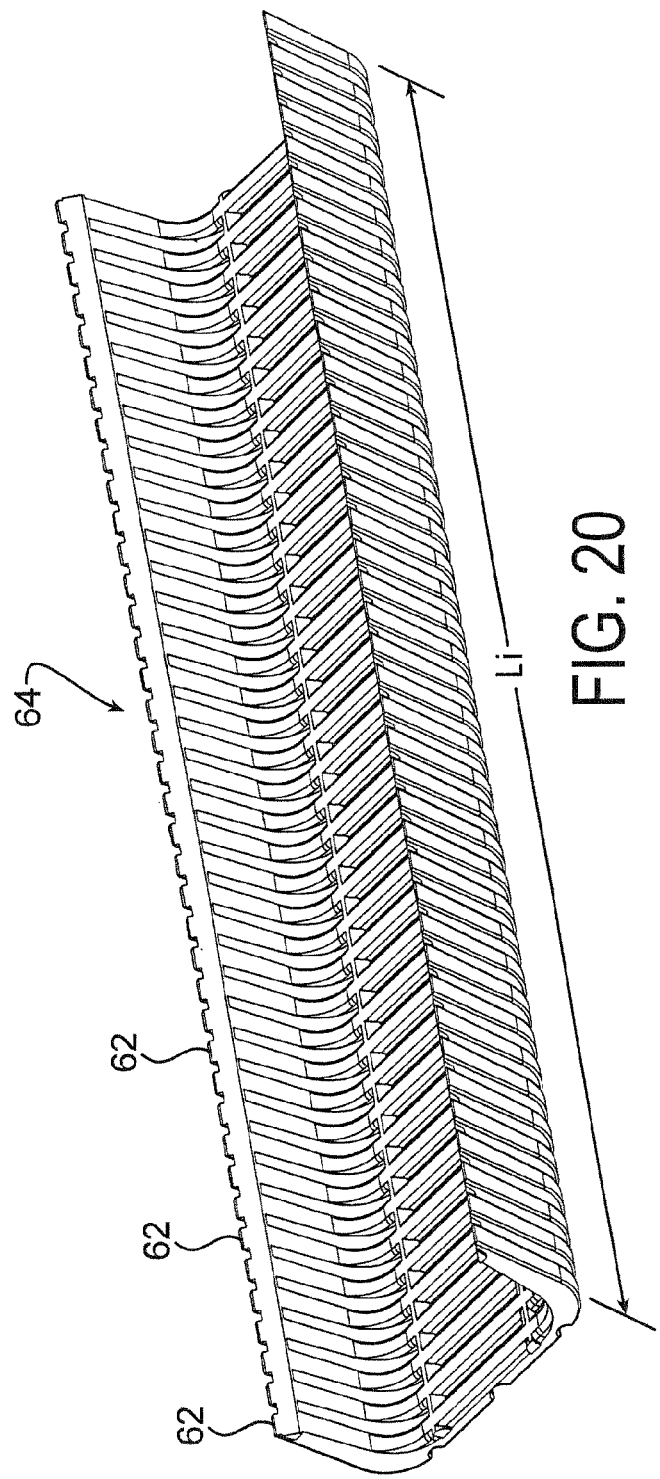
FIG. 20 is a perspective view of a staple insulation strip, in accordance with an embodiment of the present invention.

A heat sink 102, as shown in FIG. 18, may be used in conjunction with flash capacitor 100 to further reduce the heat of the capacitor, and therefore increase solenoid 12 firing cycle time. Even though flash capacitor 100 provides improved charging and discharging rates while generating significantly less heat, heat is still generated. Therefore, a heat sink 102 may be used to conduct heat from capacitor 100, thereby allowing capacitor 100 to generate more heat that would otherwise be detrimental to the performance and durability of capacitor 100. Heat sink 102 may include heat dissipating protrusions 103 and may be made from any heat conducting material, such as, without limitation, aluminum.

Control circuit 110 is generally provided in device 10, such as on a circuit board, to communicate electricity between battery 104, capacitor 100, and solenoid 12 and to perform various functions with regard to device 10. To take advantage of and improve upon the capabilities and advantages provided by solenoid 12 and capacitor 100, circuitry 110 may include features that improve the charging and discharging rate of capacitor 100, and the repeated firing of solenoid 12. Other features may be included within circuitry 110 that improve the operation of device 10. An exemplary embodiment of control circuit 110 is shown in FIGS. 29a-29d. The functions and results of control circuit 110 are described herein in accordance with exemplary embodiments of the present invention, and in no way limits the inventors to these exemplary embodiments, as it is understood that alternative methods and circuitries, whether hard or soft logic, may exist to accomplish the spirit of the present invention.

Figure 29A:
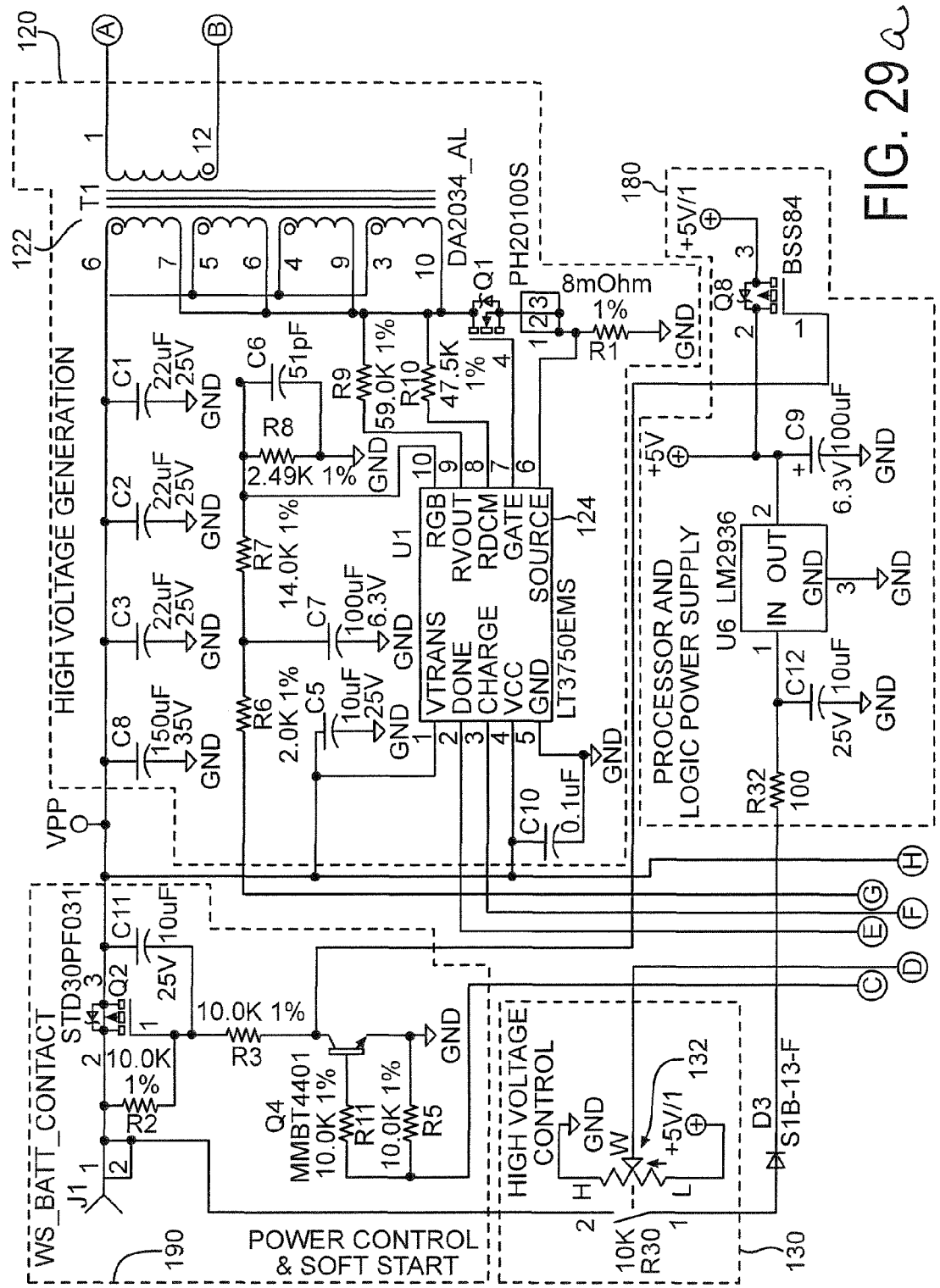
FIG. 29a is a partial view of a control circuit in accordance with an embodiment of the present invention.
Figure 29B:
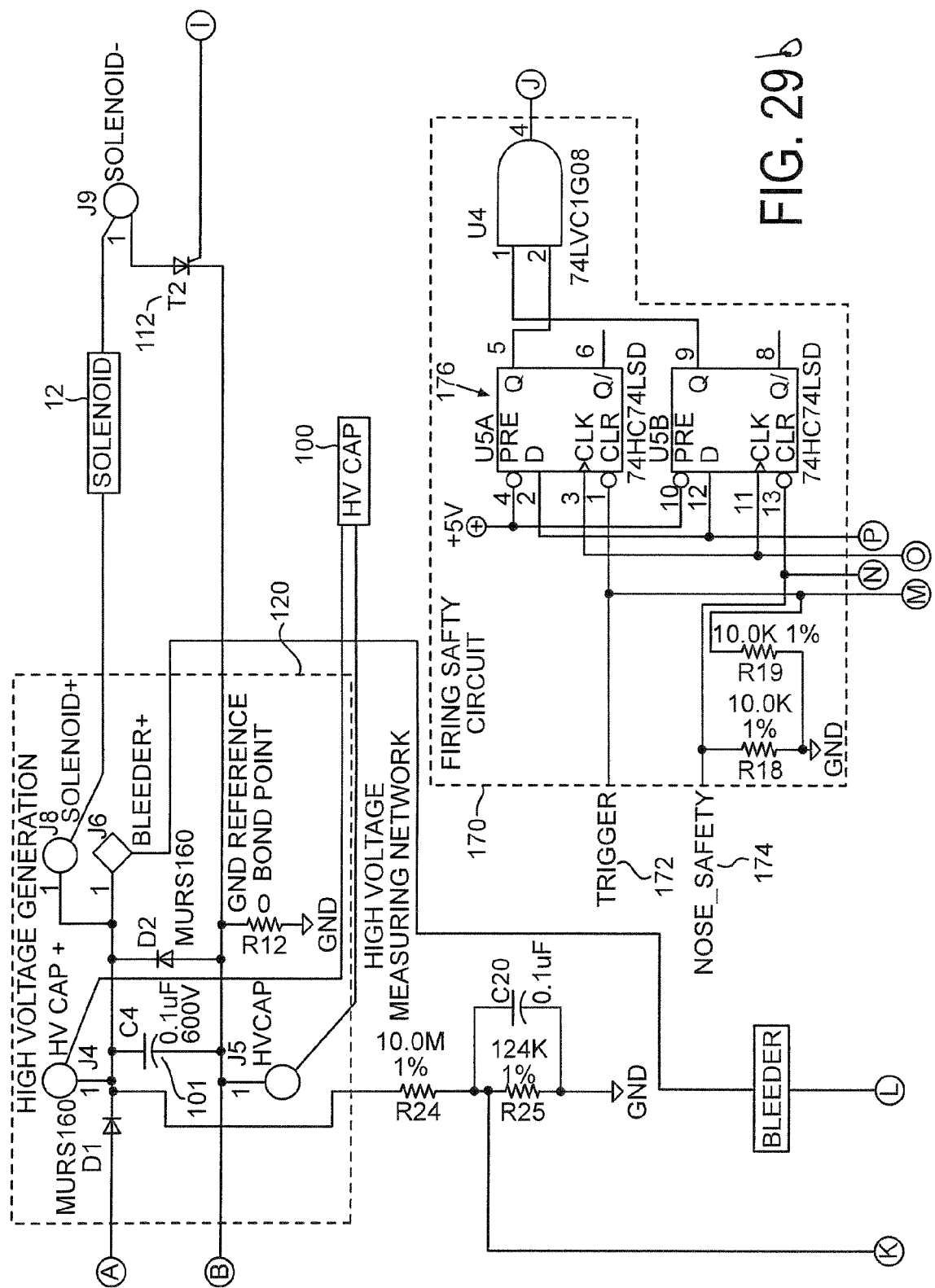
FIG. 29b is a partial view of a control circuit in accordance with an embodiment of the present invention.

With general reference FIGS. 29a-29b, control circuit 110 includes a high voltage generation circuit 120. This circuit 120 converts the DC voltage provided by battery 104 to a higher voltage for charging high voltage capacitor 100, which may be a flash capacitor. Accordingly, circuit 120 includes a transformer 122. Circuit 120 also controls the charging of capacitor 100, and consequently may include related circuitry or logic to increase the charging rate of flash capacitor 100, and to reduce the energy loss within circuit 120. Such circuitry is represented generally, in an exemplary embodiment, by charge controller 124. The high voltage generation circuit 120 quickly charges a high voltage capacitor 100, which in turn quickly releases stored energy to drive solenoid 12. In this exemplary embodiment, charge controller 124 comprises an LT® 3750 controller, which is a proprietary product of Linear Technology ("LT") and is believed to be protected at least in part by U.S. Pat. Nos. 6,518,733, 6,636,021, and 7,292,005, and the disclosure of each such patent is substantially included later herein as supporting matter. In this embodiment, high voltage generation circuit 120 is capable of fully charging a 360 volt, 1200 uF flash capacitor between 2 and 3 seconds, or charging the same capacitor to 180 volts within approximately 1.5 seconds. The quick firing and recharging allows for frequent use by a user. In another embodiment, controller 124 may be a flyback converter, which is used to rapidly charge larger capacitors, such as flash capacitor 100. It is contemplated that other capacitor charging circuits, as well as high current capacitive charging circuits, may be used in device 10 to control the charging of capacitor 100, and to achieve increased charging rates.

It is contemplated that it may be desirable to vary the driving power of solenoid 12, such as when desiring to drive fasteners into harder or softer materials. With continued reference to FIGS. 29a-29b, to achieve this, a variable power control 132 may be used, which may be operated manually by a dial 106, to vary the charge of capacitor 100. In one embodiment, the variable power control is a potentiometer, which may vary the voltage within voltage control circuit 130. It is contemplated that other means of adjusting power, known to one having ordinary skill in the art, such as, for example, a variable resistor, may be used. In one exemplary embodiment, as shown in voltage control circuit 130, a power switch may be included with potentiometer 132 for turning device 10 on and off. In this embodiment, a signal generated by potentiometer 132, such as, for example, a change in voltage, may be recognized by microcontroller 140 shown generally in FIG. 29d. If microcontroller 140 identifies an increase in voltage from potentiometer 132, a signal is sent to high voltage generation circuit 120 to increase the charge of capacitor 100 accordingly (increased charge of capacitor 100 relates to an increase in solenoid 12 drive power). This signal may be a step function, which may be filtered by R6 and C7 and adjusted by R7 as necessary. If the microcontroller 140 identifies a drop in voltage, a signal is sent to a bleeder 150 to lower the voltage level in capacitor 100, if the stored energy is above the desired amount. It is contemplated that an insulated gate bipolar transistor (IGBT) may be used instead of an SCR (silicon controlled rectifier) (T2) or thyristor 112 to cause current to flow from capacitor 100, as the IGBT can control power output by limiting or interrupting the discharge of capacitor 100, which would terminate the supply of current or charge to solenoid 12. This would allow for a quicker recharge of capacitor 100 since capacitor 100 is not entirely drained. In one embodiment, a monostable multivibrator, such as Motorola's MC14538 (a dual precision, retriggerable, resettable, monostable multivibrator) may provide a specific period of time for an IGBT to remain open. It is contemplated that other methods may be used to vary and control the power of device 10.

In other embodiments, as shown in FIGS. 28 and 28A, solenoid 12 power may be varied by using a hardness sensor 109a. Sensor 109a may engage a target work piece. In one embodiment, a pin 109b engages the work piece. Pin 109b attempt to penetrate the target material, and therefore will be displaced more with harder materials as the pin does not penetrate the material as easily. For example, pin 109b will move or deflect more in response to harder materials, while pin 109b will deflect less with softer materials, as pin 109b will tend to penetrate the softer materials and better maintain its initial position. Therefore, when a particular fastener drive depth is to be maintained, if pin 109b indicates that the material is harder, more power will be provided to solenoid 12, such as by increasing the charge on capacitor 100. To the contrary, if pin 109b indicates that the material is softer, then the charge in capacitor will be less, which may require bleeding of power if the power is above what is recommended by the sensor 109. A potentiometer or variable resistor 109c, or any other means of varying power contemplated above, may provide a signal, such as a change in voltage, which corresponds to the deflection of a hardness pin 109b as it engages a target work piece. It is contemplated that the hardness reading may be reported to a user, or may be used to automatically adjust the power supplied to solenoid 12 as discussed and contemplated in other power varying embodiments above. This sensor 109a would allow the device 10, such as by way of microcontroller 140, to adjust the power according to the hardness of the work piece material.

In another embodiment, a depth sensor 107 may used determine the height of the object that is to be secured by way of a discharged fastener, and adjust the power accordingly to control the drive depth of the fastener. The power may be adjusted by a potentiometer or any other means of varying power contemplated above, and may be used by device 10 to adjust the power of device 10 as contemplated and described above, with regard to the other sensors. If a target object is thicker (or taller), then a fastener will not be able to be driven as deep into the work piece since the target object will impede the fasteners path. More importantly, a user may not want to risk driving the fastener into the target object, as the object may become damaged. Accordingly, the depth sensor 107 will ultimately generate a signal to direct device 10 to charge capacitor 100 to a lower power level, thereby driving the fastener to a shallower depth. Conversely, if a target object is small, the more a particular fastener can be driven into a work piece without damaging the target object. The safety blade 56 discussed above could function, or operate, as this variable power sensor, although stand-alone sensing mechanisms may be used.

With general reference to FIGS. 29b-29c, SCR gate drive circuit 160 fires solenoid 12 after receiving authorization from firing safety circuit 170. In operation, drive circuit 160 closes the normally open SCR gate (T2), which causes a rush of current from capacitor 100 through solenoid 12, and the ultimate firing of device 10. Once the current decreases below a particular value, such as 0.5 amps, the SCR is reset to an open position. Subsequently, capacitor 100 may be recharged as directed by high voltage generation circuit 120. SCR gate drive circuit 160 also provides a safety feature that prevents radio frequency (RF) signals from inadvertently closing SCR gate (T2) 112 by closing high speed switching transistors Q5 and Q3, which are susceptible to RF energy. When RF transmitters, such as walkie-talkies and cell phones, generate a local high RF energy field, high speed capacitance bypass capacitors C17, C18 divert the RF energy so that a charge does not develop across transistors Q3 and Q5. Such a charge could close the transistors (high speed switches), which would ultimately close the SCR gate and cause capacitor 100 to inadvertently discharge. It is contemplated that two or more bypass capacitors may be used.

With reference to FIG. 29b, backup capacitor (C4) 101 is included to provide protection against any failure or disconnection of flash capacitor 100. In one embodiment, backup capacitor 101 may have a substantially smaller capacity than, or be of a sufficiently small size with respect to, flash capacitor 100. In an exemplary embodiment, capacitor 101 is a 600 volt, 0.1 microfarad capacitor. Nevertheless, backup capacitor 101 is sufficient to ensure proper operation of the high voltage generation circuit 120, even though it may take a few charge cycles to reach the programmed output voltage. Basically backup capacitor 101 keeps the output voltage under control in the presence of a failure or disconnection or capacitor 100.

In one embodiment, the charge of capacitor 100 may be maintained to a programmed (target) voltage, while the tool awaits firing in a ready mode. This process may be referred to as a "pickling" process. Initially, the high voltage generation circuit 120 first charges capacitor 100 to a programmed voltage. In one exemplary embodiment, the capacitor 100 is charged to between 320 and 360 volts. Once reaching the programmed voltage, the generation circuit 120 is turned off. If this circuit does not automatically maintain the voltage on 100, the voltage on capacitor 100 will slowly discharge. To complicate matters more, the higher the programmed voltage, the more rapid the discharge. For instance, capacitor 100 may lose one to two volts per second following completion of the initial charge when set to its maximum voltage value. Therefore, in one embodiment, after the staple gun reaches a ready state (ready to fire) and the charging of capacitor 100 is terminated, the pickling process charges capacitor 100 periodically to maintain the charge on capacitor 100. In one embodiment, the microcontroller 140 will turn off the charge controller 124 and wait a period of time, such as, for example, 400 milliseconds, before turning the charge controller 124 on to re-charge capacitor 100. Once it is determined that capacitor is fully charged, the microcontroller 140 again turns off the charge controller 124 to terminate charging of capacitor 100. The pickling cycle then repeats as desired to maintain the charge of capacitor 100 while in ready mode until the device 10 is fired or until reaching a sleep state timeout or detection of a critically low battery. Although any interval may be used, in one exemplary embodiment, the cycle occurs every 400 milliseconds. The pickling process may be achieved or controlled by means other then explained in the embodiment above.

With general reference to FIG. 29b, a firing safety circuit 170 may be provided to control the firing of, and prevent the misfiring of, device 10. In one embodiment, trigger switch 172 and safety switch 174 must both be closed, meaning that a user must both pull the trigger 55b and displace the safety blade 56 before the microcontroller can begin its firing sequence. In another embodiment, the safety blade 56 must be engaged (thereby closing the safety switch) before engaging the trigger 55b. In particular embodiment, after a fastener has been fired, the trigger 55b and safety 56 must be released (i.e., the respective switches 172, 174 opened) and re-engaged before firing the next fastener. This may help prevent any unintentional fastener firing.

Once the firing sequence is begun, there are two additional features that may prevent device 10 from firing. First, the proper execution firing sequence instructions are verified. If the instructions are not performed correctly, the microprocessor sends a false signal to a dual D-type flip-flop circuit 176. In one embodiment, the firing sequence includes instructions to clear a watchdog timer. These instructions are placed at different locations within the firing sequence. If the clock is not cleared within a predetermined time limit, meaning that the instructions to clear the clock have not been properly executed, a false signal is sent to the flip-flop circuit 176 to prevent firing of device 10. It is contemplated that other techniques may be used to verify that performance of the firing sequence occurs properly. The second safety feature that may also be over come, in this embodiment, is that the trigger and safety switches 172, 174 do not open after the firing sequence has begun. In this embodiment, this is accomplished by hard logic via flip-flop circuit 176. If one of the trigger or safety switch 172, 174 opens, the corresponding pull down resistor R19, R18 cannot be overcome, and therefore the corresponding overriding clear pins on U5A and U5B (pins 1, 13) pull the logic to low and a false signal (logic low) is sent to AND gate U4. Because U4 will not allow the SCR (T2) 112 to open without receiving true signals from both U5A and U5B, the SCR 112 will not open and solenoid 12 will not fire. Although other solutions may be possible, this firing safety circuit is valuable as it is a low cost solution for providing these safety features.

With general reference to FIG. 29a, a processor logic power supply circuit 180 regulates the voltage within circuitry 110 with an ultra-low quiescent current low dropout regulator U6. A field effect transistor Q8 reduces the current load in circuit 110 when the microcontroller is in hibernation by powering off the control circuit in the high voltage generation circuit 120 and other resistors, such as the battery monitoring resistors.

With continued reference to FIG. 29a, a power control circuit 190 controls the supply of power to high voltage generation circuit 120. It also protects batteries from over-discharge. Lithium ion batteries, as well as other rechargeable batteries, must generally retain a minimum voltage to prevent failure, which results in the inability of a battery to be recharged. If it is determined that a battery's voltage falls below a critical power fail subpoint voltage, microcontroller 140 turns NPN transistor Q4 off, which turns off MOSFET Q2 and ultimately the current to high voltage generation circuit 120. This prevents any further draw from the battery in an attempt to prevent battery failure.

Power control circuit 190 may also provide a soft start capability. When microcontroller 140 turns on, MOSFET Q2 also turns on. Because Q2 may have low impedance, a high jump in current would normally occur, which could result in a surge within high voltage generation circuit 120. This surge could cause capacitor 100 to fire solenoid 12, if capacitor had a residual charge. To avoid this, C11, R2, and R3 provide a soft start capability by providing a linear ramp of current to high voltage generation circuit 120.

Although microcontroller 140 generally controls the firing of solenoid 12, it also provides other background operations, such as measuring and monitoring the battery voltage and temperature. If a dangerously low battery voltage occurs, device 10 may automatically shutdown to prevent battery cell damage. Device 10 may also shutdown when the battery cell discharge rate or temperature exceeds known limits. Sensors also exist that may indicate a capacitor over temperature condition, or over voltage conditions. Microcontroller 140 may also control the bleeding of charge from capacitor 100, if desired. Microcontroller may also control and operate a laser guide LED, a work light LED, and the LED that indicates when the device 10 is ready for fastener discharge, if the capacitor is still charging, or if there is an issue or error within the battery or circuitry that needs attention. For example, a fast flashing light of one color may indicate that the battery is charging, and when colored light stops flashing, the battery is charged to the desired level. If there are fast-flashing alternating colors, it may indicate a low-battery condition. If the alternating flashing of colors slows, it may indicate that battery is ready for firing but only a limited number of discharges remain within the battery's capacity, such as, for example, 40 shots remain.

In one embodiment, the power source 104 is a DC power source, which may be a rechargeable battery, such as, for example, a 12-18 volt NiMH (nickel metal hydride), NiCd (nickel cadmium), or a Lithium-ion (Li-ion) battery. Nevertheless, it is contemplated that any commercially available battery, whether or not rechargeable, may be used. In an effort to reduce the weight of the device 10, a 12 volt (V) or 14.4V battery 104 may be used over an 18 volt battery without a significant effect on the overall performance of the device 10. In another embodiment, a 16.8 Li-ion battery is used. In one embodiment, the 1.5-3 second charge and discharge cycle times identified earlier in the application may be achieved with as low as a 14.4V battery. In one embodiment, Li-ion batteries are used as they provide more power density, and therefore, provide more shots per charge. This also allows the weight of device 10 to be reduced, since fewer Li-ions batteries may be used—as Li-ion batteries are more efficient. For example, in one embodiment, when using four 4.2V Li-ions cells (14.4V total), 1.55 amp hours are provided, which results in approximately 580 shots per charge. When using a 12-cell 14.4V Ni-Cad battery pack, approximately 970 shots may be achieved per charge. However, the 12-cell Ni-Cad battery weights approximately 2.35 pounds, while the 4-cell Li-ion battery weighs 0.77 pounds.

With general reference to the embodiment of FIG. 1, the battery 104 attaches to the rear side of the device 10 in a manner that allows for its removal. Locating the battery 104 in the rear side helps to balance the device 10 and to better facilitate single hand operation of the device 10. In one embodiment, battery 104 must be removed prior to disassembling device 10. Further, capacitor 100 may automatically be bled upon removal of battery 104. Finally, it is contemplated that the device 10 may also be powered solely, or in addition to a DC power source, by an alternating current (AC) power source. The AC power source may be used as an alternative to the DC source 104, and/or to charge battery 104.

It is contemplated that one or more LEDs could be used to indicate that the capacitor 100 is charging, the stapler 10 is ready to fire, the battery 104 is low or empty, and/or the tool has a fault condition. It is also contemplated that an LED or other light source may be included on the stapler 10 to light any work surfaces. Laser guides may also be used to mark the firing locations, such as to indicate the center of the tool or the side boundaries of the fastening area. A flip-up stud centering guide may also exist to ensure the cable or the like is always is secured to the center of a 2×4 or 2×6 stud.

Figure 29:
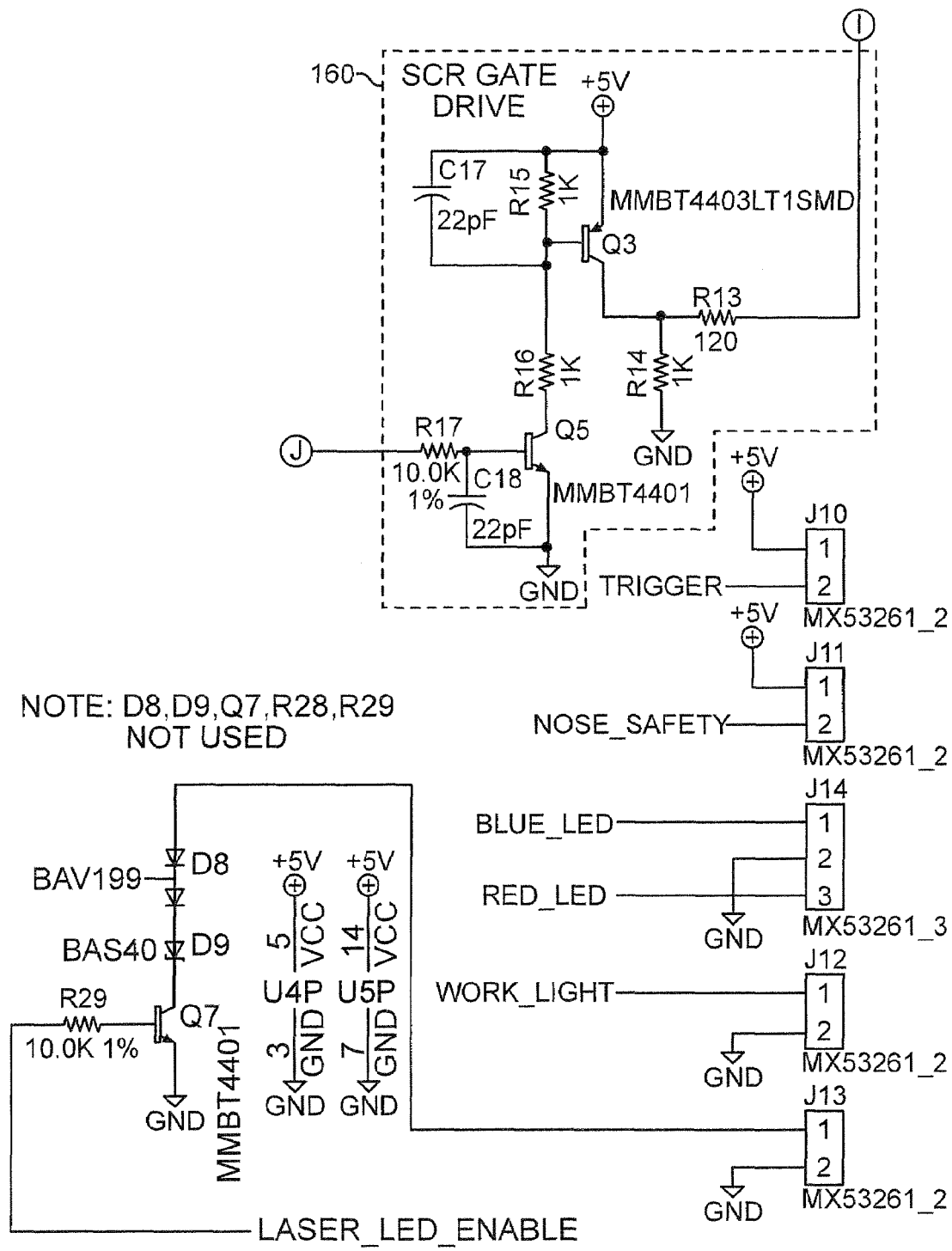
FIG. 29c is a partial view of a control circuit in accordance with an embodiment of the present invention.
FIG. 29d is a partial view of a control circuit in accordance with an embodiment of the present invention.
Figure 39:
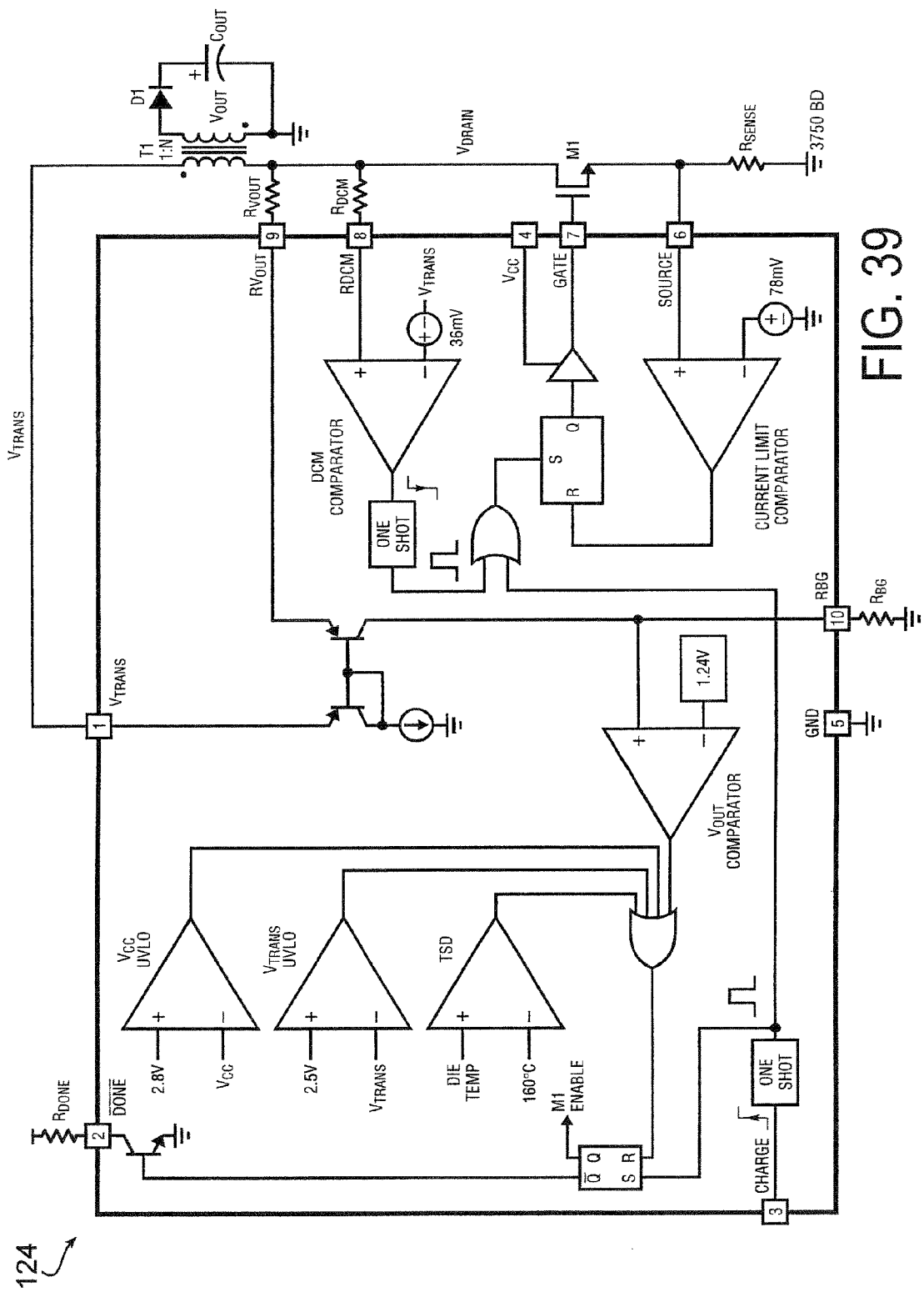
FIG. 39 is a circuit diagram of describing the capacitor charging circuitry shown in FIG. 29, in accordance with an embodiment of the present invention.

As mentioned previously, in one embodiment, charge controller 124 of FIG. 29 may comprise an LT® 3750 controller, as shown in FIG. 39. Elements, and other embodiments, of the LT® 3750 controller (i.e., capacitor charging circuits) are described and disclosed in U.S. Pat. Nos. 6,518,733, 6,636, 021, and 7,292,005, each of which were incorporated by reference in U.S. patent application Ser. No. 11/944,607, filed Nov. 24, 2007 to which this international patent application claims priority, and are substantially included herein below. The following paragraphs 141 through 250 describe alternative embodiments of the LT® 3750 controller, as well as the charge controller 124, in more detail.

In conventional photoflash capacitor charging circuits, conventional switching power supplies may be implemented to charge an output capacitor to a desired output voltage. The conventional switching power supply may charge the output capacitor by adjusting the $T_{OFF}/T_{ON}$ ratio of the switching cycle to obtain the desired output voltage.

However, conventional photoflash capacitor charging circuits present a number of potential problems, as described above. The conventional capacitor charging circuit may measure the output voltage using a resistor divider, which can produce an undesirable power loss. Other problems may involve the inability of the conventional switching power supply to efficiently charge a capacitive load for continuously varying output voltages. A photoflash capacitor charging circuit constructed according to an embodiment of the present invention overcomes these problems by providing adaptable power delivery circuitry, minimal power consumption measuring circuitry, and control circuitry.

A photoflash capacitor charging circuit according to the principles of an embodiment of the present invention operates as follows. First, if the output voltage is too low, the control circuitry enables at least the power delivery circuitry. The power delivery circuitry switches a power switch (e.g., a transistor) ON and OFF to provide (DC-to-DC converter) switch functionality required by the capacitor charging circuit. For example, the power switch can be a bipolar transistor, which can function as part of a switching mechanism for the capacitor charging circuit.

When the power delivery circuitry turns the switch ON, a transformer is energized by a power source. The switch remains ON and the transformer continues to be energized until an ON-time voltage (which may be related to the primary current level), is greater than an ON-time reference voltage. Then the switch turns OFF. When the switch turns OFF, the transformer is no longer energized by the power source, but is de-energized by transmitting power to the output capacitor load. The capacitor continues to become charged until an OFF-time voltage (which may be related to the secondary current level), exceeds an OFF-time reference voltage, at which point, the switch can turn ON again.

The ON-time and OFF-time switching preferably provides the capacitor charging circuit of an embodiment of the present invention with inherent self-clocking (i.e., the capacitor charging circuit is independent of an additional oscillator or clock). Moreover, switch ON-time and switch OFF-time are adaptable to operational parameters such as varying input source voltages, varying output voltages, and other parameters associated with the capacitor charging circuit. This adaptability for varying ON-time and OFF-time of the switch provides the capacitor charging circuit with the ability to adjust the ON-time/OFF-time cycle to efficiently provide power to the output capacitor load operating on a wide voltage range.

Once the voltage on the output capacitor reaches a desired value, the control circuitry may disable the power delivery circuitry and the measuring circuitry (e.g., by stopping the delivery of power to the power delivery circuitry and measuring circuitry). This may conserve power because the power delivery circuitry and the measuring circuitry no longer operate once the desired output voltage is reached.

In an alternative embodiment, the control circuitry may disable and/or disconnect only the measuring circuitry when the desired output voltage is reached. In this embodiment, the measuring circuitry is disconnected, while other circuitry, such as the power delivery circuitry remains enabled. Thus, this embodiment provides the capacitor charging circuit with the ability to rapidly re-charge the load.

In another alternative embodiment, the control circuitry may disable and/or disconnect the power delivery circuitry and the measuring circuitry when the desired output voltage is obtained. However, in this embodiment, the measuring circuitry is reactivated (after a pre-determined period of time), but not the power delivery circuitry. This may provide additional power consumption savings for the capacitor charging circuit.

Nevertheless, when power is no longer being supplied to the capacitive load, the voltage can gradually drop due to self-discharge. The control circuitry can compensate for this inherent problem by periodically reactivating the power delivery circuitry after a programmable period of time or flash event. When reactivated, the power delivery circuitry can either be turned off immediately if the voltage level is at or above the desired voltage, or run until the output voltage returns to the desired voltage. Once the desired voltage is obtained, the control circuitry can disable the power delivery circuitry and the measuring circuitry again to conserve power. This provides the capacitor charging circuit with the ability to maintain the output capacitor load in a constant state of readiness despite the inherent self-discharge associated with capacitive loads.

Another aspect of an embodiment of the present invention is that maximum power transfer can preferably be achieved during capacitor load charging. This may be achieved by preventing flux in the transformer from reaching zero during power delivery (at least until the end of the final switch cycle). During ON-time, the primary winding current increases. Since flux is proportional to current, the flux in the transformer also increases. Then during OFF-time, the current and flux both decrease. However, throughout the ON-time portion of the switching cycle, the primary winding current does not go to zero. Similarly, during OFF-time, the secondary winding current also does not go to zero. Since the primary and secondary winding currents do not go to zero during ON-time and OFF-time respectively, the flux, therefore, does not go to zero. Thus, the power delivery circuitry may be able to maintain a relatively high average current (and flux) during the combined respective ON-time and OFF-time cycle. This higher average current (and flux) may provide the capacitor charging circuit with the ability to rapidly charge capacitive loads.

Another aspect of an embodiment of the present invention involves measuring the voltage on the output capacitor load with minimal power drain on the power source (e.g., battery). The measuring circuitry according to an embodiment of the present invention indirectly measures output voltage during the OFF-time cycle (e.g., flyback cycle) by converting the voltage on the primary side of the transformer to a ground-referred voltage. This ground-referred voltage is directly proportional to the instantaneous output voltage. The ground-referred voltage may then be compared to a reference voltage to determine if the desired output voltage has been obtained. Moreover, since there is substantially no current in the primary winding of the transformer during the OFF-time switch cycle, there is very limited power loss during measurement.

Another aspect of an embodiment of the present invention is that the measuring circuitry accurately measures the output voltage despite voltage spikes produced by leakage inductance in the transformer. At the beginning of each OFF-time cycle, the output of the measuring circuitry is temporarily delayed to prevent the measuring circuitry from monitoring the portion of the voltage waveform exhibiting the leakage inductance voltage spike. Thus, measuring circuitry according to an embodiment of the present invention preferably can accurately measure the output voltage independently of voltage spikes.

Another aspect of an embodiment of the present invention is that the input current drawn from a power source can be accurately controlled when charging a load. When charging the load, input current is drawn by the power delivery circuitry during the ON-time portion of the ON/OFF-time cycle.

In addition, the peak-current drawn from the power source is substantially the same for each ON-time portion of the ON/OFF-time cycle. This provides a regulated power drain from the source, which can result in less power consumption. For example, if batteries are used for the capacitor charging circuit, then the controlled draw of current during ON-time can increase the battery's life.

Figure 30:
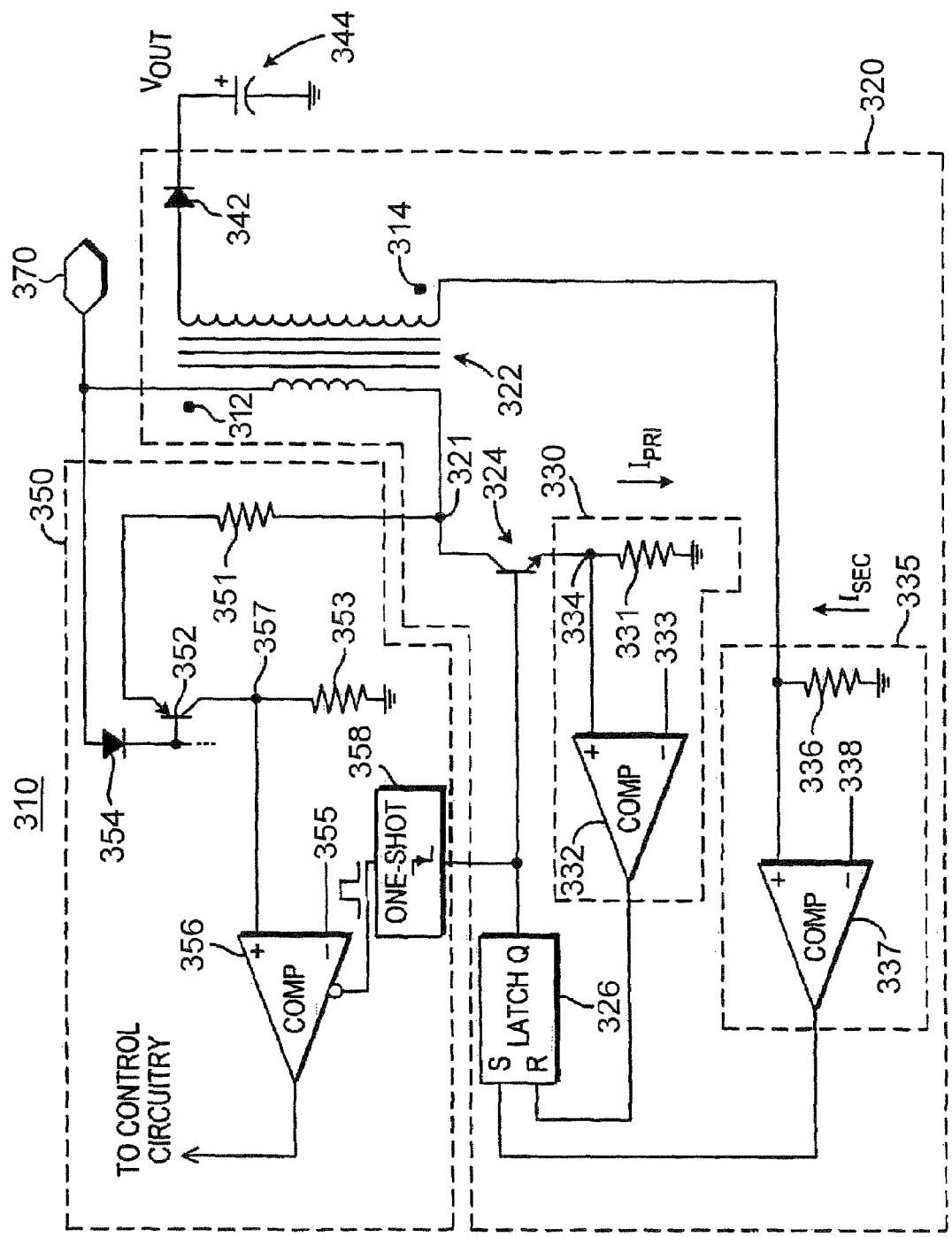
FIG. 30 is a circuit diagram of power delivery circuitry and measuring circuitry according to the principles of the present invention.
Figure 32:
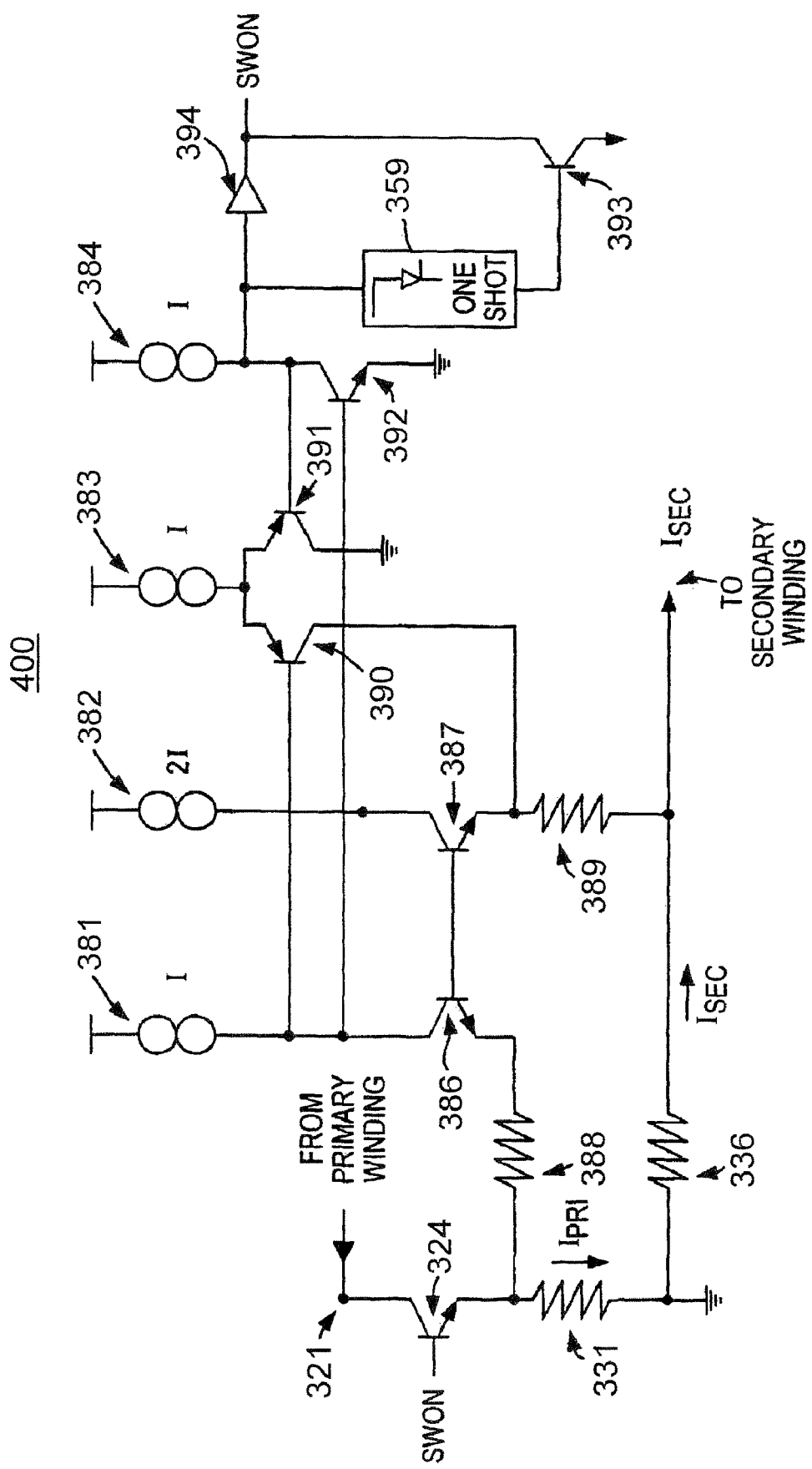
FIG. 32 is a circuit diagram of current comparator circuitry according to the principles of the present invention.
Figure 34:
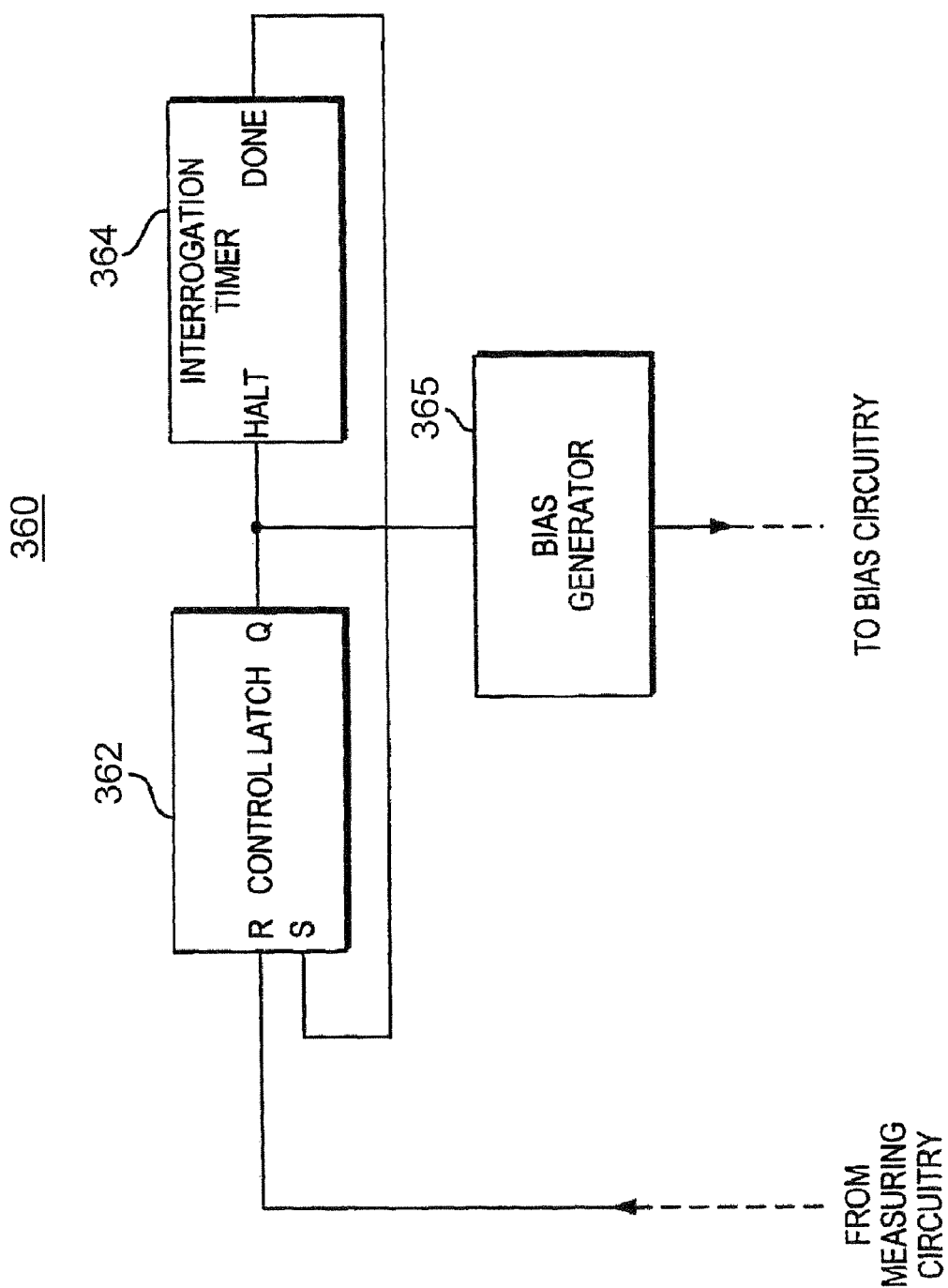
FIG. 34 is a block diagram of control circuitry according to the principles of the present invention.

FIG. 30 shows a circuit diagram of capacitor charging circuit 310 according to an embodiment of the present invention, which is an alternative embodiment of the charge controller 124 shown in FIG. 29. This FIGURE illustrates power delivery circuitry 320 and measuring circuitry 350, which may represent two of the three sub-circuits of an embodiment of the present invention. FIG. 32 shows a circuit diagram of current comparator circuitry 400 according to an embodiment of the present invention. This FIGURE illustrates another embodiment of a portion of power delivery circuitry 320. FIG. 34 shows a block diagram of control circuitry 360, which may represent the third main sub-circuit of an embodiment of the present invention.

First, operation of capacitor charging circuitry 310 shown in FIG. 30 will be described in detail with respect to the portion of the specification corresponding to FIGS. 30 and 31. Then the operation of current comparator circuitry 400 shown in FIG. 32 will be described in detail with respect to the specification corresponding to FIGS. 32 and 33. Lastly, the operation of control circuitry 360 shown in FIG. 34 will be described in detail with respect to the portion of the specification corresponding to FIGS. 34 and 35.

In FIG. 30, power delivery circuitry 320 operates to transfer power from input source 370 to capacitor 344 (which is preferably coupled to the load). Power delivery circuitry 320 can include adaptive ON-time circuitry 330, adaptive OFF-time circuitry 335, transformer 322, switch transistor 324, latch 326, and output diode 342. Power delivery circuitry 320 may be coupled to the output capacitor 344 via output diode 342. The anode of output diode 342 can be coupled to the output side of the secondary winding of transformer 322 and the cathode of output diode 342 can be coupled to output capacitor 344. Input source 370 can be coupled to the input of the primary side of transformer 322. The output of the primary side of transformer 322 can be coupled to the collector of switch transistor 324. The emitter of switch transistor 324 can be coupled to adaptive ON-time circuitry 330.

The polarity orientation of the primary and secondary windings are preferably arranged so that the respective windings have opposite polarity. As illustrated in FIG. 30, polarity indicators 312 and 314 show that the polarity of the primary and secondary windings are opposite. This opposite polarity can be useful for implementing a flyback circuit topology.

Adaptive ON-time circuitry 330 may include first switch resistor 331, which can be coupled to the emitter of switch transistor 324 to form ON-time node 334. ON-time circuitry 330 can also include ON-time comparator 332. ON-time comparator 332 can be coupled to receive voltage signals from ON-time node 334 and ON-time reference voltage $V_{REF1}$ 333.

Adaptive OFF-time circuitry 335 can include second switch resistor 336, which may be coupled to the secondary winding of transformer 322 and to non-inverting terminal of OFF-time comparator 337. OFF-time comparator 337 can also receive OFF-time reference voltage $-V_{REF2}$ 338. OFF-time reference voltage $-V_{REF2}$ 338 is negative because it may be compared to the negative voltage across second switch resistor 336.

Adaptive ON-time circuitry 330 and adaptive OFF-time circuitry 335 each provide output signals that are received by latch 326. Latch 326 can be, for example, a set/reset latch. In particular, the reset portion of latch 326 can be coupled to receive the output of ON-time circuitry 330 and the set portion of latch 326 can be coupled to receive the output of OFF-time circuitry 335. In the embodiment shown in FIG. 30, if latch 326 receives signals simultaneously for both set and reset, the reset input preferably takes priority. Latch 326 can provide a latch output to the base of switch transistor 324 based on output signals provided by ON-time circuitry 330 and OFF-time circuitry 335. The latch output can be toggled to activate or de-activate switch transistor 324 to generate the switching action necessary for DC-to-DC conversion. Thus, the interconnections of the respective components of an embodiment of power delivery circuitry 320 according to an embodiment of the present invention have been described. The preferable operation of power delivery circuitry 320 will be described next.

During initial power up, no current is flowing in either the primary or secondary windings of transformer 322. The output of ON-time circuitry 330 is initially preferably set low and the output of OFF-time circuitry 335 is initially preferably set high. The state of adaptive circuitry 330 and 335 sets latch output to high, which activates switch transistor 324. Once switch transistor 324 is activated, collector node $V_{SW}$ 321 can be pulled close (i.e., 200-300 millivolts) to one $V_{CESAT}$ of ground. This preferably creates a voltage differential across the primary winding of transformer 322 and starts the flow of current into the transformer.

Current can continue to ramp up in the primary winding until it increases to the point that the voltage across first switch resistor 331 (i.e., voltage at ON-time node 334) exceeds $V_{REF1}$ 333. The voltage across first switch resistor 331 may be based on a portion of the primary current passing through switch transistor 324. When the primary winding current ramps up, the energy stored in the transformer also increases. Once the voltage at ON-time node 334 exceeds $V_{REF1}$ 333, the output of ON-time circuitry 330 can be set high to reset latch 326, which causes the latch output to go low. The reset latch de-activates transistor 324, thus preferably terminating current ramp up in the primary side of transformer 322.

When switch transistor 324 is de-activated, the energy stored in transformer 322 during ON-time is transferred to capacitor 344. This transfer preferably occurs substantially during OFF-time. Output diode 342 may prevent output capacitor load from drawing current from the secondary winding of the transformer during ON-time. The energy transfer from the secondary winding to output capacitor 344 continues until the current in the secondary winding of the transformer drops to the point where the voltage across second switch resistor 336 is preferably less negative than OFF-time reference voltage $-V_{REF2}$ 338.

Once the voltage across second switch resistor 336 is greater than $-V_{REF2}$ 338, OFF-time circuitry 335 output can be set low to set latch 326. The set latch produces a high output signal that activates switch transistor 324.

ON-time circuitry 330 and OFF-time circuitry 335 may preferably use currents in transformer 322 to generate the ON-time portion and OFF-time portion of the switching cycle. In particular, ON-time circuitry 330 may set the ON-time portion based at least in part on the primary winding current, the inductance of the primary winding, and the supply voltage. OFF-time circuitry 335, on the other hand, may set the OFF-time portion based at least in part on the secondary winding current, the inductance of the secondary winding, and the output voltage.

This arrangement can provide a self-clocking circuit that is suitable for charging capacitive loads varying over a wide voltage range (e.g., 0-300 V). In particular, ON-time circuitry 330 and OFF-time circuitry 335 are adaptive to various conditions (e.g., input supply voltage, output voltage, inductance of the primary and secondary windings of the transformer) in the capacitor charging circuit. Adaptive OFF-time can enable the secondary winding current to decrease to a pre-determined current level, independent of the output voltage, during each OFF-time portion of the switching cycle.

For example, when the capacitor load voltage is relatively low (e.g., 0 V), energy is removed from the transformer at a slower rate (than if the load voltage were high (e.g., 250 V). Thus, OFF-time circuitry 335 automatically adapts by keeping switch transistor 324 OFF until the secondary current falls to a pre-determined current level. That is, OFF-time circuitry 335 may provide a variable OFF-time before generating the signal needed to set latch 326 (i.e., turn-ON switch transistor 324).

Conversely, if the capacitor load voltage is relatively close to the desired output voltage, energy is removed rapidly from the transformer. In this case, switch transistor 324 may remain OFF for a relatively short period of time (at least compared to the OFF-time when the capacitor load voltage is low). Thus, the secondary current is reduced relatively rapidly and OFF-time circuitry 335 correspondingly rapidly generates the required signal to set latch 326.

Adaptive ON-time, on the other hand, can enable the primary winding current to increase to substantially the same peak primary current during each ON-time portion of the switching cycle. For example, ON-time circuitry 330 can automatically adapt to varying input voltages provided by power source 370. As described earlier, ON-time circuitry 330 generates signals based on the current in the primary winding. The current in the primary winding varies substantially proportionally to the voltage level of power source 370. In particular, ON-time circuitry 330 resets latch 326 when the current in the primary winding reaches a predetermined current level. Since resetting the latch is dependent on reaching that predetermined current level, this provides ON-time circuitry with the ability to automatically adapt to changing input voltages and provide a variable ON-time.

For example, if the input voltage provided by power source 370 is low, ON-time circuitry 330 can automatically keep switch transistor 324 activated (e.g., remain in ON-time) for a longer period of time. Keeping switch transistor 324 activated longer allows the current in the primary winding to reach the predetermined level. Once the primary current reaches the predetermined level, the transformer may be fully energized according to the operating parameters of an embodiment of the present invention. In other words, the rate at which the current increases in the primary winding may be substantially proportional to the input voltage.

It should be noted that certain simultaneously occurring conditions may create contradictory demands on power delivery circuitry 320. For example, if the input voltage drops (thereby demanding increased ON-time), while the output level drops (thereby requiring increased OFF-time), the capacitor charging circuit can satisfy both demands by adapting the ON-time and OFF-time accordingly. That is, the demands are automatically adapted to during the successive ON-time and OFF-time portions of the ON/OFF-time cycle after the simultaneous demands occur.

The ON-time and OFF-time cycle can be repeated substantially indefinitely until capacitive load 344 is fully charged. FIG. 31 shows various waveforms that depict currents and voltages preferably associated with ON-time and OFF-time cycles of a circuit according to an embodiment of the present invention. Q indicates when switch transistor 324 is either ON or OFF. $I_{PRI}$ shows the current waveform provided with the primary winding of transformer 322. When Q is ON, the current in $I_{PRI}$ ramps up until Q turns OFF (i.e., ON-time node voltage 334 is greater than $V_{REF1}$ 333). $I_{SEC}$ shows the current waveform provided with the secondary winding of transformer 322. When Q is OFF, the current in $I_{SEC}$ ramps down until Q turns ON (i.e., voltage across second switch resistor 336 is less negative than $-V_{REF2}$ 338). Then the current in $I_{SEC}$ turns OFF in part because of the operation of diode 342.

During power delivery circuitry 320 operation, the flux in transformer 322 may preferably never substantially go to zero. As commonly known in the art, flux in the transformer is substantially dependent on the current in both $I_{PRI}$ and $I_{SEC}$. As $I_{PRI}$ increases, the flux in transformer 322 may also increase until the power switch turns OFF (as indicated by Q). The switch may turn OFF when the $I_{PRI}$ is substantially equivalent to $V_{REF1}$/(first switch resistor 331) (i.e., current which may cause ON-time circuitry 330 to reset latch 326 and turn OFF switch 324). Once switch 324 is turned OFF, $I_{PRI}$ returns to zero and $I_{SEC}$ rapidly rises to a current that is preferably equivalent to the peak $I_{PRI}$ divided by the turns ratio of the transformer winding. Then for the remainder of OFF-time, $I_{SEC}$ declines as $I_{SEC}$ charges capacitor load 344.

The flux, however, does not go to zero because the $I_{SEC}$ is not permitted to return to zero during OFF-time. Instead, the flux decreases in conjunction with the decreasing $I_{SEC}$ until switch 324 is reactivated. As shown in FIG. 31, switch 324 turns ON when $I_{SEC}$ is substantially equal to $V_{REF2}$/(second switch resistor 336). Then, during the transition period from OFF-time to ON-time, $I_{SEC}$ may go to zero. Nevertheless, during this transition, $I_{PRI}$ may rapidly rise to a current level substantially equal to ($I_{SEC}$ (at transition) X the transformer turns ratio). Then, $I_{PRI}$ may increase throughout the duration of the ON-time portion of the cycle. Thus, it has been shown that some flux is preferably always in transformer 322.

During the switching cycle $I_{PRI}$ does not go to zero during ON-time and $I_{SEC}$ does not go to zero during OFF-time. Thus, the average current applied to and delivered from transformer 322 can be substantially higher. This may provide fast and efficient energy transfer from power source 370 to capacitive load 344 because the average current (and flux in the transformer) is higher than it would be if the current were allowed to go to zero during the respective portions of the switching cycle. Since the flux in transformer 322 is not permitted to go to zero, the undesirable ringing or buzzing associated with discontinuous mode operation can be substantially avoided (preferably at least until the end of the final switch cycle). Thus, the operation of one embodiment of power delivery circuitry 320 has been described in detail. Another embodiment of power delivery circuitry 320, current comparator circuitry for controlling the ON and OFF times of switch transistor 324 may be implemented.

FIG. 32 shows a circuit diagram of current comparator circuitry 400 that may implemented in a power delivery circuit 320 according to an embodiment of the present invention. Current comparator circuitry 400 may be used in power delivery circuitry 320 for controlling the ON-time and OFF-time of switch transistor 324. As will be explained in more detail, current comparator circuitry 400 may perform substantially the same functions as ON-time circuitry 330, OFF-time circuitry 335, and latch 326. FIG. 32 may include $V_{SW}$ 321, switch transistor 324, first switch resistor 331, second switch resistor 336, first transistor 386, second transistor 387, third resistor 388, forth resistor 389, current sources 381-384, first feedback transistor 390, second feedback transistor 391, switch driving transistor 392, one-shot transistor 393, one-shot 359, and amplifier 394.

Some of the components shown in FIG. 32 have properties and relationships with other components that enable current comparator circuitry 400 to operate efficiently. For example, the emitter size (e.g., area) of second transistor 387 is substantially twice that of first transistor 386. The resistance values of third and fourth resistors 388 and 389 may be substantially the same. The resistance values of third and fourth resistors 388 and 389 may be substantially greater than the resistance value of first and second switch resistors 331 and 336. Furthermore, the resistance value of third and fourth resistors 388 and 389 can be based on the turns ratio of transformer 322. It will become more apparent in the following description why certain components exhibit their respective characteristics.

The connection involving $V_{SW}$ 321 switch transistor 324, and first switch resistor 331 have been previously described, but will be repeated for purposes of describing the operation of the circuitry shown in FIG. 32. $V_{SW}$ 321 can be coupled to the collector of switch transistor 324. $V_{SW}$ 321 can also be coupled to the primary winding of transformer 322 (as shown in FIG. 30). The emitter of switch transistor 324 can be coupled to both first switch resistor 331 and third resistor 388. First switch resistor 331 may also be coupled to second switch resistor 336, which goes to GND. Second switch resistor 336 can be coupled to the secondary winding of transformer 322 (not shown in FIG. 32). Second switch resistor 336 may also be coupled to forth resistor 389, thus forming a node where second switch resistor 336, forth resistor 389 and the secondary winding are coupled.

Current source 381 can be coupled to the collector of first transistor 386 and to the bases of first feedback transistor 390 and switch driving transistor 392. The emitter switch driving transistor 392 may be coupled to GND. The emitter of first transistor 386 may be coupled to third resistor 388. The base of first transistor 386 and the base of second transistor 387 can be coupled together. However, these bases are also coupled to a node formed between current source 382 and the collector of second transistor 387. Therefore, the bases of both first transistor 386 and second transistor 387 can be driven by current source 382. The emitter of second transistor 387 can be coupled to fourth resistor 389 and to the collector of first feedback transistor 390.

Current source 383 can be coupled to the emitters of first feedback transistor 390 and second feedback transistor 391. Current source 384 can be coupled to the collector of switch driving transistor 392, amplifier 394 and to base of second feedback transistor 391. The collector of second feedback transistor 391 is coupled to GND. The output of amplifier 394 can be connected to the base of switch transistor 324, which is shown as SWON node 395, and to the collector of one-shot transistor 393. The emitter of one-shot transistor 393 is coupled to GND. Finally, one-shot circuitry 359 can be coupled between the base of one-shot transistor 393 and the collector of switch driving transistor 392.

The operation of these heretofore described components shown in FIG. 32 will be described next. The previous discussion on power delivery circuitry 320 described the comparison of voltages to switching between ON-time and OFF-time. However, the operation of the components in FIG. 32 is primarily described in with respect to the current flowing in current comparator circuitry 400. In the embodiment shown in FIG. 32, current can be the primary agent that facilitates switching between ON-time and OFF-time in power delivery circuitry 320. Therefore, current comparator circuitry 400 may use current to vacillate switch transistor 324 between ON-time and OFF-time.

The graphical depictions of various signals shown in FIG. 33 will be referred to in the following description of the operation of current comparator circuitry 400 shown in FIG. 32. For purposes of the following description, switch transistor 324 may be considered active at start-up of current comparator circuitry 400. Furthermore, the following description refers to current and voltage waveforms in FIG. 33 to illustrate CC 400 operation.

Figure 33:
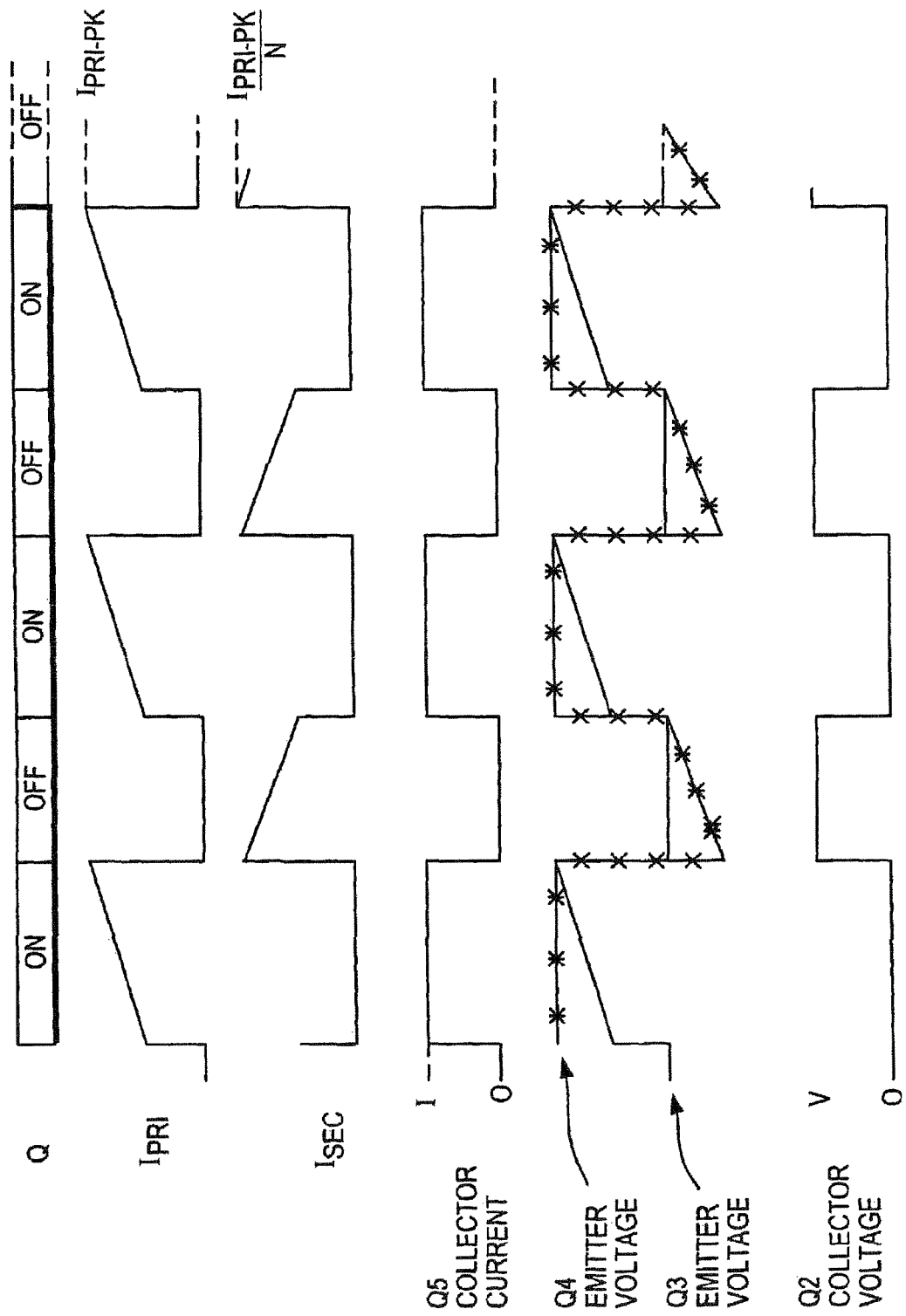
FIG. 33 shows illustrative waveform diagrams of current comparator circuitry according to the principles of the present invention.

When switch transistor 324 is active, the collector voltage of first transistor 386, which is shown as Q2 in FIG. 33, is low. It follows that the collector voltage of switch driving transistor 392 is high when switch 324 is active. Switch driving transistor 392 may provide the voltage and/or current necessary to activate switch transistor 324 and to maintain switch transistor 324 in an active state. In other words, the collector voltage of switch driving transistor 392 can perform a similar function to the output of latch 326 (as shown in FIG. 30). Switch driving transistor 324 collector voltage is illustrated as Q (ON and OFF of switch 324) in FIG. 30.

When switch transistor 324 is active, the primary winding current passing through first switch resistor 331 is increasing. FIG. 33 graphically illustrates this point by showing $I_{PRI}$ as increasing when switch transistor 324 is active.

Also, as $I_{PRI}$ increases, the emitter voltage on first transistor 386 may also increase. The emitter voltage of first transistor 386 is illustrated in FIG. 33 as Q3. The proportionality of the emitter voltage on first transistor 386 to $I_{PRI}$ may be shown by the following equation:

$$V_{EQ3(ON)} = (I_{PRI} * R_{S1}) + (I * R_3) \quad (1)$$

where $V_{EQ3(ON)}$ is the emitter voltage on first transistor 386 during ON-time, $I_{PRI}$ is the current in the primary winding, $R_{S1}$ is the resistance of first switch resistor 331, I is the emitter current of transistor 386 provided by current source 381, and $R_3$ is the resistance of third resistor 388.

During ON-time, the current in the secondary winding of transformer 322 is substantially zero. This is shown in FIG. 33 in the waveform labeled $I_{SEC}$. Since $I_{SEC}$ is substantially zero, the emitter voltage of second transistor 387 (during ON-time) may be substantially equal to:

$$V_{EQ4(ON)} = 3I(R_4 + R_{S2}) \quad (2)$$

where $V_{EQ4(ON)}$ is the emitter voltage on second transistor 387 during ON-time, I is the emitter current of transistor 387, $R_4$ is the resistance of fourth resistor 389, and $R_{S2}$ is the resistance of second switch resistor 336. Three times the current (I) is shown in equation 2. A portion of this current (i.e., 2I of the 3I) is provided by current source 382. Second transistor 387 can conduct twice the current of first transistor 386 because the emitter area is twice that of first transistor 386. The other portion of the current (i.e., the remaining I) is provided by current source 383 since first feedback transistor 390 is active during ON-time. Thus, the waveform for this voltage (i.e., $V_{EQ4(ON)}$) is shown in FIG. 33 as Q4.

As shown in FIG. 33, Q4 is substantially constant during ON-time. This may be the result of positive feedback current conducted by first feedback transistor 390. During ON-time, first feedback transistor is activated because the collector voltage of first transistor 386 is low, thus allowing a collector current substantially equal to the current provided by current source 383 to be passed through first feedback transistor 390. Q5 in FIG. 33 shows that a relatively high and constant collector current is supplied when Q2 is low. This substantially constant current preferably maintains the constant emitter voltage of transistor 387 during ON-time (or, alternatively, ON-cycle). The raised emitter voltage may provide an increased voltage differential at the emitter of transistor 386 between the start and the end of ON-time.

The emitter voltage of transistor 386 increases until the point that it is higher than the emitter voltage of second transistor 387. At this point, transistor 386 turns OFF rapidly because its emitter voltage has increased relative to its base voltage. When transistor 386 turns OFF, the collector voltage of first transistor 386 goes high when the condition of the following is met:

$$I_{PRI} * R_{S1} > 2 * I * R_3 \quad (3)$$

assuming that resistance values of third and fourth resistors 388 and 389 are substantially equal. This relationship also assumes that the resistance value of second switch resistor 336 is substantially less than the resistance value of fourth resistor 389. As shown in equation 3, the relationship between $I_{PRI}$ and a constant current source, I, determines when the transition from ON-time to OFF-time takes place. Just prior to the transition point (between ON-time to OFF-time), the peak primary current can be substantially equal to:

$$I_{PRI-PEAK} = (2 * I * R_3) / R_{S1} \quad (4)$$

once the collector voltage of transistor 386 goes high, this causes the collector voltage of switch driving transistor 392 to go low. A low collector voltage of switch driving transistor 392 preferably commences the OFF-time portion of the switching cycle. In addition, the high collector voltage of first transistor 386 causes first feedback transistor 390 to de-activate. This reduces the emitter voltage of transistor 387 at the beginning of the OFF-cycle.

During the initial stage of OFF-time, the low collector voltage of switch driving transistor 392 activates second feedback transistor 391. The activated second feedback transistor 391 shunts the current provided by current source 383 to ground. The combined operation of de-activated first feedback transistor 390 and activated second feedback transistor 391 can provide positive feedback for the OFF-time cycle. In addition, transistor 390 and transistor 391 may provide added flexibility in sizing of resistors 331 and 336.

In particular, when the collector current of first feedback transistor 390 goes low (as shown in FIG. 33), the voltage across resistor 389 decreases. The decrease of the voltage across resistor 389 decreases the voltage at the emitter of transistor 387. This decrease in the emitter voltage of transistor 387 is equivalent to second switch resistor 336 having a larger resistance value. This provides additional flexibility in sizing the resistance value of second switch resistor 336.

Moreover, $I_{SEC}$ rises to a value substantially equal to:

$$I_{SEC} = I_{PRI-PEAK} / N \quad (5)$$

where N is the secondary to primary winding turns ratio of transformer 322. An illustration of this change is shown in FIG. 33. The $I_{SEC}$ waveform rises to the peak secondary current once ON-time switches to OFF-time. Also, at the transition from ON-time to OFF-time, $I_{PRI}$ preferably rapidly goes to zero.

Once power delivery circuitry 320 enters OFF-time, the emitter voltage on first transistor 386 may be reduced to $I * R_3$ (assuming the resistance value of first switch resistor 331 is substantially less than third resistor 388), whereas during ON-time, the emitter voltage was substantially equal to equation 1. The emitter voltage waveform illustrates a relatively constant voltage (i.e., at $I * R_3$) during OFF-time. The emitter voltage on transistor 387 may change from equation 2 to the following equation:

$$V_{EQ4(OFF)} = -(I_{SEC} * R_{S2}) + 2I * R_4 \quad (6)$$

where $V_{EQ4(OFF)}$ is the emitter voltage on transistor 387 during OFF-time. Thus, the differential voltage between emitter voltages of first transistor 386 and second transistor 387 is represented by equation (7).

$$V_{EQ3(OFF)} - V_{EQ4(OFF)} = I_{SEC} * R_{S2} - I * R_3 \quad (7)$$

As $I_{SEC}$ decreases (or, alternatively, decays), the emitter voltage of second transistor 387 rises because the voltage at the node formed between resistor 336 and resistor 389 preferably becomes less negative. This emitter voltage may increase until the emitter voltage of transistor 387 becomes higher than the emitter voltage of first transistor 386. The rising emitter voltage of second transistor 387 is shown in FIG. 33 during the OFF-time portion of the cycle.

It should be noted that when the ON/OFF-time cycle transitions from ON-time to OFF-time commences, $I * R_3$ should be greater than $I_{SEC} * R_{S2}$. This assures that the secondary winding current can decrease such that $I_{SEC} * R_{S2}$ eventually exceeds $I * R_3$.

Once the emitter voltage of second transistor 387 rises above the emitter voltage of first transistor 386, transistor 386 preferably becomes active and the collector voltage of first transistor 386 goes low. This may cause the collector voltage of switch driving transistor 392 to go high, thus restarting the ON-time portion of the cycle.

It should be noted that when switch transistor 324 turns OFF, $I_{SEC}$ may not jump instantaneously to $I_{PRI-PEAK}/N$. Parasitic capacitances of transformer 322 and other components may prevent an instantaneous jump to $I_{PRI-PEAK}/N$. Therefore, a finite period of time may be required to charge and overcome parasitic capacitances so that $I_{SEC}$ is provided with enough time to build up to $I_{PRI-PEAK}/N$.

One-shot circuitry 359 may provide the time necessary to overcome the parasitic capacitances. During the transition from ON-time to OFF-time, one-shot circuitry 359 may apply a pulse to the base of one-shot transistor 393. This pulse may briefly activate one-shot transistor 393, which forces SWON node 395 low. The pulse produced by one-shot 359 may hold switch transistor 324 off long enough to overcome the parasitic capacitances of the circuitry by allowing $I_{SEC}$ to build up and to begin fully charging the output capacitance. Thus, the operation of one embodiment of current comparator circuitry 400 has been described in detail. The components of measuring circuitry 350 will now be described.

The voltage of capacitive load 344 can be measured by measuring circuitry 350. Measuring circuitry 350 can include first resistor 351, which is coupled between the collector of switch transistor 324 (shown as collector node $V_{VSW}$ 321) and the emitter of transistor 352. The base of transistor 352 can be coupled to the cathode of diode 354. The anode of diode 354 can be coupled to power source 370. The base of transistor 352 can also be coupled to bias circuitry (not shown), thus providing power to the bias circuitry. Bias circuitry may provide the capacitor charging circuit with the ability to turn-on circuitry such as measuring circuitry 360 and power delivery circuitry 320. The collector of transistor 352 can be coupled to second resistor 353. Measuring circuitry can also include comparator 356 which can receive voltage signals from ground-referred voltage node $V_{GREF}$ 357 (formed between the collector of transistor 352 and second resistor 353) and reference voltage $V_{REF3}$ 355. One-shot circuitry 358, which can also be part of the measuring circuitry, can be coupled to comparator 355 and to the output of latch 326. In an alternative approach, one-shot circuitry 359 (which drives the base of one-shot transistor 393), shown in FIG. 32, may be coupled to comparator 355.

The measuring circuitry according to an embodiment of the present invention can be implemented to reduce wasteful long-term power consumption. The purpose of measuring circuitry 350 is to indirectly measure the capacitor load voltage from the primary side winding of transformer 322. Measuring circuitry 350 can measure the output voltage during OFF-time because there is substantially no current flowing in the primary side winding and because the primary side $V_{VSW}$ node 321 reflects output voltage during this part of the cycle. The voltage at $V_{VSW}$ node 321 can be substantially equal to:

$$V_{VSW} = V_{source} + (V_{OUT}/N) + V_{diode} \quad (8)$$

where $V_{VSW}$ is the voltage on collector node $V_{SW}$ 321, $V_{source}$ is the voltage provided by power source 370, $V_{OUT}$ is the capacitor load voltage, N is the secondary-to-primary transformer turns ratio, and $V_{diode}$ is the voltage drop across diode 342. The $V_{VSW}$ voltage waveform is shown in FIG. 31. This waveform shows that $V_{VSW}$ is substantially inversely proportional to the operation of switch transistor 324 (i.e., where switch transistor 324 is ON, $V_{VSW}$ waveform is low, and when switch transistor 324 is OFF, the $V_{VSW}$ waveform is high).

Figure 31:
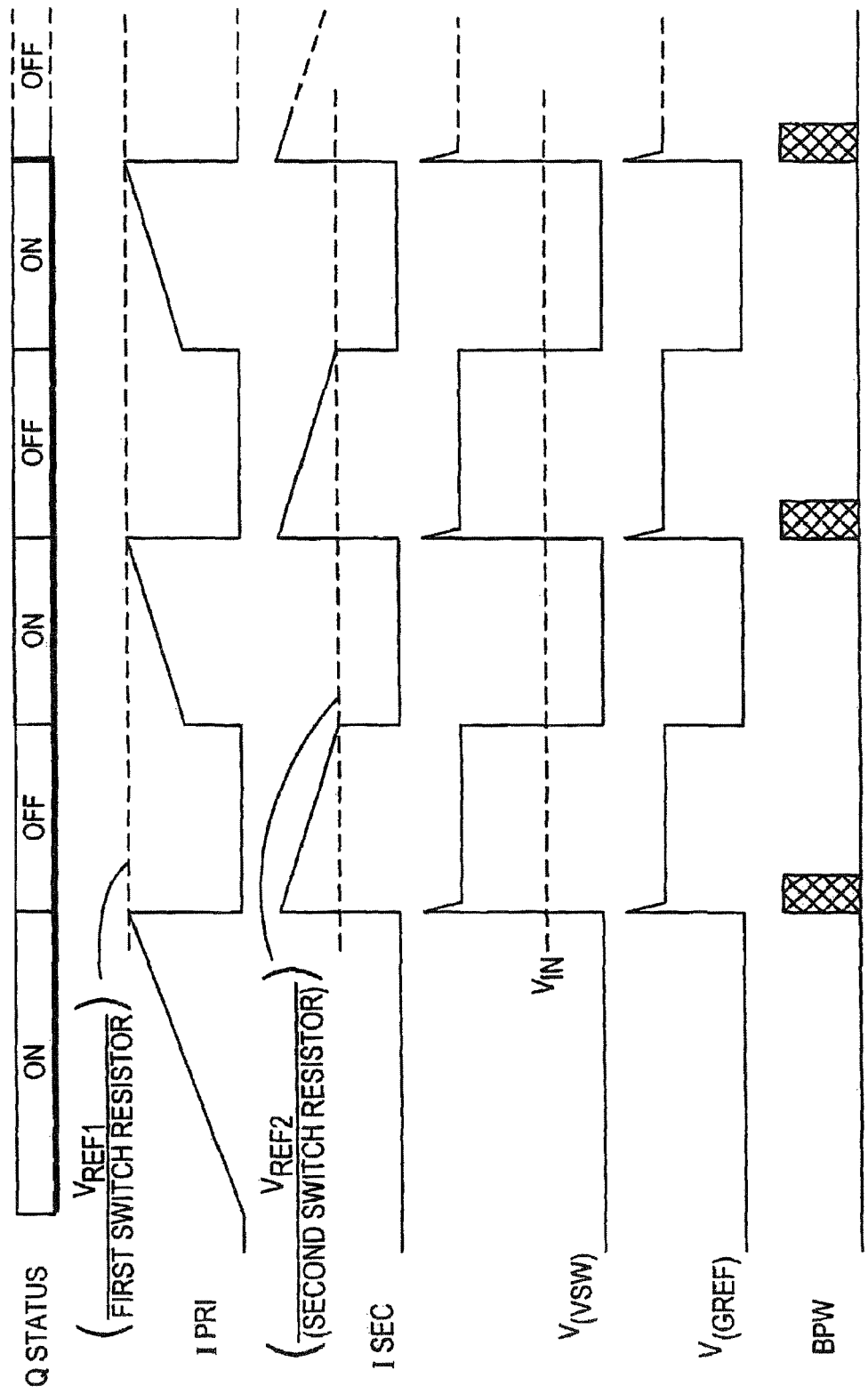
FIG. 31 shows illustrative waveform diagrams of power delivery circuitry and measuring circuitry operation according to the principles of the present invention.

The $V_{VSW}$ waveform is then converted into a normalized, ground-referred waveform illustrated as the $V_{GREF}$ waveform in FIG. 31. This waveform can be produced by first subtracting the voltage provided by power source 370 from the voltage on $V_{VSW}$ node 321 to form a differential voltage across resistor 351. This can be accomplished since the voltage drop across diode 354 and the emitter-to-base voltage of transistor 352 are substantially equivalent. This may maintain the emitter voltage of transistor 354 nearly equal to the voltage provided by power source 370. Second, this differential voltage is normalized by being converted into a current by first resistor 351. Lastly, this current is converted into a ground-referred voltage by second resistor 353. The ground-referred voltage is an instantaneous representation of the output voltage. The ground-referred voltage can be compared to $V_{REF3}$ 355 to determine if the output voltage has reached a targeted value. $V_{GREF}$ can be represented as:

$$V_{GREF} = (V_{OUT}/N)*(R_2/R_1) \quad (9)$$

where $V_{GREF}$ is the ground-referred voltage, $V_{OUT}$ is the output voltage, N is the secondary-to-primary turns ratio, $R_2$ is the resistance value of second resistor 353, and $R_1$ is the resistance value of first resistor 351. Once the target voltage is reached, measuring circuitry 350 can provide a high output signal (i.e., comparator 356 output) to control circuitry 360 (shown in FIG. 34) to indicate that the desired output voltage has been reached.

In some circumstances, it may be necessary to delay the output of measuring circuitry so. For instance, at the beginning of each OFF-time cycle, a leading edge voltage spike may be produced as the result of leakage inductance in the transformer. Because the voltage spike is not indicative of the actual output voltage, measuring circuitry 350 can include one-shot circuitry 358 to temporarily disable the comparator output signal of comparator 355. One-shot circuitry 358 disables the output signal for a finite period at the beginning of each OFF-time cycle to prevent application of erroneous signals to control circuitry 360.

FIG. 31 also shows the blanking period waveform BPW provided by one-shot circuitry 358. This waveform shows how one-shot circuitry 358 is applied at the beginning of each OFF-time cycle to force comparator 356 to effectively "ignore" the voltage spike caused by leakage inductance.

As described above, power delivery circuitry 320 can be used for setting the ON-time and OFF-time of switch transistor 324 in order to deliver power to output capacitor load 344. As also described above, measuring circuitry 350 can be used to indirectly measure the voltage on the output capacitor load. Control circuitry 360 can be used to activate or deactivate power delivery circuitry 320.

FIG. 34 is a block diagram of one embodiment of control circuitry 360 according to an embodiment of the present invention. Control circuitry 360 can include control latch 362, interrogation timer 364, and bias generator 365. Control latch 362 can be a set/reset latch coupled to receive signals from control circuitry 350 and from the output of interrogation timer 364. The measuring circuitry output can be coupled to the reset portion of control latch 362 and the interrogation timer output can be coupled to the set portion of the latch.

The signals received by control latch 362 dictate the output (a high or low output signal) of the control latch. The output of control latch 362 is coupled to interrogation timer 364 and to bias generator 365. Bias generator 365 may be coupled to bias circuitry (not shown to prevent cluttering of the FIGURE) that activates or initiates startup of power delivery circuitry 320 and measuring circuitry 350. As will be explained in more detail, when the control latch output is high, interrogation timer 364 may stop or halt any timing functionality associated with the control circuitry.

The timing functionality or the time limit of interrogation timer 364 may be either fixed or variable. A variable time limit can provide the capacitor charging circuit with increased flexibility in maintaining the desired output voltage.

The output of control latch 362 is set high during initial capacitor charging circuit startup. The high output from control latch 362 enables bias generator 365 and disables interrogation timer 364. Bias generator 365 can enable or disable power delivery circuitry 320 and measuring circuitry 350. When enabled, power delivery circuitry 320 can charge output capacitor load 344. When the output voltage reaches a desired value, measuring circuitry 350 can output a high signal that resets control latch 362. Once control latch 362 is reset, bias generator 365 is disabled and interrogation timer 364 is enabled (i.e., interrogation timer 364 can start a timer (internal clock) that will eventually reactivate bias generator 365). When bias generator 365 is disabled, power delivery circuitry can no longer charge capacitor load 344.

Once control latch 362 is reset, this may disable power delivery circuitry 320 and measuring circuitry 350. When disabled, power delivery circuitry 320 and measuring circuitry 350 are not provided with power (i.e., because bias generator 365 is disabled). Thus, this may provide an embodiment of the present invention with the ability to conserve power once the desired voltage is obtained. When control latch 362 is reset, power may only be supplied to control latch 362 and interrogation timer 364 when the capacitor charging circuit is disabled. Interrogation timer 364 can keep capacitor power delivery circuitry 320 and measuring circuitry 350 disabled for an adaptable (or predetermined) length of time. Then, after interrogation timer 364 times out, it can provide a high (done) output signal to set control latch 362. Setting control latch 362 enables bias generator 365 (which enables power delivery circuitry 320 and measuring circuitry 350) and halts interrogation timer 364, thus starting another charging cycle. This charging cycle may run as long as is necessary to raise the output voltage back to the desired value.

The heretofore described system provides the capacitor charging circuit with the ability to maintain the output capacitor load in a constant state of readiness. The level of readiness required dictates the lower level of the range to which the output voltage may fall.

Figure 35:
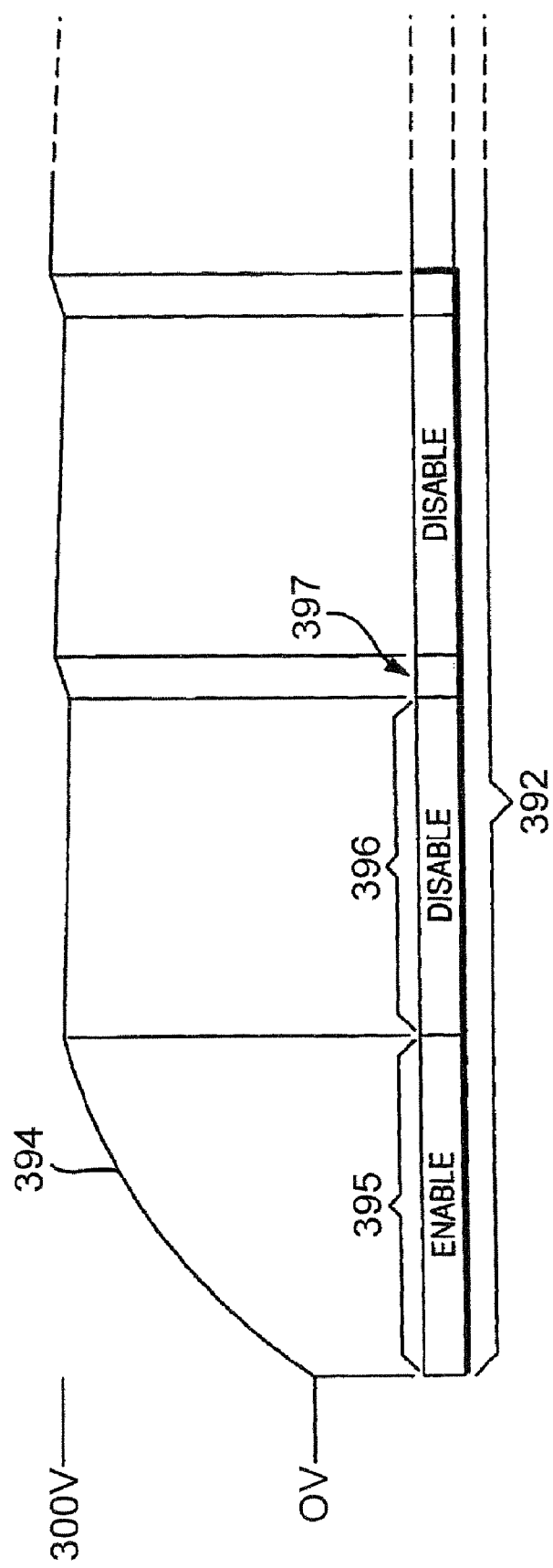
FIG. 35 shows an illustrative waveform diagram of control circuitry operation according to the principles of the present invention.

FIG. 35 shows an illustrative waveform diagram of control circuitry operation according to the principles of an embodiment of the present invention. In particular, FIG. 35 shows the output voltage 394 as a function of control latch status 392.

As stated above, control latch can either disable or enable the charging process. FIG. 35 illustrates an exemplary charging cycle ranging from an output voltage of about zero volts to about 300 volts. When enabled, as shown by trace 395, the capacitor charge circuit charges the capacitive load to obtain the desired output voltage. Once the desired capacitor voltage is obtained, control latch 362 is disabled, as shown in trace 396, until interrogation timer 364 reactivates the latch enable, as shown in trace 397, and also enables power delivery circuitry 320 and measuring circuitry 350. Control latch 320 is enabled (shown as trace 397) for a relatively short period of time in comparison to the control latch 362 enablement of trace 397 because the capacitor load voltage has voltage substantially close to the desired value. Therefore, control latch 362 is not enabled for a substantially long period of time to recharge the capacitive load. Then after the output capacitor load voltage reaches the desired value, control latch 362 is disabled. This cycle, which uses a minimum of power, can be repeated to maintain capacitor load voltage at the desired level.

During capacitor charging circuit operation, the output voltage may rise substantially above the desired level. In such a scenario, the output voltage may be increased to a voltage that prevents the voltage from declining to, or below, the desired level during the disenabled state. If the output voltage does not drop to, or below, the desired voltage during the disenabled state, the capacitor charging circuit may experience voltage runaway. Voltage runaway can occur because the disenabled state may not provide enough time for the output capacitor to drop to, or below, the desired voltage level. Then, over the course of many enablement and disablement cycles (assuming no flash events occur), the voltage will gradually continue to rise. Then eventually, the voltage will reach a critical level that can damage the capacitor charging circuit.

Figure 36:
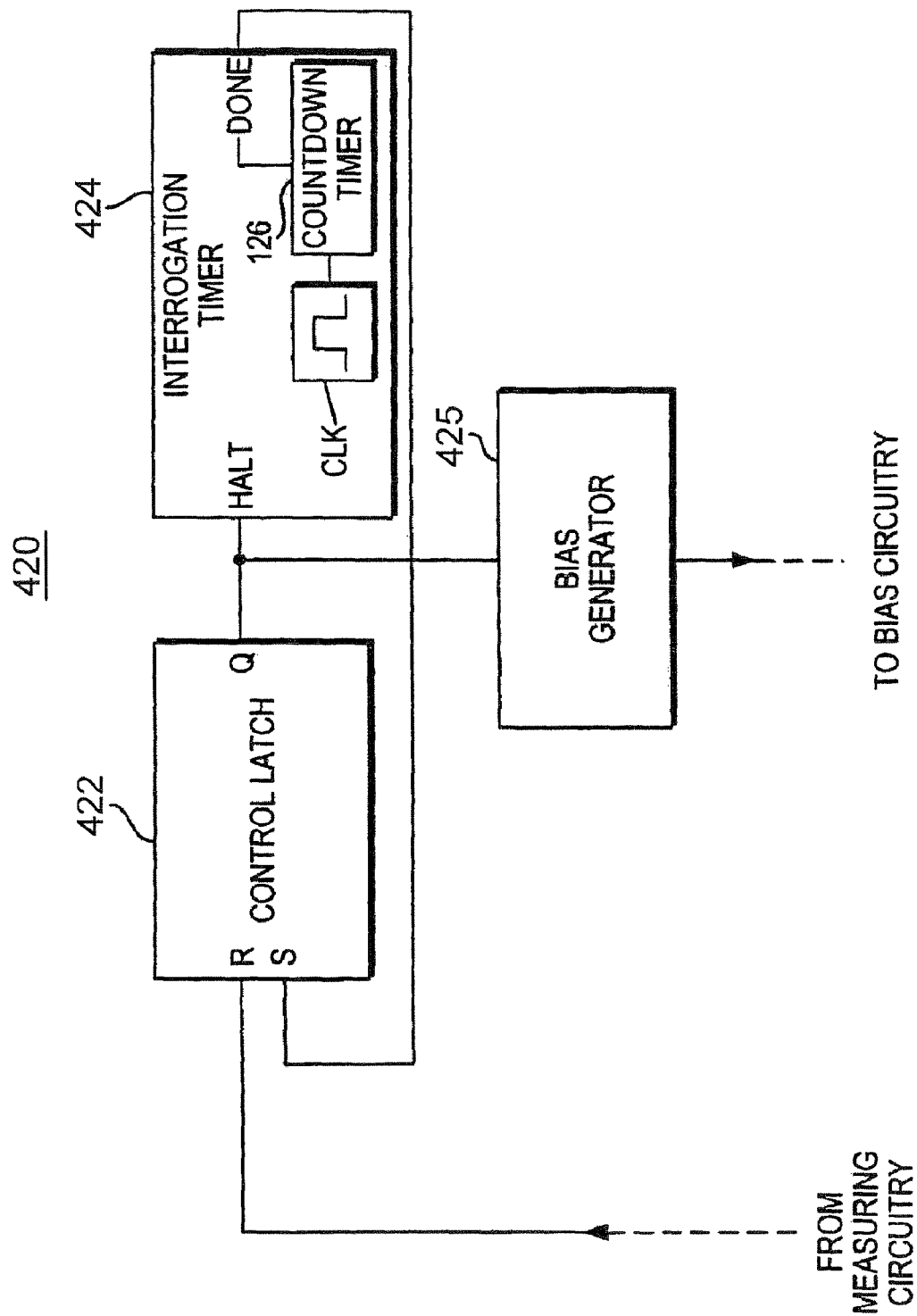
FIG. 36 is a block diagram of an alternative embodiment of control circuitry according to the principles of the present invention.

FIG. 36 is a block diagram of an alternative embodiment of control circuitry 420 suitable for preventing the above described potential output voltage runaway problem according to an embodiment of the present invention. Control circuitry 420 includes control latch 422, interrogation timer 424, bias generator 425. Control latch 422, interrogation timer 424, and bias generator 425 are interconnected and operate in a substantially similar manner as control latch 362, interrogation timer 364, and bias generator 365 of control circuitry 360 as described above.

However, interrogation timer 424 provides additional circuitry that relates to the embodiment shown in FIG. 36. The circuitry is shown to be countdown timer 426, which is coupled to clock CLK. This circuitry can enable interrogation circuitry 424 to be a digitally enabled counter that provides adaptive timing for the disablement state. Countdown timer 426 operates as follows. Countdown timer 426 counts down from an adaptable number of clock cycles set within the timer as will be explained. Once countdown timer 426 counts down from the clock cycles set in the timer, it can cause interrogation timer 424 to time out and provide a high signal on its DONE output.

Interrogation timer 424 provides adaptive timing as follows. Assume, for example, that countdown timer 426 is counting down ten clock cycles. When countdown timer 426 times out, measuring circuitry 350 determines the output voltage. For purposes of this discussion, assume that measuring circuitry 350 determines that the output voltage is above the desired voltage. Such a determination can be provided based on the R input of control latch 422. When R is high (e.g., output voltage at or above desired level), the clock cycles set within countdown timer 426 may be increased incrementally. The increase in clock cycles can be by any suitable increment. In this discussion, assume that the number of clock cycles is increased by ten.

Since the output voltage is above the desired voltage, control latch 422 is reset (i.e., Q goes low). This preferably activates countdown timer 426 in interrogating timer 424. This time, however, countdown timer 426 counts down twenty clock cycles instead of ten clock cycles. Once countdown timer 426 times out, measuring circuitry 350 measures the output voltage. If the output voltage is still above the desired voltage level (e.g., R input remains high), this can result in an additional clock cycle increment. This cycle repeats until the output voltage drops to, or below, the desired level during the disablement state. Hence, control circuitry 360 incrementally increases the set number of clock cycles in countdown timer 426 to adapt the duration of the disablement state.

On the other hand, if measuring circuitry determines that the voltage dropped below the desired voltage, the output of measuring circuitry 350 is initially set low. This low output can change the state of the R input on control latch 422. When R is low (e.g., output voltage is less than the desired voltage level), the clock cycles set within countdown timer 426 decrease. The decrease in the number of clock cycles can be fixed or arbitrary. The decrease can be, for example, greater, lesser, but preferably equal to the corresponding increase of clock cycles. For this example though, the number of clock cycles is reduced by ten. Thus, the clock cycles set in countdown timer 426 may be temporarily set to ten. Once measuring circuitry 350 determines that the output voltage is at or above the desired value, the clock cycles set in countdown timer 426 increase back up to twenty clock cycles. This may occur because the state of R is high.

As a result of countdown timer 426, control circuitry 360 can adapt and obtain the appropriate number of clock cycles for providing the disablement state for the requisite period of time to maintain the desired voltage level without risking voltage runaway.

The capacitor charging circuit of an embodiment of the present invention can be implemented using a variety of different systems. For example, an embodiment of the present invention can be implemented with a micro-processor based photoflash system. The micro-processor can process user input commands such as taking pictures, controlling motor speed for film loading, storing pictures on memory, or any other suitable micro-processor based task. In some cases, the micro-processor can execute a flash event. Other systems can implement simpler mechanisms to execute a flash event. For example, the user may be required to depress a button for a prescribed period of time to initially charge the flash capacitor. Then, to activate the flash, the user simply can press a button to take a picture with a flash.

However, regardless of the system used to operate the flash, the voltage on the capacitor load can drop below the desired operating voltage after the flash event. Therefore, it is desirable to recharge the capacitor load immediately so that the flash can be used again. After the flash event, the system can instruct the control circuitry to activate the power delivery circuitry to recharge capacitor load 344. This instruction can occur when control circuitry 360 is enabled or disabled.

If the capacitor charging circuit is discharged when a flash event occurs, the system can automatically re-initiate the charging process before interrogation timer 364 sets control latch 362. This provides the capacitor charging circuit with the ability to recharge immediately following a flash event. Thus this enables control circuitry 360 to initiate power switching circuitry 320 faster than waiting for interrogation timer 364 to set control latch 362 and begin the recharging process. This can be crucial for rapidly initiating the recharging process because interrogation timer 364 can have a substantially long programmable wait time (e.g., ten seconds).

Figure 37:
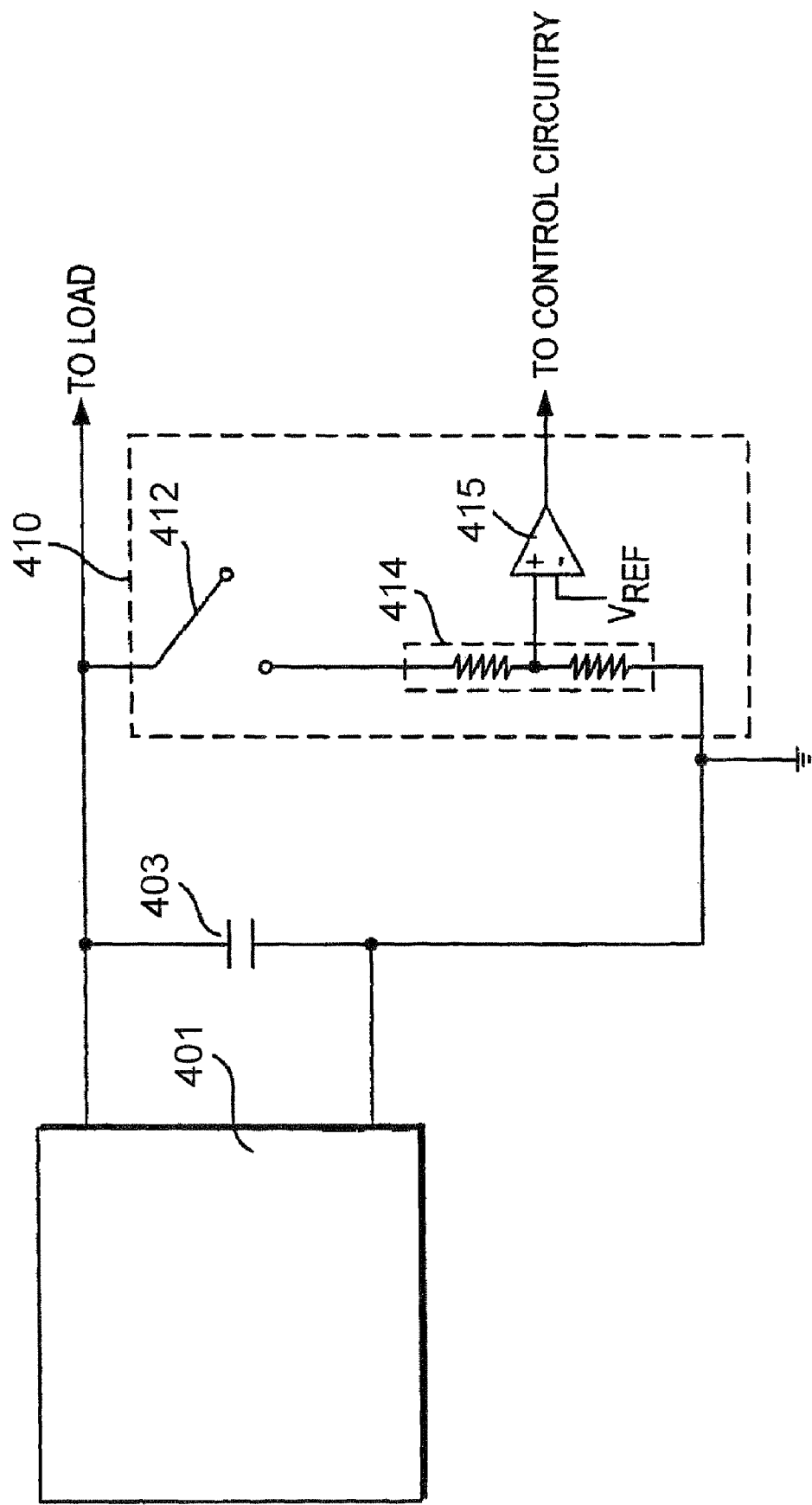
FIG. 37 is a circuit diagram showing an alternative embodiment of measuring circuitry according to the principles of the present invention.

FIG. 37 illustrates an alternative embodiment of measuring circuitry 410 of an embodiment of the present invention. FIG. 37 represents portions of the capacitor charging circuit 401 (e.g., power delivery circuitry and control circuitry), output capacitor 403, and measuring circuitry 410. Measuring circuitry 410 can include switch 412, voltage divider 414, and comparator 415.

Assuming initially, that switch 412 is closed, the circuit of FIG. 37 operates as follows. Circuit 401 provides power to charge the load. Measuring circuitry 410 measures the output voltage when switch 412 is closed. When switch 412 is closed, the output voltage is down-converted by voltage divider 414. The down-converted voltage is then compared to a reference voltage in comparator 415 to determine if the output voltage has reached a pre-determined value. When the output voltage reaches the pre-determined voltage, circuitry 401 may open switch 412 to disable measuring circuitry 410. Measuring circuitry may then be deactivated for a pre-determined period of time until the control circuitry closes switch 412.

In a preferable embodiment, measurement circuitry 410 can be used as follows. In this embodiment, the control circuitry may disable and/or disconnect, but preferably disconnect measurement circuitry 410 when the desired output voltage has been reached. Once the desired voltage is reached, the control circuitry may then reactivate and deactivate measuring circuitry 410 by periodically turning switch 412 ON and OFF. This may provide the capacitor charging circuit with ability to monitor the output voltage while conserving power consumption. This power conservation technique is similar to the charging cycle described in conjunction with FIG. 35.

In another embodiment, measurement circuitry 410 can be used as follows. The control circuitry may selectively operate portions of the capacitor charging circuitry. For example, when the desired output voltage is obtained, the control circuitry may disable the power delivery circuitry. The control circuitry may also disconnect measuring circuitry 410 (by turning switch 412 OFF) for a pre-determined period of time. After the pre-determined period of time elapses, measuring circuitry 410 may be reconnected (by turning switch 412 ON) to measure the output voltage. The control circuitry, however, may not reactivate the power delivery circuitry. If the output voltage is at or above the desired voltage level, the control circuitry may again, disconnect measuring circuitry 410 for a pre-determined period of time. Hence, the capacitor charging circuit of this embodiment can periodically measure the output voltage without activating the power delivery circuitry.

However, if measuring circuitry 410 determines that the output voltage is below the desired voltage level, the control circuitry may enable the power delivery circuitry and connect (e.g., turn switch 412 ON) measuring circuitry 410. This provides the capacitor charging circuit with the ability to charge the output voltage back up to the desired level. Thus, this embodiment provides the capacitor charging circuit with the ability to conserve power while maintaining the desired output voltage.

Figure 38:
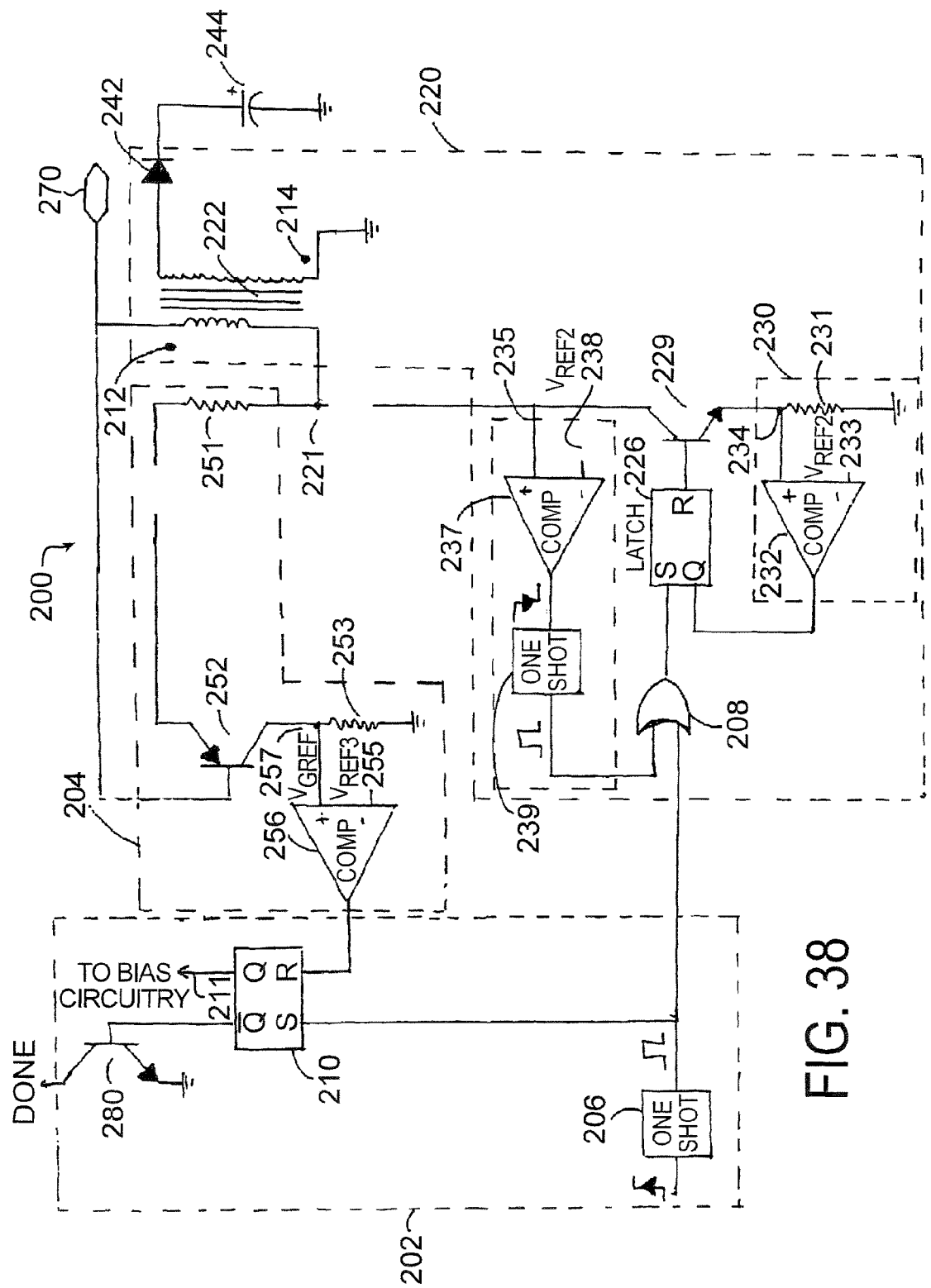
FIG. 38 is a circuit diagram of an alternative embodiment of capacitor charging circuitry according to the principles of the present invention.

Turning to FIG. 38, another circuit diagram of a capacitor charging circuit according to an embodiment of the present invention is shown, which is an alternative embodiment of charge controller 124, shown in FIG. 29. This embodiment allows the current in the secondary winding of the transformer to reach substantially zero during OFF-time. Once the output capacitor is fully charged, charge is preferably no longer delivered to the output capacitor. When charge dissipates from the output capacitor by, for example, leakage or a flash-event, the circuit can be restarted to re-charge the capacitor to the desired charge level. Current in the secondary winding of the transformer is not monitored, as it is in circuit 310 of FIG. 30. Instead, the voltage across the primary winding of the transformer during OFF-time provides the information needed to determine whether or not current is flowing in the secondary winding.

Circuit 200 can be divided into three main sub-components: control circuitry 202, measuring circuitry 204, and power delivery circuitry 220.

Control circuitry 202 includes one shot 206, master latch 210, and done switch 280. One shot 206 is circuitry that emits a logic value one when it detects a LOW-to-HIGH transition. A LOW-to-HIGH transition can be detected by one shot 206, for example, when a user toggles a button to commence power delivery to output capacitor 244. Toggling the button (not shown) causes one shot 206 to pulse a logic value one to master latch 210 and OR gate 208 of power delivery circuitry 220.

Master latch 210 is an SR latch. The S input receives the output of one shot 206 and the R input receives a signal from measuring circuitry 204. Master latch 210 has outputs Q (enable output 211) and QBAR. Enable output 211 is connected to bias circuitry (not shown) that enables or disables power delivery circuitry 220. The bias circuitry (not shown) is additional circuitry known to those of skill in the art that is operational to enable circuitry such as power delivery circuitry 220. For example, the bias circuitry may enable switch 224 of power delivery circuitry 220. QBAR is connected to done switch 280. Done switch 280 indicates whether output capacitor 244 is fully charged. For example, if done switch 280 is OFF, then output capacitor 244 is not charged to a predetermined level and the power delivery circuitry needs to continue operating to transfer power from a power source to output capacitor 244. When done switch 280 is ON, this indicates that output capacitor 244 is charged to at least a predetermined level. Thus, when done switch is ON, the power delivery circuitry is done operating and is no longer transferring power from a source to output capacitor 244.

During operation, master latch 210 is set when it receives a logic value one in its S input. Once set, master latch 210 enables power delivery circuitry 220 to charge output capacitor 244 by outputting a logic HIGH signal to enable output 211. Master latch 210 outputs a logic LOW signal to done switch 280 when it is set. A logic LOW signal turns OFF done switch 280, which as discussed above, indicates that the output capacitor 244 is not charged to at least a predetermined level.

When master latch 210 is reset, enable output 211 disables switch 224, effectively shutting down power delivery circuitry 220. In addition, when master latch 210 is reset, the QBAR output causes done switch 280 to turn ON, indicating that output capacitor 244 is fully charged (or at least charged to a pre-determined level).

Power delivery circuitry 220 operates to transfer power from input source 270 to capacitor 244. Capacitor 244 is preferably coupled to a load. Power delivery circuitry 220 can include adaptive ON-time circuitry 230, adaptive OFF-time circuitry 235, transformer 222, switch transistor 224, latch 226, and output diode 242. If desired, a diode can be connected between two leads of transformer 222. For example, the diode can be connected to the lead of the primary side that is coupled to OFF-time circuitry 235 and to the lead of the secondary side that is connected to ground. Power delivery circuitry 220 may be coupled to the output capacitor 244 via output diode 242. The anode of output diode 242 is coupled to the output side of the secondary winding of transformer 222 and the cathode of output diode 242 is coupled to output capacitor 244. Input source 270 can be coupled to the input of the primary side of transformer 222. The output of the primary side of transformer 222 can be coupled to a node (e.g., the collector) of switch transistor 224. Another node (e.g., the emitter) of switch transistor 224 can be coupled to adaptive ON-time circuitry 230.

Adaptive ON-time circuitry 230 includes first switch resistor 231 and ON-time comparator 232. First switch resistor 231 is coupled to the emitter of switch transistor 224 to form ON-time node 234. ON-time comparator 232 is configured to receive voltage signals from ON-time node 234 and ON-time reference voltage $V_{REF1}$ 233.

Adaptive OFF-time circuitry 235 includes OFF-time comparator 237. OFF-time comparator 237 is coupled to the primary winding of transformer 222 and can also be configured to receive OFF-time reference voltage $V_{REF2}$ 238. Thus, based on the coupling configuration of OFF-time comparator 237, comparator 237 receives the voltage across the primary winding of transformer 222 and the voltage provided by $V_{REF2}$ 238. Note that the voltage across the primary winding of transformer 222 is approximately the same as the voltage seen at the node (e.g., collector) of switch transistor 224. As shown in FIG. 38, the output of OFF-time comparator 237 is coupled to one shot 239. When the voltage across the primary winding of transformer 222 approaches, is substantially equal to, or falls below $V_{REF2}$ 238, OFF-time comparator 237 undergoes a HIGH-to-LOW transition causing one shot 239 to pulse a logic value one.

The outputs of one shot 239 and one shot 210 are logically combined at OR gate 208. The outputs of OR gate 208 and ON-time comparator 232 are each received by latch 226. Latch 226 can be, for example, a set/reset latch. In particular, the reset portion of latch 226 can be coupled to receive the output of ON-time circuitry 230 and the set portion of latch 226 can be coupled to receive the output of OR gate 208.

Latch 226 provides a latch output to the base of switch transistor 224 based on output signals provided by ON-time circuitry 230 and the output of OR gate 208. As discussed above, OR gate 208 produces an output based on OFF-time circuitry 235 and one shot 210. The latch output can be toggled to activate or de-activate switch transistor 224 to generate the switching action necessary to charge capacitor 244. Switch transistor 224 operates (e.g., performs switching action necessary for DC-to-DC conversion) when enabled by control circuitry 202.

The polarity orientation of the primary and secondary windings of transformer 222 are arranged so that the respective windings have opposite polarity. This opposite polarity provides for a flyback circuit topology. As illustrated in FIG. 38, polarity indicators 212 and 214 show that the polarity of the primary and secondary windings are opposite. Note that other transformer configurations are also possible.

During initial power up, no current is flowing in either the primary or secondary windings of transformer 222. The output of OFF-time circuitry 235 is initially preferably set low and the output of ON-time circuitry 230 is also initially preferably set low. When, for example, a user activates one shot 206, transistor switch 224 will be enabled and a logic pulse of one will be received by OR gate 208. The output of OR gate 208, a logic value of one, is received by latch 226. The logic value of one sets latch 226 and turns switch 224 ON.

When transistor switch 224 is ON, a voltage differential appears across the primary winding of transformer 222 and current starts to flow into transformer 222.

Current continues to ramp up in the primary winding until it increases to the point that the voltage across first switch resistor 231 (i.e., voltage at ON-time node 234) exceeds $V_{REF1}$ 233. The voltage across first switch resistor 231 may be based on a portion of the primary current passing through switch transistor 224. Note that the current through the primary winding is substantially similar to the current passing through switch transistor 224. Thus, although comparator 232 compares voltages, it is sensing the current through switch transistor 224. When the primary winding current ramps up, the energy stored in the transformer also increases. Once the voltage at ON-time node 234 exceeds $V_{REF1}$ 233, the output of ON-time circuitry 230 can be set high to reset latch 226, which causes the latch output to go low. The reset latch de-activates transistor 224 terminating current ramp up in the primary side of transformer 222.

When switch transistor 224 is de-activated, the energy stored in transformer 222 during ON-time is transferred to capacitor 244. This transfer preferably occurs substantially during OFF-time. Output diode 242 may prevent output capacitor 244 from drawing current from the secondary winding of the transformer during ON-time. The energy transfer from the secondary winding to output capacitor 244 continues until the current in the secondary winding of the transformer decreases to about zero. As the current decreases to about zero, the voltage at node 221 decreases. The voltage at node 221 (at the collector of transistor switch 224) is compared to $V_{REF2}$ 238 of OFF-time circuitry 235. $V_{REF2}$ 238 is preferably slightly above the voltage of input source 270. For example, $V_{REF2}$ 238 may be the voltage of input source 270 plus thirty-five millivolts.

When the inputs of OFF-time comparator 237 are substantially equal, one shot 239 preferably pulses a logic value one indicating that additional current should be drawn through the primary winding of transformer 222. The logic value of one from one shot 239 is received by OR-gate 208. A logic value one is then delivered from the output of OR-gate 208 to latch 226. Latch 226 is then set and switch transistor 224 is closed. This process of cycling between ON-time and OFF-time may be repeated and output capacitor 244 charged until measuring circuitry 204 determines that the charge on output capacitor 244 is equal to or greater than a pre-determined amount.

Measuring circuitry 204 includes first resistor 251, transistor 252, second resistor 253, and comparator 256. First resistor 251 is preferably coupled between the collector of switch transistor 224 (at node 221) and the emitter of transistor 252. The collector of transistor 252 can be coupled to second resistor 253. Comparator 256 can receive voltage signals from ground-referred voltage node $V_{GREF}$ 257 (formed between the collector of transistor 252 and second resistor 253) and reference voltage $V_{REF3}$ 255.

Measuring circuitry 204 preferably indirectly measures the charge on output capacitor 244 via the voltage across the primary winding of transformer 222 during the OFF-time portion of the switching cycle. (Measuring circuitry 204 operates similar to measuring circuitry 50, as discussed above in connection with FIG. 30.) When the voltage at node 221 is at a pre-determined value above the voltage value of input source 270, the output of comparator 256 will be a logic value one. This output of comparator 256 is provided to master latch 210. Thus, a logic value one output causes master latch 210 to reset. When reset, enable output 211 provides a logic zero thereby disabling switch 224, and turning done switch 280 ON. By way of this arrangement, additional charge/power is no longer provided to output capacitor 244.

When done switch 280 is turned ON, a signal may be sent to a microprocessor coupled to circuit 200 indicating that output capacitor 244 is fully charged (or charged to a pre-determined level).

The pre-determined value at which additional charge is no longer provided to output capacitor 244 can be set by selecting appropriate values for first resistor 251, second resistor 253, and reference voltage $V_{REF3}$ 255. For example, when first resistor 251 is 2.5 kOhms, second resistor 253 is 60 kOhms, and reference voltage $V_{REF3}$ 255 is 1.25V, circuit 200 will not provide additional charge to output capacitor 244 when the voltage at node 221 is 31.5V above the voltage value of input source 270.

Note that the arrangement of circuitry shown in the control circuitry, power delivery circuitry, and the measuring circuitry are merely illustrative and that different arrangements can be implemented without departing from the scope of an embodiment of the present invention. For example, the transformer can be ancillary to the power delivery circuitry.

Thus it is seen that the capacitor charging circuit can efficiently charge a wide range of output capacitor loads and maintain a desired output voltage with minimal power dissipation. Person skilled in the art will appreciate that embodiments of the present invention can be practiced by other than the described embodiments, which are presented for purposes of illustration rather than of limitation, and embodiments of the present invention are limited only by the claims which follow.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. Staple insulation for operable arrangement along one or more staples to provide one or more insulated staples, each of the one or more staples having a width and a bight section extending in a widthwise direction of the staple between a pair of legs, the legs extending from an underside of the bight section, each of the pair of legs and the bight section having a thickness extending transverse to the staple width between opposing sides of the insulation form, the staple insulation comprising:
one or more insulation forms, each form including a crown section having a top side configured for operable arrangement along the underside of the staple bight section and a width extending in a widthwise direction of the staple, the form also having a thickness extending transverse across the form width and which is substantially equal to or less than the thickness of the staple leg and bight section; and,
wherein the form width is less than or substantially equal to the width of each staple; and
wherein the one or more insulation forms includes at least one connector adapted to connect any adjacent insulation forms for forming an array of connected insulation forms.

2. The staple insulation recited in claim 1, wherein the crown section of each of the one or more forms includes one or more deformation-assisting voids extending through the thickness of the crown section and partially through a height of the crown section, the height extending from the top side to a bottom side of the crown section.

3. The staple insulation of claim 2, wherein the one or more deformation-assisting voids comprise a plurality of deformation-assisting voids arranged in a spaced arrangement along the width of the crown section.

4. The staple insulation of claim 3, wherein each of the deformation-assisting voids is arranged along the top side of the crown section.

5. The staple insulation of claim 4, wherein each of the one or more insulation forms includes a pair of insulation legs extending outwardly from the crown section, each of the insulation legs being arranged along an inward surface of one of the staple legs, and each of the insulation legs having a thickness that is substantially equal to or less than the thickness of the associated staple leg.

6. The staple insulation of claim 5, wherein the terminal end of each of the pair of insulation legs is substantially pointed.

7. The staple insulation of claim 5, wherein each of the one or more deformation-assisting voids comprise a recess.

8. The staple insulation recited in claim 1, wherein the one or more insulation forms are formed of plastic.

9. The staple insulation recited in claim 1, wherein the one or more insulation forms comprise a plurality of insulation forms adjacently arranged and connected to form an array of connected insulation forms comprising, and wherein the one or more staples comprises a plurality of staples such that the array of insulation forms is configured to be attached to the array of staples, wherein the at least one connector connects the adjacent insulation forms to form the array of connected insulation forms.

10. An insulated staple comprising:
a staple having a width and a bight section extending in a widthwise direction of the staple between a pair of legs, the legs extending outwardly from an underside of the bight section, each of the pair of legs and the bight section having a thickness extending transverse to the staple width; and
an insulation form operably affixed to the staple, the insulation form having a crown section, the crown section having a top side arranged along the underside of the staple bight section and a width extending in a widthwise direction of the staple, the form also having a thickness extending transversely across the form width between opposing sides of the insulation form, the thickness being substantially equal to or less than the thickness of the staple leg and the thickness of the staple and the form width being less than or substantially equal to the width of the staple;
wherein the insulation form includes at least one connector adapted to connect any adjacent insulation forms for forming an array of connected insulation forms.

11. The insulated staple recited in claim 10, wherein the crown section includes one or more deformation-assisting voids extending through the thickness of the crown section and partially through a height of the crown section, the height extending from the top side to a bottom side of the crown section.

12. The insulated staple of claim 11, wherein the one or more deformation-assisting voids comprise a plurality of deformation-assisting voids arranged in a spaced arrangement along the width of the crown section.

13. The insulated staple of claim 12, wherein each of the plurality of deformation-assisting voids comprise a recess.

14. The insulated staple of claim 13, wherein each of the deformation-assisting voids are arranged along the top side of the crown section.

15. The insulated staple recited in claim 10 further comprising: a pair of insulation legs extending from the crown section, each of the insulation legs being arranged along an inward surface of one of the staple legs, and each of the insulation legs having a thickness that is substantially equal to or less than the thickness of the associated staple leg.

16. The staple insulation of claim 15, wherein the terminal end of each of the pair of insulation legs is substantially pointed.

17. The insulated staple of claim 15, wherein the insulation form is connected to one or more additional insulation forms arranged adjacently side-by-side to form an array of connected insulation forms where the legs of adjacent forms are connected and crown sections of adjacent forms are connected, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples, wherein the at least one connector connects the adjacent insulation forms and form the array of connected insulation forms.

18. The insulated staple of claim 10, wherein an adhesive is arranged between the insulation form and the staple to adhesively affix the insulation form to the staple.

19. The insulated staple of claim 10, wherein the insulation form is connected to one or more additional insulation forms arranged adjacently side-by-side to form an array of connected insulation forms, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples.

20. A method of forming at least one insulated staple, the method comprising the steps of:
providing at least one staple having a width and a bight section extending in a widthwise direction of the staple between a pair of legs, the legs extending outwardly from an underside of the bight section, each of the pair of legs and the bight section having a thickness extending transverse to the staple width;
providing at least one insulation form having a width and a crown section, the crown section having a top side configured for operable arrangement along the underside of the staple bight section and a width extending in a widthwise direction of the staple, the form having a thickness extending transversely across the form width, the thickness being substantially equal to or less than a thickness of the staple, and the form width being less than or substantially equal to the width of the staple; and,
placing the at least one insulation form between the pair of legs of the at least one staple such that the top side of the crown section is arranged underneath the underside of the staple bight section and such that the thickness of the insulation form is arranged within the thickness of the associated staple.

21. The method described in claim 20, wherein the insulation form crown section includes one or more deflection-assisting voids extending through the thickness of the crown section and partially through a height of the crown section, the height extending from the top side to a bottom side of the crown section.

22. The method of claim 21, wherein the one or more deformation-assisting voids comprise a plurality of deformation-assisting voids arranged in a spaced arrangement along the width of the crown section.

23. The method of claim 22, wherein each of the one or more deformation-assisting voids comprise a recess.

24. The method described in claim 20, wherein the at least one insulation form includes a pair of legs extending outwardly from the crown section, the method further comprising a step of placing each of the pair of legs into engagement with an inward side of one of the pair of staple legs of the staple, where each insulation leg has a thickness substantially equal to or less than the thickness of the staple leg to which the insulation leg engages.

25. The method described in claim 20, wherein the at least one staple comprises a plurality of staples adjacently arranged side-by-side and connected to form an array of connected staples, and wherein the at least one insulation form comprises a plurality of insulation forms adjacently arranged side-by-side and connected to form an array of connected insulation forms such that in the step of affixing the array of insulation forms is affixed along the array of staples.

26. The method described in claim 25, wherein the array of connected array of insulation forms includes at least one connector extending between adjacent insulation forms to connect the adjacent insulation forms and form the array of connected insulation forms.

27. The method described in claim 26, wherein the insulation form crown section includes one or more deflection-assisting voids extending through the thickness of the crown section and partially through a height of the crown section, the height extending from the top side to a bottom side of the crown section.

28. The method described in claim 27, wherein the at least one insulation form includes a pair of legs extending outwardly from the crown section, the method further comprising a step of placing each of the pair of legs into engagement with an inward side of one of the pair of staple legs of the staple, where each insulation leg has a thickness substantially equal to or less than the thickness of the staple leg to which the insulation leg engages.

29. The method described in claim 25, wherein the insulation form crown section includes one or more deflection-assisting voids extending through the thickness of the crown section and partially through a height of the crown section, the height extending from the top side to a bottom side of the crown section.

30. The method of claim 20, wherein the step placing comprises arranging an adhesive between the insulation form and the staple to adhesively affix the insulation form to the staple.

31. An insulated staple comprising:

a staple having a width, a thickness, and a bight section, the bight section having a width and extending in a widthwise direction of the staple between a pair of legs, the legs extending outwardly from an underside of the bight section; and an insulation form affixed to the staple, the insulation form having a crown section, the crown section having a top side arranged along the underside of the staple bight section and a width extending in a widthwise direction of the staple, the form also having a thickness extending transversely across the width between opposing sides of the insulation form and being substantially equal to or less than the thickness of the staple, the crown section of the form including a plurality of deformation-assisting voids spaced along the width of the crown section and extending through the thickness of the crown section and partially through a height of the crown section, the height extending between the top side and a bottom side of the crown section.

32. The insulated staple of claim 31, wherein each of the plurality of deformation-assisting voids are arranged along the top side of the crown section.

33. The insulated staple of claim 32, wherein each of the plurality of deformation-assisting voids comprise a recess.

34. The insulated staple of claim 32, wherein the insulation form includes a pair of insulation legs extending outwardly from the crown section, each of the insulation legs being arranged along an inward surface of one of the staple legs, and each of the insulation legs having a thickness that is substantially equal to or less than the thickness of the associated staple leg.

35. The insulated staple of claim 34, wherein the insulation form is connected to one or more additional insulation forms arranged adjacently side-by-side to form an array of connected insulation forms where the legs of adjacent forms are connected and crown sections of adjacent forms are connected, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples.

36. The insulated staple of claim 31, wherein the insulation form is connected to one or more additional insulation forms arranged adjacently side-by-side to form an array of connected insulation forms, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples.

37. Staple insulation for operable arrangement along one or more staples to provide one or more insulated staples, each of the one or more staples having a width and a bight section extending in a widthwise direction of the staple between a pair of legs, the legs extending from an underside of the bight section, each of the pair of legs and the bight section having a thickness extending transverse to the staple width between opposing sides of the insulation form, the staple insulation comprising:

an insulation form affixed to the staple, the insulation form having a crown section, the crown section having a top side arranged along the underside of the staple bight section and a width extending in a widthwise direction of the staple, the form also having a thickness extending transversely across the width between opposing sides of the insulation form and being substantially equal to or less than the thickness of the staple, the crown section of the form including a plurality of deformation-assisting voids spaced along the width of the crown section and extending through the thickness of the crown section and partially through a height of the crown section, the height extending between the top side and a bottom side of the crown section.

38. The insulated staple of claim 37, wherein each of the plurality of deformation-assisting voids are arranged along the top side of the crown section.

39. The insulated staple of claim 38, wherein each of the plurality of deformation-assisting voids comprise a recess.

40. The insulated staple of claim 37, wherein the insulation form includes a pair of insulation legs extending outwardly from the crown section, each of the insulation legs being arranged along an inward surface of one of the staple legs, and each of the insulation legs having a thickness that is substantially equal to or less than the thickness of the associated staple leg.

41. The insulated staple of claim 40, wherein the insulation form is connected to one or more additional insulation forms arranged adjacently side-by-side to form an array of connected insulation forms where the legs of adjacent forms are connected and crown sections of adjacent forms are connected, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples.

42. The insulated staple of claim 37, wherein the insulation form is connected to one or more additional insulation forms arranged adjacently side-by-side to form an array of connected insulation forms, and wherein the staple is connected to one or more additional staples arranged adjacently side-by-side to form an array of connected staples, the array of insulation forms being arranged relative the array of strips such that each insulation form of the array of insulation forms is arranged along and within the thickness of one of the staples of the array of staples.

* * * * *